United States Patent
Shenoy et al.

(10) Patent No.: US 12,533,321 B2
(45) Date of Patent: Jan. 27, 2026

(54) POLYPEPTIDE FORMULATIONS FOR ORAL DELIVERY

(71) Applicant: Bhami's Research Laboratory, Pvt. Ltd., Karnataka (IN)

(72) Inventors: Bhami Shenoy, Karnataka (IN); Suryakanth Motilal Pai, Karnataka (IN)

(73) Assignee: Bhami's Research Laboratory, Pvt. Ltd., Karnataka (IN)

( * ) Notice: Subject to any disclaimer, the term of this patent is extended or adjusted under 35 U.S.C. 154(b) by 0 days.

(21) Appl. No.: 18/339,706

(22) Filed: Jun. 22, 2023

(65) Prior Publication Data

US 2024/0122860 A1   Apr. 18, 2024

(30) Foreign Application Priority Data

Oct. 14, 2022  (IN) .............................. 202241058759
Mar. 27, 2023  (IN) .............................. 202341022184

(51) Int. Cl.

| | |
|---|---|
| *A61K 9/28* | (2006.01) |
| *A61K 9/00* | (2006.01) |
| *A61K 38/19* | (2006.01) |
| *A61K 38/26* | (2006.01) |
| *A61K 38/27* | (2006.01) |
| *A61K 38/28* | (2006.01) |
| *A61K 38/29* | (2006.01) |
| *A61K 38/31* | (2006.01) |
| *A61K 38/47* | (2006.01) |
| *A61K 47/22* | (2006.01) |
| *A61K 47/26* | (2006.01) |
| *A61K 47/42* | (2017.01) |

(52) U.S. Cl.
CPC .......... *A61K 9/2826* (2013.01); *A61K 9/0056* (2013.01); *A61K 38/191* (2013.01); *A61K 38/26* (2013.01); *A61K 38/27* (2013.01); *A61K 38/28* (2013.01); *A61K 38/29* (2013.01); *A61K 38/31* (2013.01); *A61K 38/47* (2013.01); *A61K 47/22* (2013.01); *A61K 47/26* (2013.01); *A61K 47/42* (2013.01); *C12Y 302/01001* (2013.01)

(58) Field of Classification Search
None
See application file for complete search history.

(56) References Cited

U.S. PATENT DOCUMENTS

| | | | |
|---|---|---|---|
| 10,646,569 B2 | 5/2020 | Shenoy | |
| 2006/0019874 A1* | 1/2006 | Radhakrishnan | C07K 14/62 514/6.3 |
| 2006/0171920 A1* | 8/2006 | Shechter | A61K 38/1709 530/391.1 |
| 2017/0056504 A1* | 3/2017 | Kohn | C07K 16/32 |
| 2020/0108124 A1* | 4/2020 | Kwiatkowski | A61K 38/26 |
| 2020/0254094 A1 | 8/2020 | Shenoy | |
| 2022/0339114 A1 | 10/2022 | Pai et al. | |

FOREIGN PATENT DOCUMENTS

| | | |
|---|---|---|
| CN | 109 757 733 A | 5/2019 |
| WO | WO-2004/043430 A2 | 5/2004 |
| WO | WO-2018/211517 A1 | 11/2018 |
| WO | WO-2022/219646 A1 | 10/2022 |
| WO | WO-2024/079739 A1 | 4/2024 |

OTHER PUBLICATIONS

U.S. Appl. No. 18/339,808, filed Jun. 22, 2023, Shenoy et al.
Abramson, A. et al., Oral delivery f systemc monoclonal antibodies, peptides and small molecules using gastric auto-injectors, Nat. Biotechnol., 40(1):103-109 (2022).
International Search Report for PCT/IN2023/050601, 7 pages (mailed Aug. 12, 2023).
Invitation to Pay Additional Fees for PCT/IN2023/050601, 12 pages (mailed Sep. 28, 2023).
Written Opinion for PCT/IN2023/050601, 11 pages (mailed Aug. 12, 2023).

* cited by examiner

*Primary Examiner* — Robert A Wax
*Assistant Examiner* — Quanglong N Truong
(74) *Attorney, Agent, or Firm* — Choate, Hall & Stewart LLP; Beejan Asady; Brenda Herschbach Jarrell

(57) ABSTRACT

The present disclosure provides, among other things, methods and compositions for the oral administration of polypeptides. Many polypeptides are typically administered in liquid solutions by intravenous or subcutaneous injection. The present disclosure provides methods and compositions that include a polypeptide formulation, e.g., truffle, tablet, globule, candy, capsule formulation suitable for oral administration, where the formulation includes an amorphous polypeptide composition or a crystallized polypeptide composition and a pharmaceutically acceptable carrier.

31 Claims, 24 Drawing Sheets

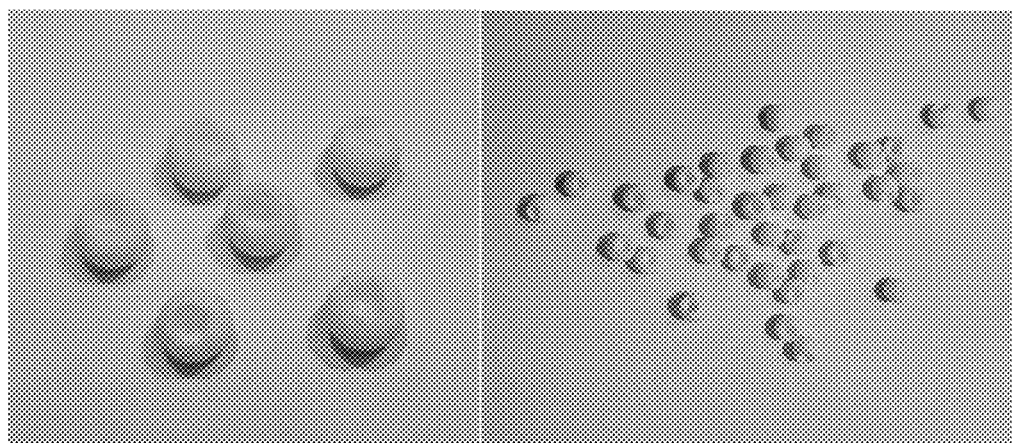
FIG. 1 Hollow Sugar Truffles

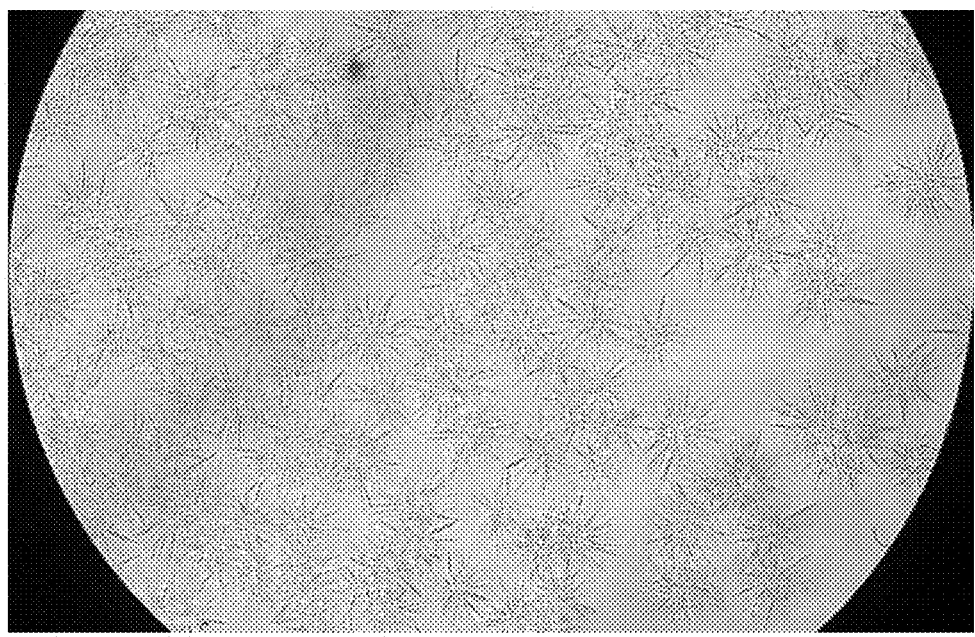
FIG. 2 Amylase Crystals with Trapped Insulin

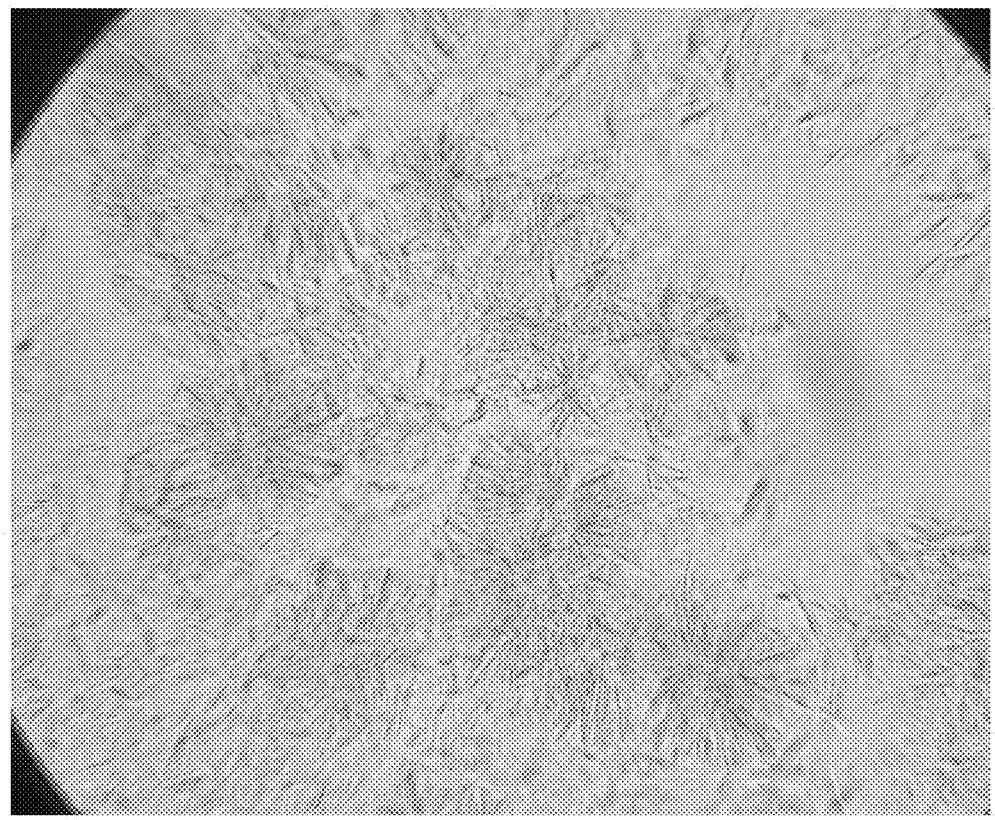
FIG. 3 Albumin Crystals with Trapped Insulin

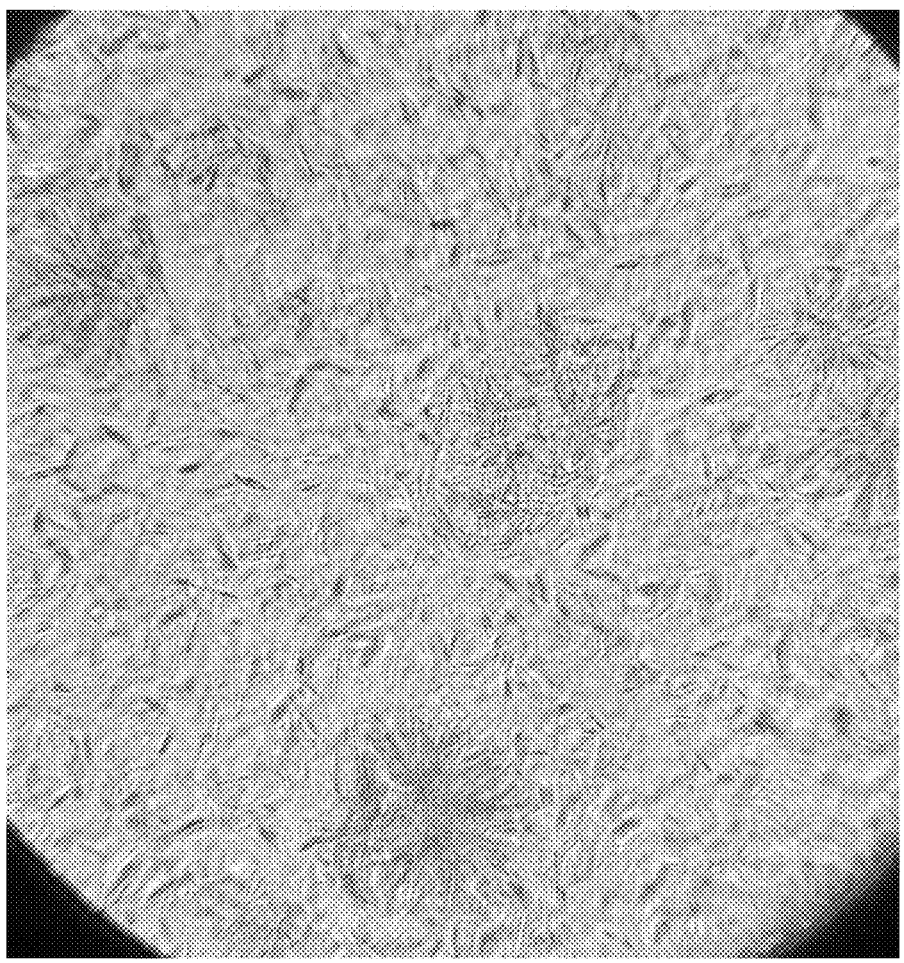
FIG. 4 Albumin Crystals with Trapped PTH

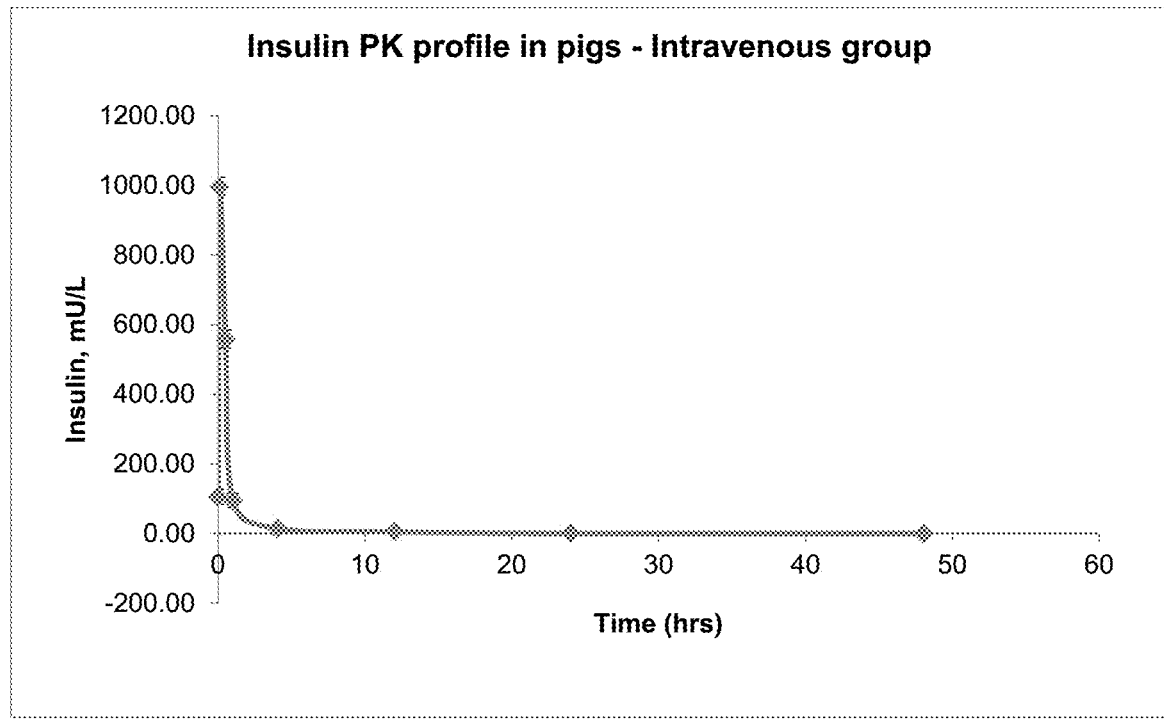
FIG. 5 Human Insulin R – Pharmacokinetic Profile of Intravenous Injection in Pigs

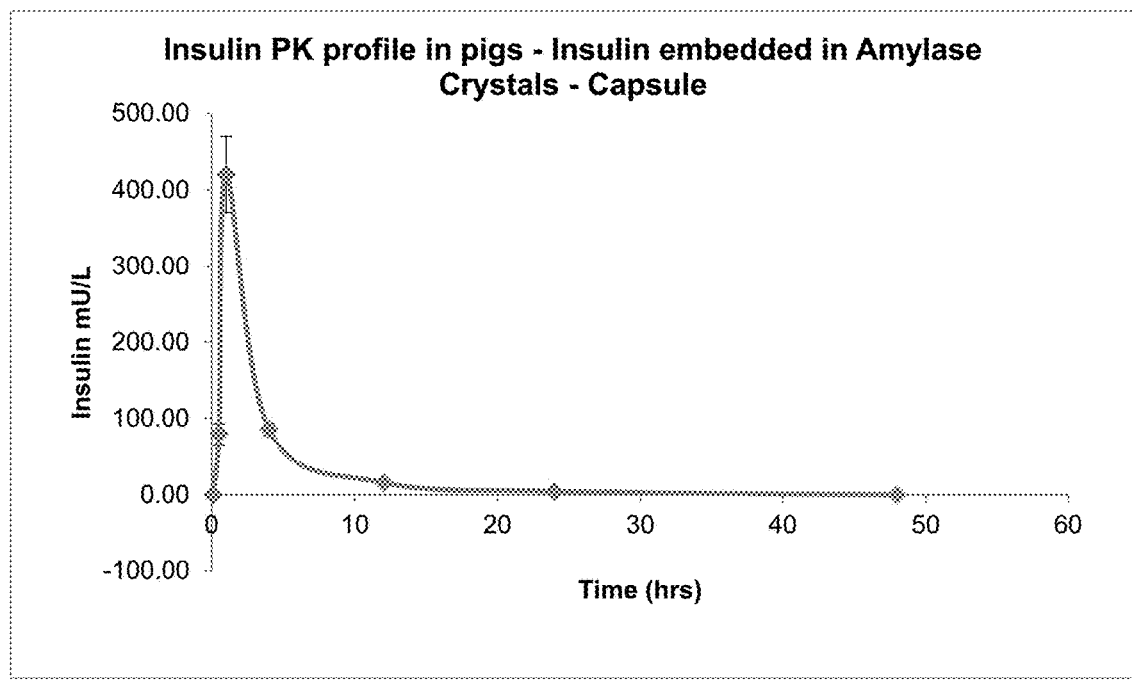
FIG. 6 Human Insulin R – Pharmacokinetic Profile of Insulin Embedded in Amylase Crystals – Capsule Form Gut Delivery in Pigs

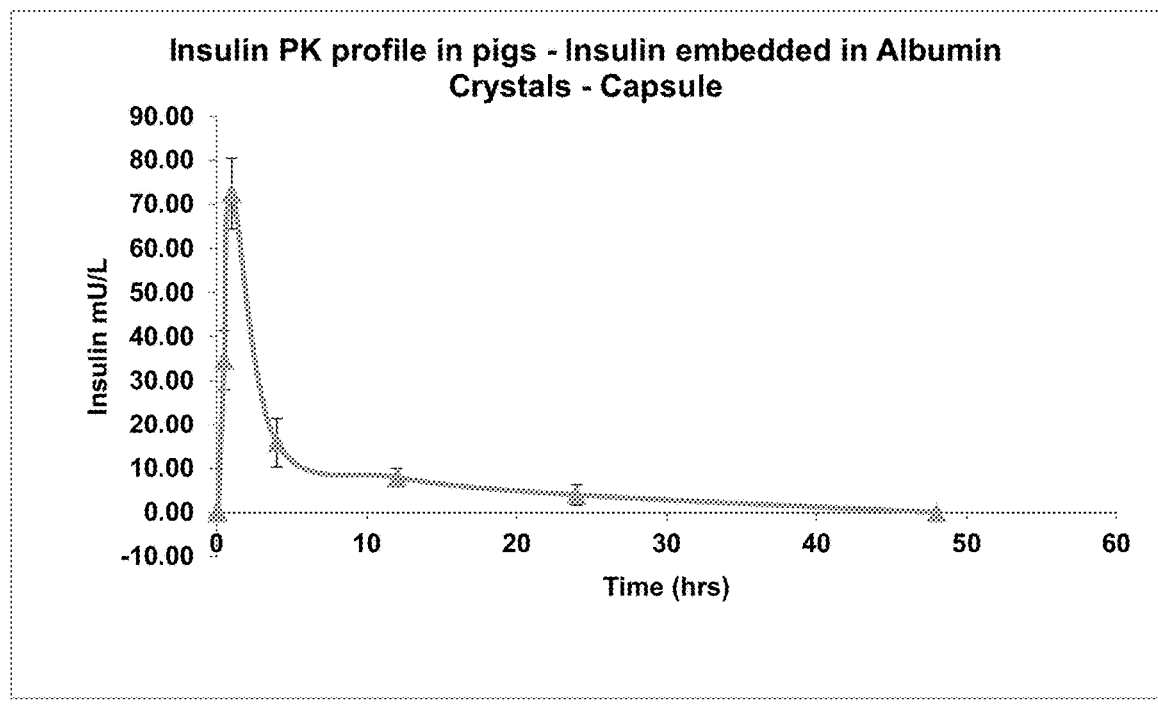
FIG. 7 Human Insulin R – Pharmacokinetic Profile of Insulin Embedded in Albumin Crystals – Capsule Form Gut Delivery in Pigs

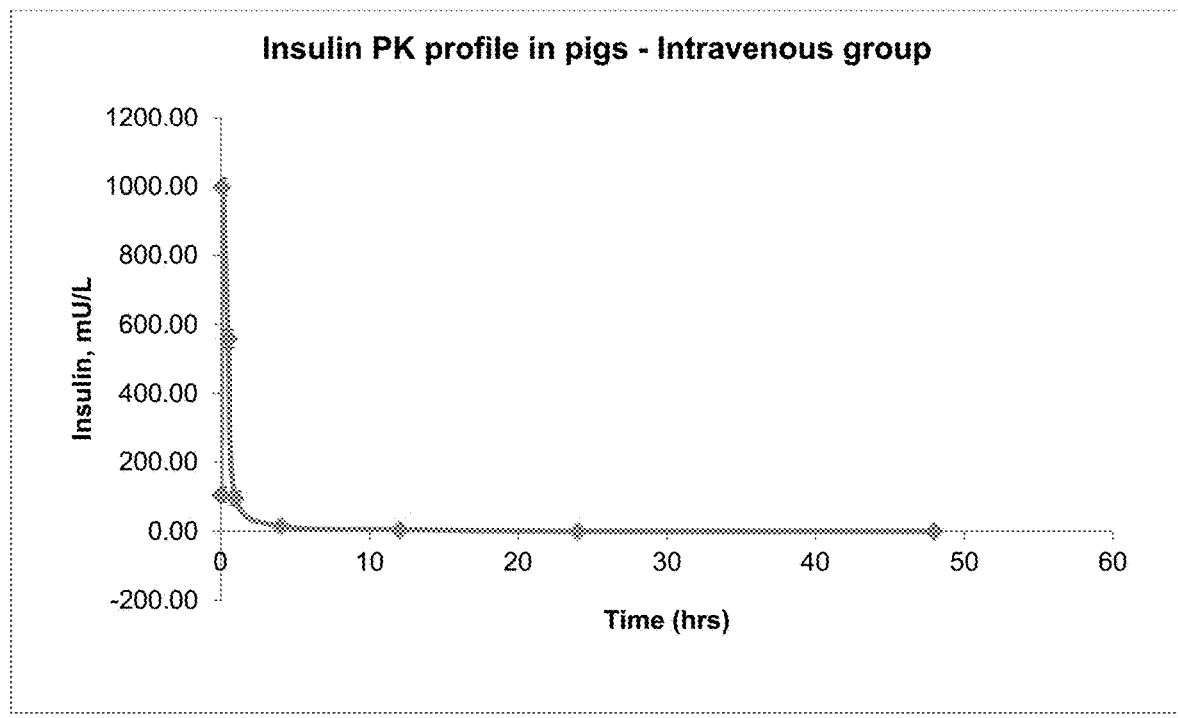
FIG. 8 Human Insulin R – Pharmacokinetic Profile of Intravenous Injection in Pigs

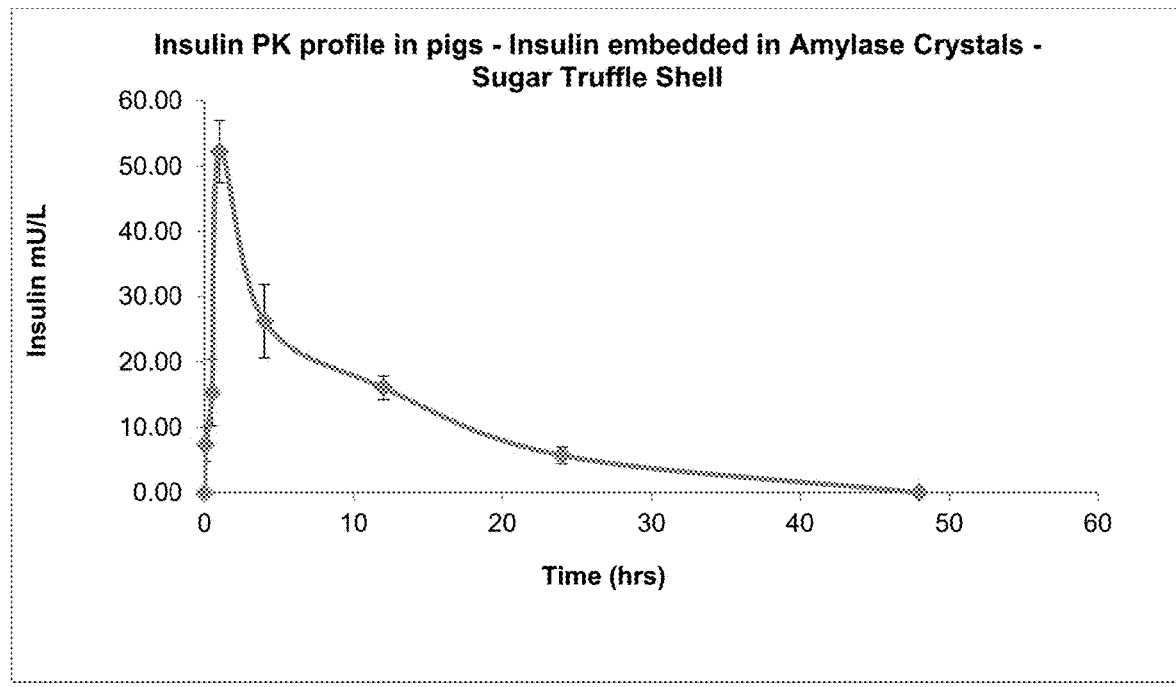
FIG. 9 Human Insulin R – Pharmacokinetic Profile of Insulin Embedded in Amylase Crystals – Sugar Truffle Shell Form Buccal/Sublingual Delivery in Pigs

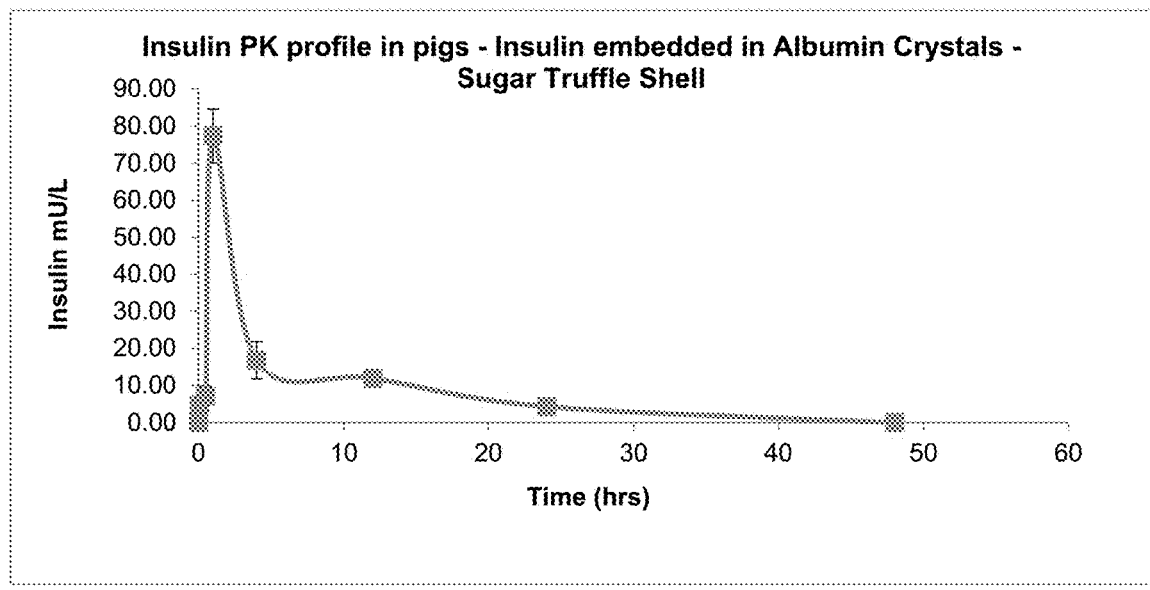
FIG. 10 Human Insulin R – Pharmacokinetic Profile of Insulin Embedded in Albumin Crystals – Sugar Truffle Shell Form Buccal/Sublingual Delivery in Pigs

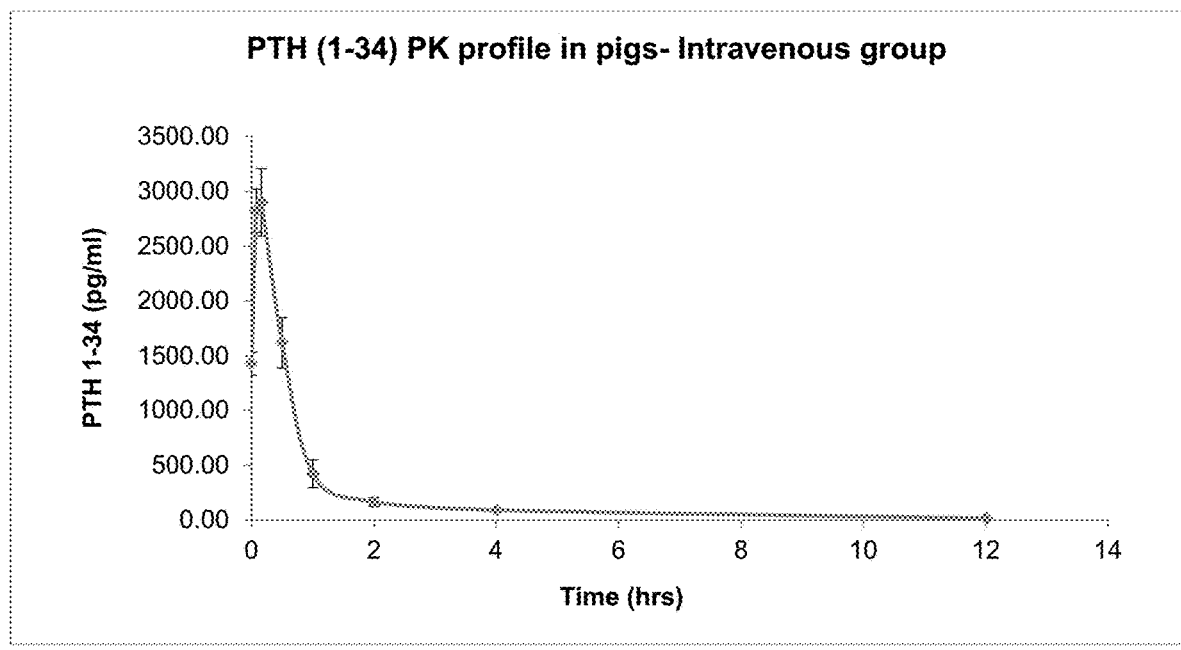
FIG. 11 PTH – Pharmacokinetic Profile of Intravenous Injection in Pigs

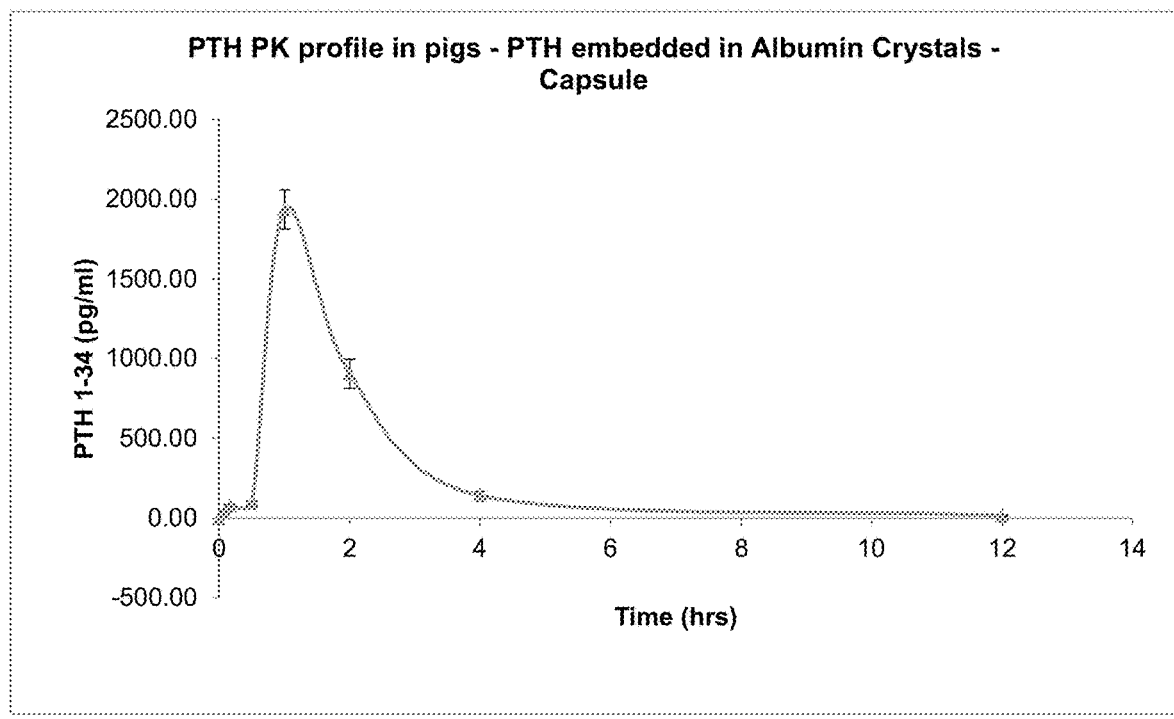
FIG. 12 PTH – Pharmacokinetic profile of PTH Embedded in Albumin Crystals – Capsule Form Gut Delivery in Pigs

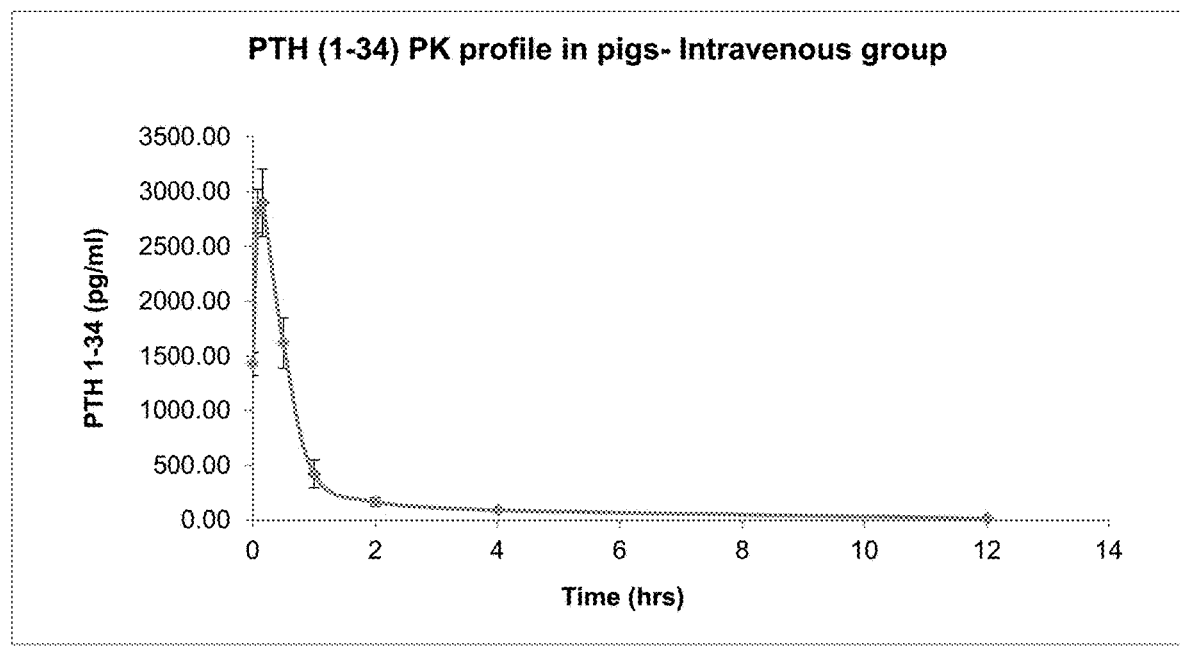
FIG. 13 PTH – Pharmacokinetic Profile of Intravenous Injection in Pigs

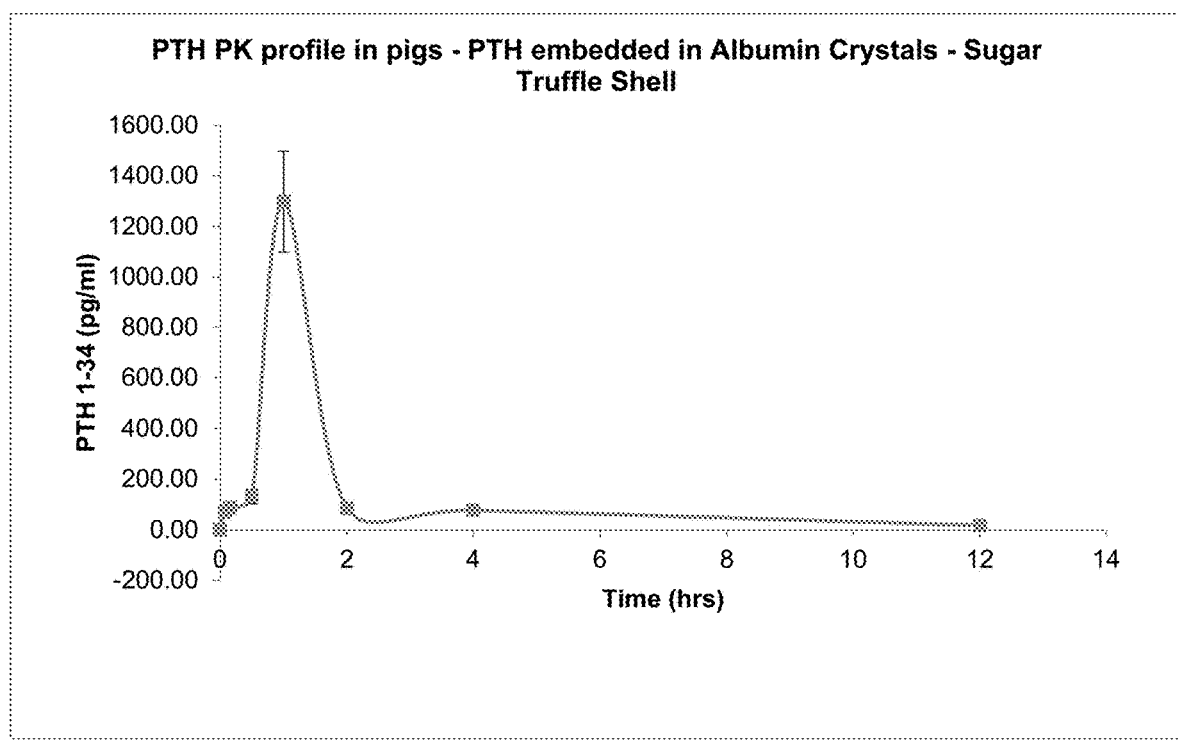
FIG. 14 PTH – Pharmacokinetic Profile of PTH Embedded in Albumin Crystals – Sugar Truffle Shell Form Buccal/Sublingual Delivery in Pigs

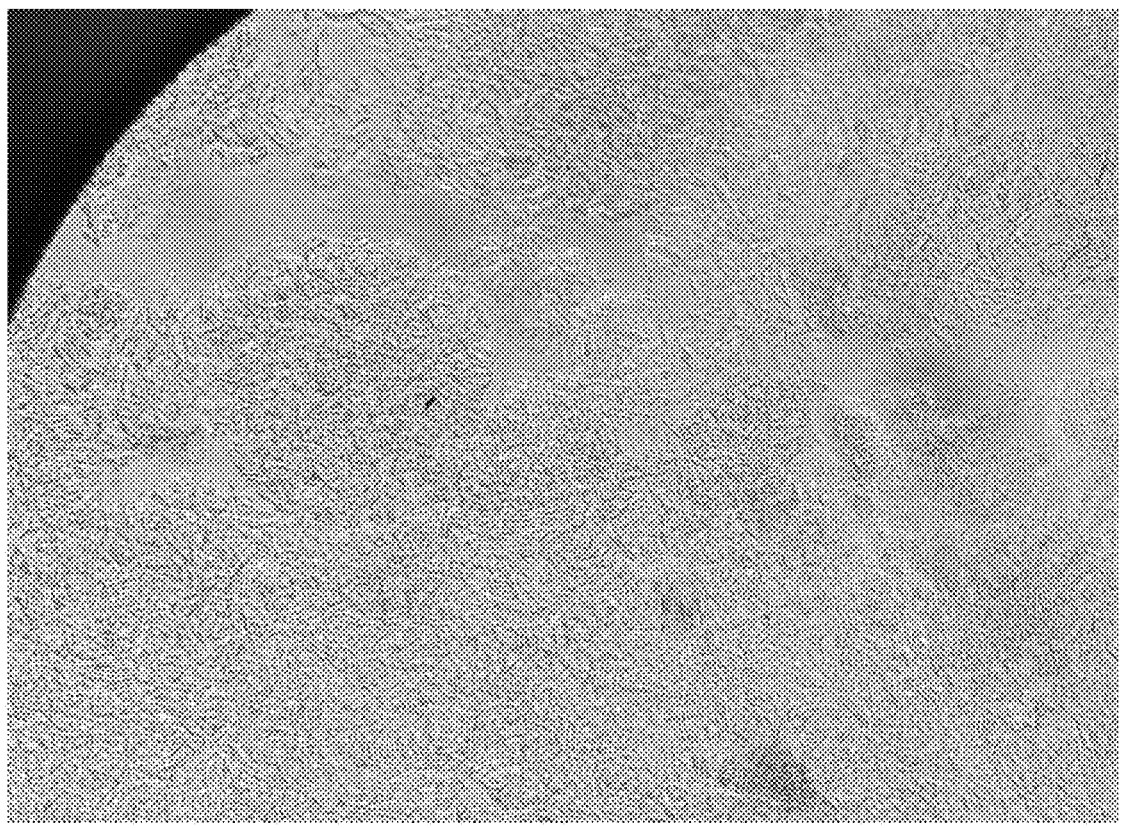
FIG. 15 Albumin Crystals with Trapped Human Growth Hormone

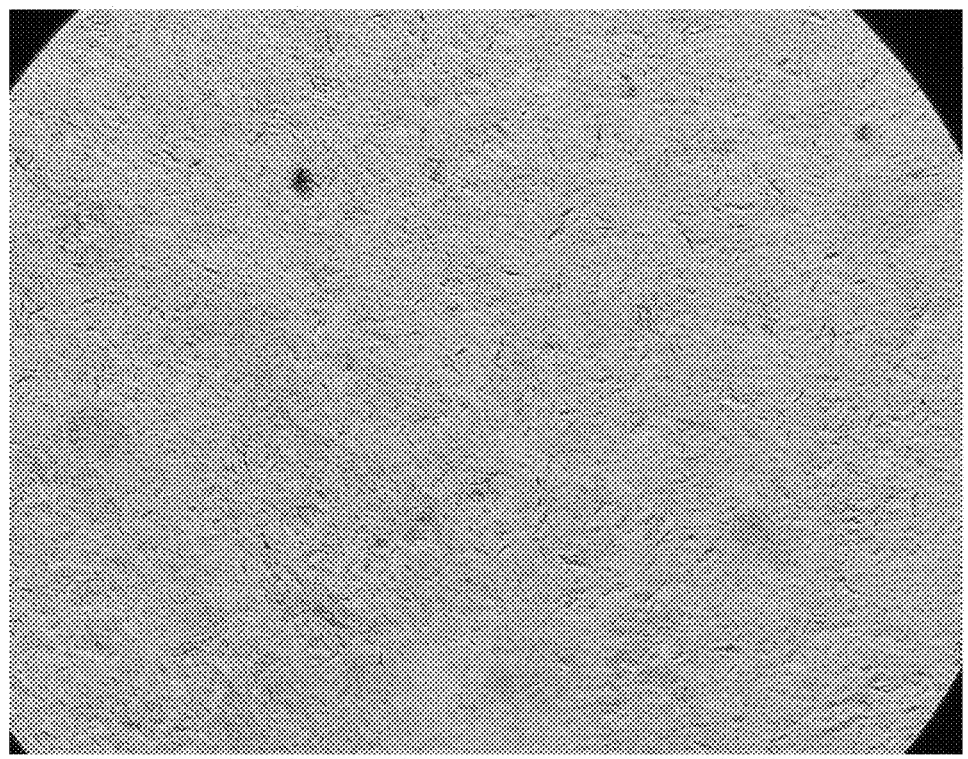
FIG. 16 Albumin Crystals with Trapped Adalimumab

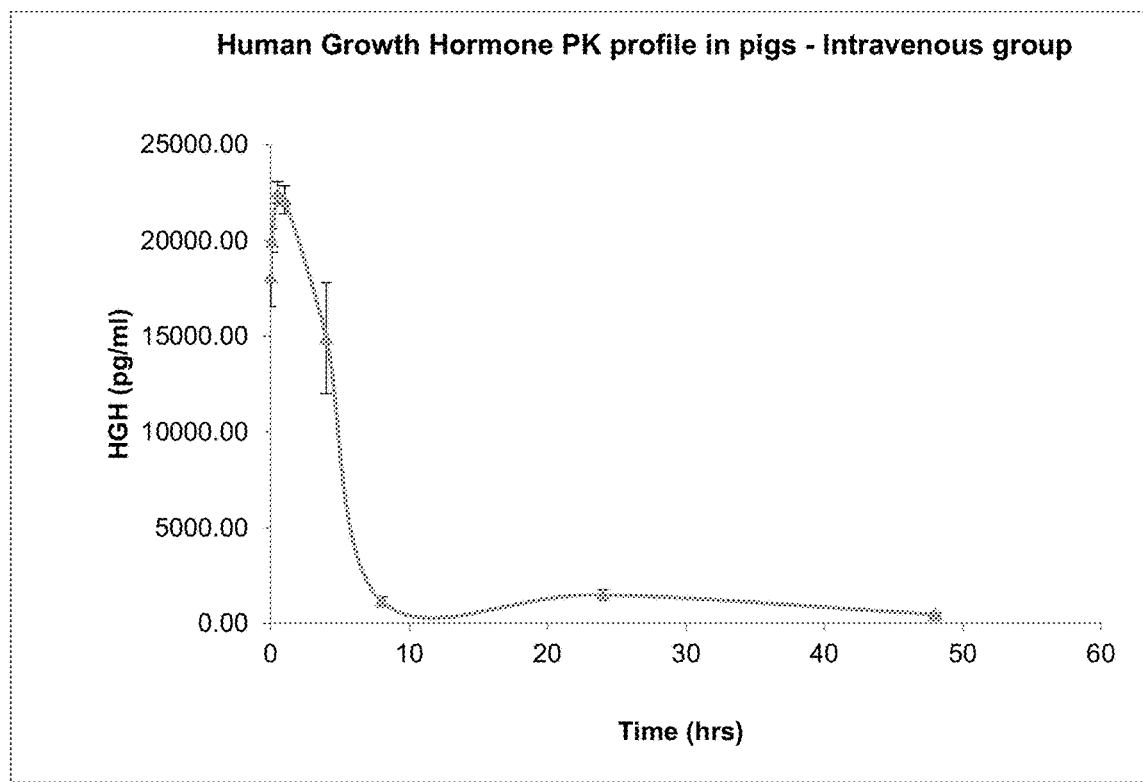
FIG. 17 Human Growth Hormone – Pharmacokinetic Profile of Intravenous Injection in Pigs

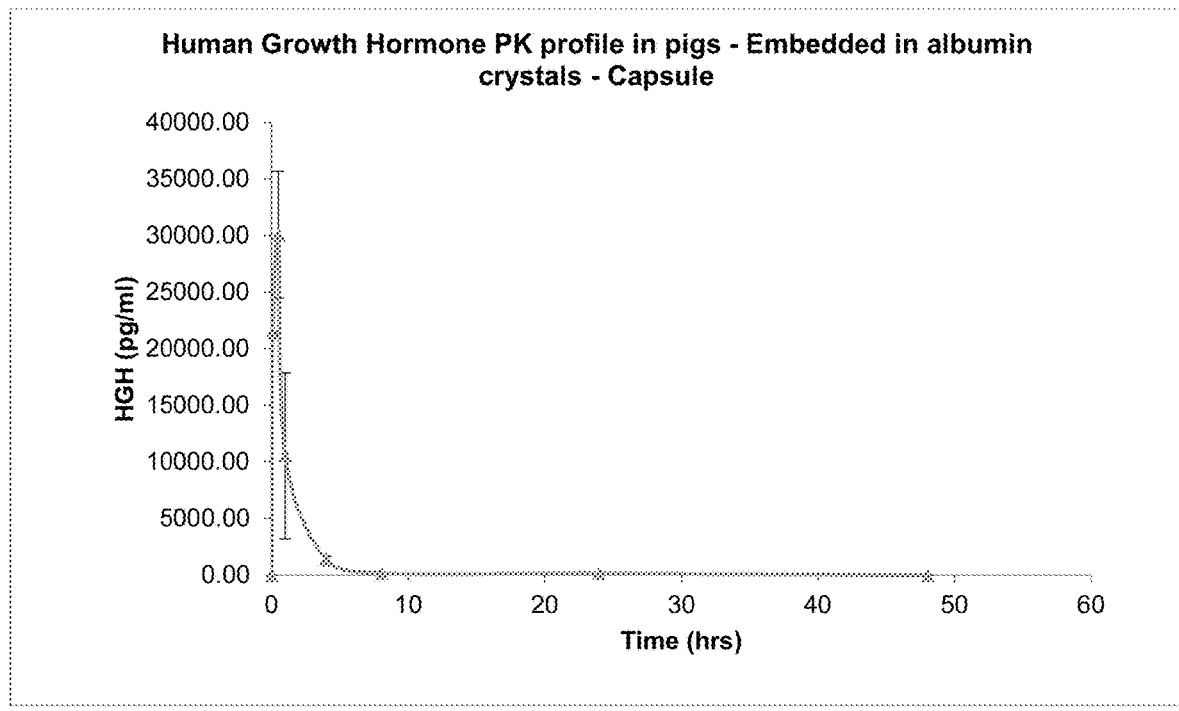
FIG. 18 Human Growth Hormone – Pharmacokinetic Profile of Human Growth Hormone Embedded in Albumin Crystals – Capsule Form Gut Delivery in Pigs

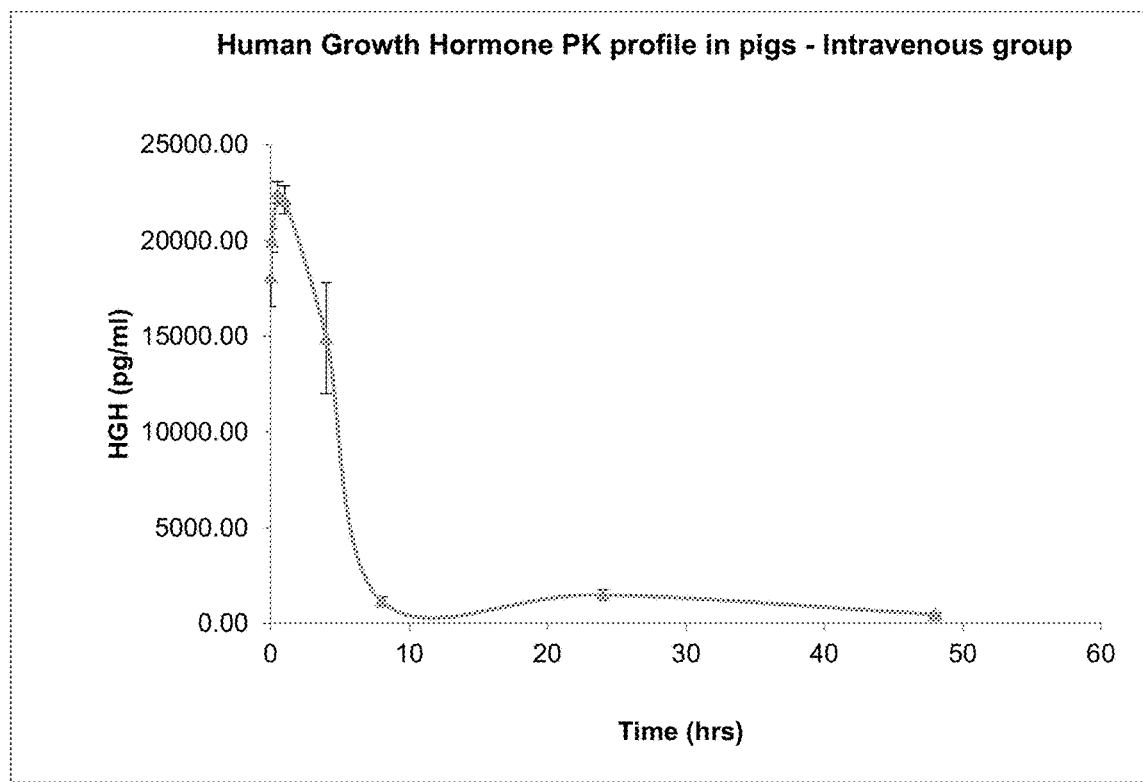
FIG. 19 Human Growth Hormone – Pharmacokinetic Profile of Intravenous Injection in Pigs

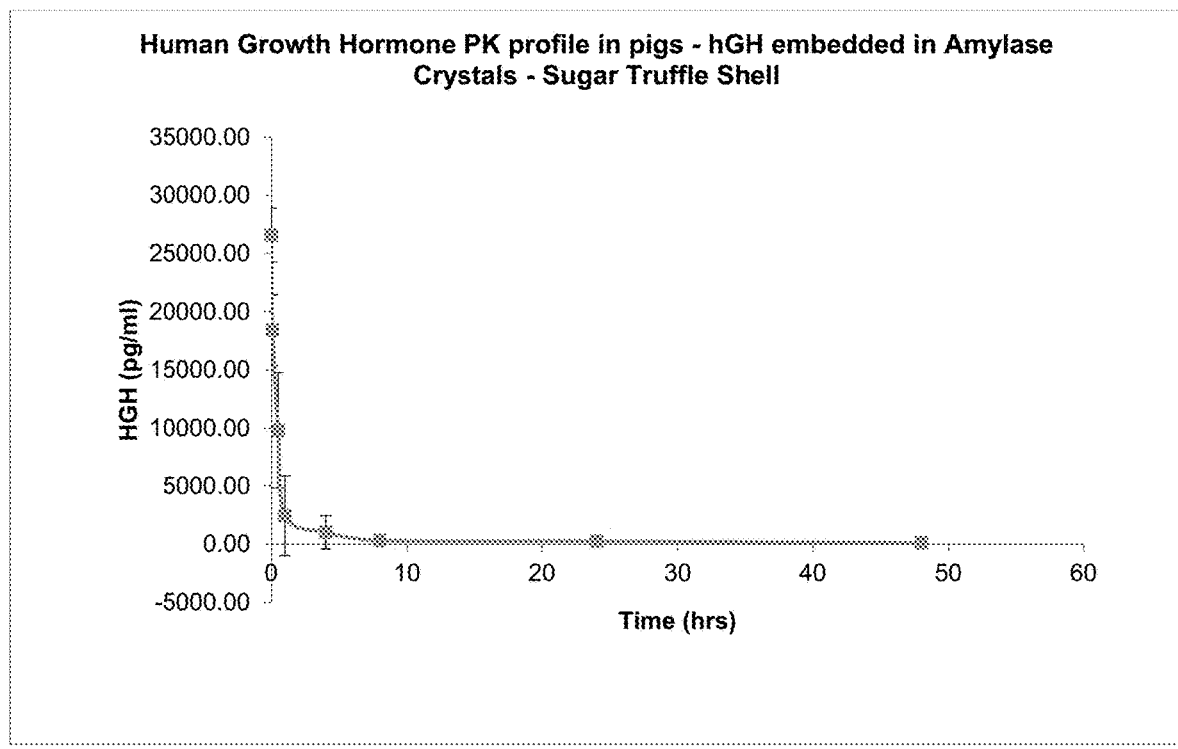
FIG. 20 Human Growth Hormone – Pharmacokinetic Profile of Human Growth Hormone Embedded in Albumin Crystals – Sugar Truffle Shell Form Buccal/Sublingual Delivery in Pigs

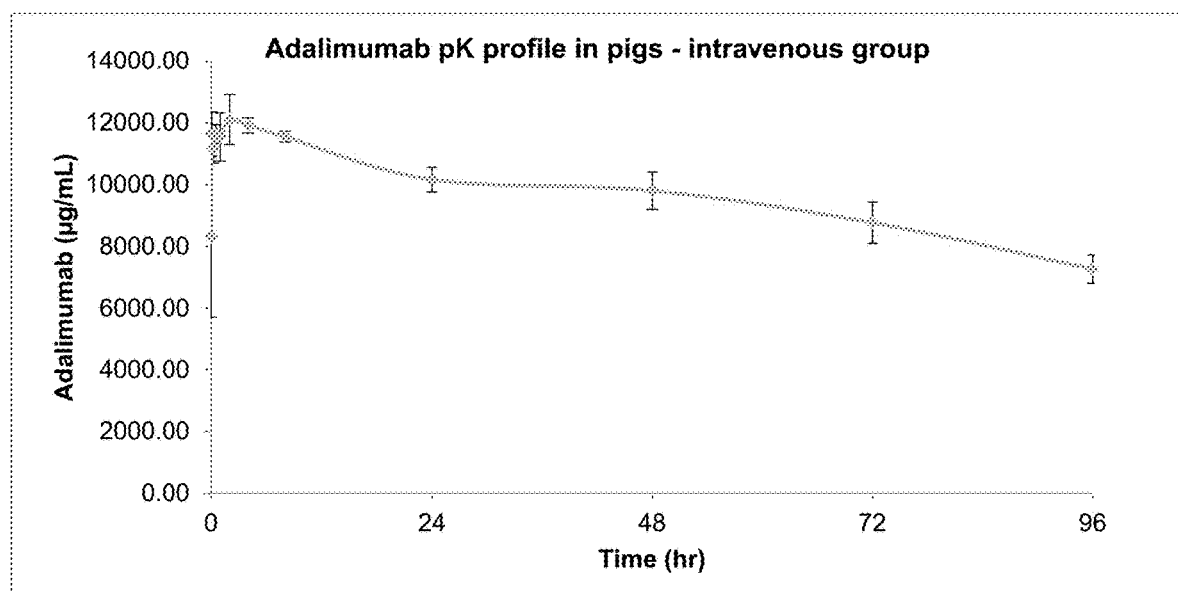
FIG. 21 Adalimumab – Pharmacokinetic Profile of Intravenous Injection in Pigs

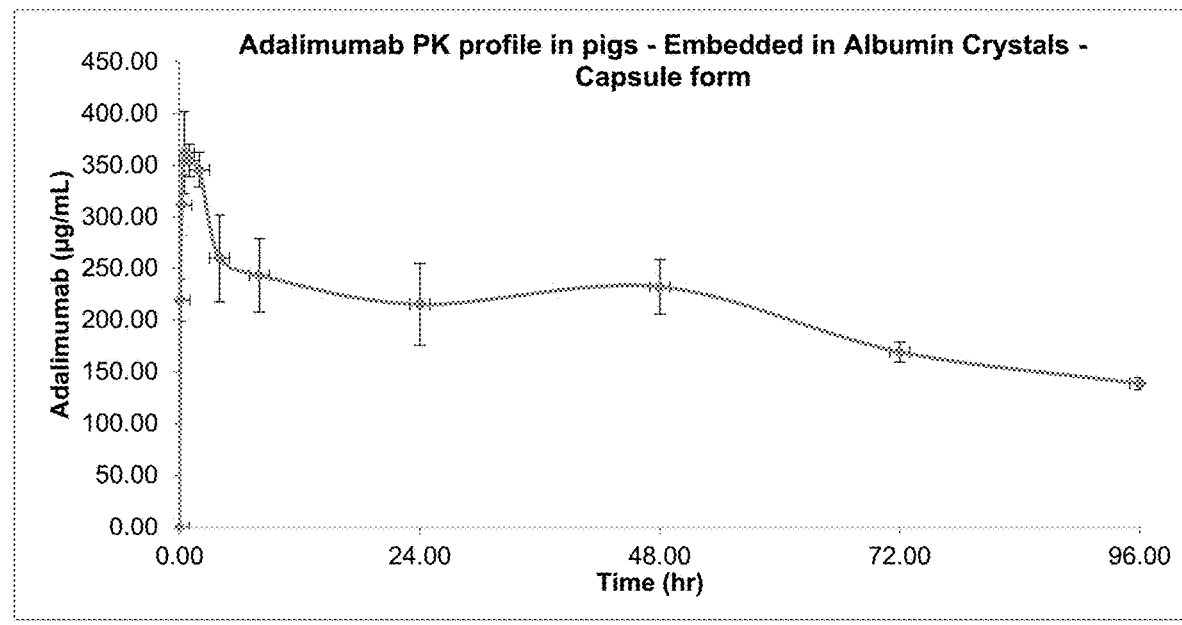
FIG. 22 Adalimumab – Pharmacokinetic Profile of Adalimumab Embedded in Albumin Crystals – Capsule Form Gut Delivery in Pigs

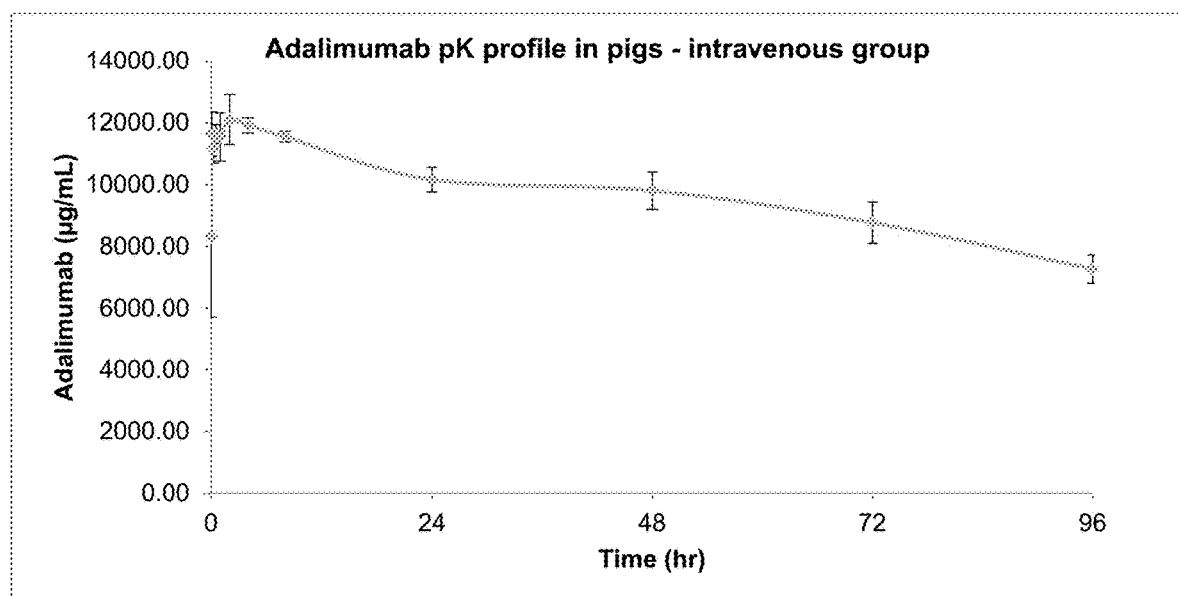
FIG. 23 Adalimumab – Pharmacokinetic Profile of Intravenous Injection in Pigs

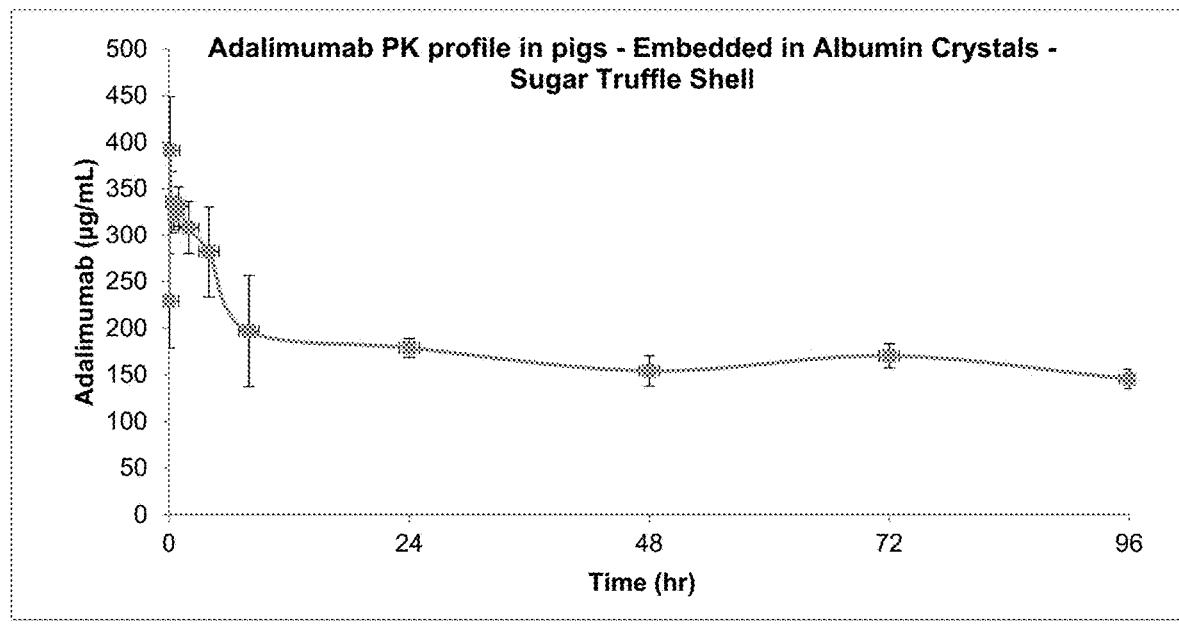
FIG. 24 Adalimumab – Pharmacokinetic Profile of Adalimumab Embedded in Albumin Crystals – Sugar Truffle Shell Form Buccal/Sublingual Delivery in Pigs

POLYPEPTIDE FORMULATIONS FOR ORAL DELIVERY

CROSS-REFERENCE TO RELATED APPLICATION

This application claims priority to Indian Application No. 202241058759, filed Oct. 14, 2022 and Indian Application No. 202341022184, filed Mar. 27, 2023, the entirety of each of which is incorporated herein by reference.

BACKGROUND

Polypeptide therapeutics play an important role in medicine. Many current therapeutics include polypeptides such as enzymes, hormones, and antibodies. A typical route of administration for polypeptide therapeutics is intravenous or subcutaneous injection. Crystallization of polypeptides presents certain challenges. For example, a new set of Crystallization conditions need to be developed for each polypeptide, which is inconvenient and labor-intensive. Such challenges greatly burden the development of polypeptide formulations.

SUMMARY

The present disclosure provides, among other things, technologies (e.g., methods and compositions) for the administration (e.g., oral administration) of polypeptides, specifically including therapeutic polypeptides (e.g., antibody agents, enzymes, hormones, etc.).

The present disclosure provides the surprising finding that certain formulations of polypeptides, e.g., specifically formulations of crystalline or amorphous polypeptides, can achieve effective systemic delivery of the polypeptides via oral administration of the formulations. Thus, the present disclosure provides, among other things, polypeptide formulations for oral delivery. In many embodiments, provided formulations comprise or otherwise utilize a polypeptide (e.g., a therapeutic polypeptide) in a crystalline (i.e., crystallized) or amorphous form.

The present disclosure encompasses an insight that during a process of crystallizing a carrier polypeptide composition, an active polypeptide composition can be embedded in such carrier polypeptide composition, thereby creating a composition comprising both a carrier polypeptide composition and an active polypeptide composition. In some embodiments, a carrier polypeptide and an active polypeptide form a co-crystal during crystallization. In some embodiments, such composition comprising both a carrier polypeptide composition and an active polypeptide composition (e.g., a co-crystal of carrier polypeptide composition and an active polypeptide composition) is amenable for formulation.

In some embodiments, conditions for crystallizing carrier polypeptide compositions can be used to embed a wide range of different active polypeptide compositions. Those skilled in the art will appreciate that methods and compositions provided by the present disclosure circumvent the need to develop crystallization methods for each active polypeptide composition and greatly improve the efficiency of developing polypeptide formulations.

In many embodiments, the present disclosure provides oral formulations that comprise (1) a carrier polypeptide composition; (2) an active polypeptide composition; and optionally (3) a pharmaceutically acceptable carrier.

In some embodiments, a carrier polypeptide composition co-exists with an active polypeptide composition. In some embodiments, an active polypeptide composition is embedded in a carrier polypeptide composition. In some embodiments, a carrier polypeptide composition is embedded in an active polypeptide composition.

In some embodiments, a carrier polypeptide composition and an active polypeptide composition are each independently amorphous polypeptide composition or a crystallized polypeptide composition (e.g., a powder form that includes amorphous polypeptide or crystallized polypeptide). In some embodiments, a carrier polypeptide composition is an amorphous composition and an active polypeptide composition is a crystallized composition. In some embodiments, a carrier polypeptide composition is a crystallized composition and an active polypeptide composition is an amorphous composition. In some embodiments, a carrier polypeptide composition is a crystallized composition and an active polypeptide composition is crystallized composition. In some embodiments, a carrier polypeptide composition is an amorphous composition and an active polypeptide composition is an amorphous composition. In some embodiments, a carrier polypeptide composition and an active polypeptide composition form a co-crystal.

In many embodiments, a carrier polypeptide composition and an active polypeptide composition of provided formulations each independently are or comprise a polypeptide (e.g., a therapeutic polypeptide) in a non-liquid phase—e.g., such formulations may be gels, solids, suspensions (e.g., of solid particles), etc.

In some embodiments, a polypeptide formulation is or comprises a truffle formulation. In some embodiments, a truffle formulation comprises a pharmaceutically acceptable shell and a core that comprises (1) a carrier polypeptide composition and (2) an active polypeptide composition (e.g., a powder form that includes amorphous polypeptide or crystallized polypeptide); and (3) optionally a pharmaceutically acceptable carrier.

In some embodiments, a polypeptide formulation is or comprises a tablet formulation that comprises (1) a carrier polypeptide composition; (2) an active polypeptide composition (e.g., a powder form that includes amorphous polypeptide or crystallized polypeptide); and (3) a pharmaceutically acceptable carrier.

In some embodiments, a polypeptide formulation is or comprises a globule formulation that comprises (1) a carrier polypeptide composition; (2) an active polypeptide composition (e.g., a powder form that includes amorphous polypeptide or crystallized polypeptide); and (3) a pharmaceutically acceptable carrier.

In some embodiments, a polypeptide formulation is or comprises a candy formulation that comprises (1) a carrier polypeptide composition; (2) an active polypeptide composition (e.g., a powder form that includes amorphous polypeptide or crystallized polypeptide); and (3) a pharmaceutically acceptable carrier.

In some embodiments, a polypeptide formulation is or comprises a capsule formulation that comprises (1) a carrier polypeptide composition; (2) an active polypeptide composition (e.g., a powder form that includes amorphous polypeptide or crystallized polypeptide); and (3) a pharmaceutically acceptable carrier. In some embodiments, a pharmaceutically acceptable carrier of a provided capsule formulation comprises a vitamin E agent.

The present disclosure includes the surprising discovery that oral administration of formulations disclosed herein, e.g., of truffle, tablet, globule, candy, and/or capsule formulations as described herein can successfully deliver polypeptides to the bloodstream. The present disclosure further includes the surprising discovery that polypeptides orally administered in a formulation as disclosed herein e.g., a truffle formulation, a tablet formulation, a globule formulation, a candy formulation, a capsule formulation are efficiently delivered to the bloodstream, lymphatic system, and thoracic duct.

Advantages of formulations provided herein include that they can effectively deliver a wide range of polypeptides (e.g., of therapeutic polypeptides, such as antibody agents, enzymes, hormones, etc.) to the bloodstream after oral administration of such formulations. Thus, provided technologies have broad applicability and offer a new platform for polypeptide formulation. Upon reading the present disclosure, those skilled in the art will appreciate its generality and applicability to any or all polypeptides of interest.

The present disclosure demonstrates unexpectedly advantageous characteristics of provided formulations, including, in some embodiments, effectiveness in one or more of various modes of oral administration, e.g., buccal or sublingual administration. Indeed, the present disclosure documents that provided formulations can achieve desirable pharmacokinetic properties, including, for example, one or more of rate of delivery into the bloodstream, increased half-life, etc., and in some embodiments can achieve such properties via one or more of such oral administration modes.

In some embodiments, the present disclosure provides polypeptide formulations for oral delivery, which formulations include (1) a carrier polypeptide composition; (2) an active polypeptide composition; and optionally (3) a pharmaceutically acceptable carrier, optionally wherein the formulation is a truffle formulation comprising a core and a pharmaceutically acceptable shell, wherein the core comprises (1) a carrier polypeptide composition and (2) an active polypeptide composition (e.g., a powder form that includes amorphous polypeptide or crystallized polypeptide).

In some embodiments, the present disclosure provides polypeptide formulations for oral delivery that are tablet polypeptide formulations, which tablet polypeptide formulation comprises (1) a carrier polypeptide composition; (2) an active polypeptide composition (e.g., a powder form that includes amorphous polypeptide or crystallized polypeptide); and (3) a pharmaceutically acceptable carrier.

In some embodiments, the present disclosure provides polypeptide formulations for oral delivery, which formulations are globule formulations that comprise (1) a carrier polypeptide composition; (2) an active polypeptide composition (e.g., a powder form that includes amorphous polypeptide or crystallized polypeptide); and (3) a pharmaceutically acceptable carrier.

In some embodiments, the present disclosure provides polypeptide formulations for oral delivery, which formulations are candy formulations that comprise (1) a carrier polypeptide composition; (2) an active polypeptide composition (e.g., a powder form that includes amorphous polypeptide or crystallized polypeptide); and (3) a pharmaceutically acceptable carrier, optionally wherein the candy formulation is in a form, for example, of candy gems, chewing gum, gummy candy, hard candy (e.g., drops, lollipops, lozenges, rock candy, stick candy, etc.) marshmallows, syrup, toffee, etc. In some embodiments, a candy formulation may be in the form of a drop, film, gel, patch, spray, wafer, etc.

In some embodiments, a provided formulation may be in the form of a dry powder (e.g., a dry spray). In some embodiments, a provided formulation may be in the form of a solid particle suspension. In some embodiments, a provided formulation may be in the form of a fast-dissolving tablet. In some embodiments, a provided formulation may be in the form of a fast-dissolving film.

In some embodiments, the present disclosure provides polypeptide formulations for oral delivery, which formulations are capsule formulations that comprise (1) a carrier polypeptide composition; (2) an active polypeptide composition (e.g., a powder form that includes amorphous polypeptide or crystallized polypeptide); and (3) a pharmaceutically acceptable carrier, optionally wherein a pharmaceutical acceptable carrier comprises a Vitamin E agent.

In certain embodiments, a provided polypeptide formulation comprises about 1 mg to about 2,000 mg of a vitamin E agent, optionally where a provided polypeptide formulation comprises about 1 mg to about 1,000 mg, about 1 mg to about 500 mg, about 1 mg to about 400 mg, about 1 mg to about 300 mg, about 1 mg to about 200 mg, about 1 mg to about 100 mg, about 1 mg to about 50 mg, or about 1 mg to about 25 mg of a vitamin E agent. In certain embodiments, a provided polypeptide formulation comprises a molar excess or excess by weight of a vitamin E agent relative to the amount of active polypeptide in the polypeptide formulation, optionally where in the excess is a fold excess of at least 1.1, 1.5, 2, 3, 4, 5, 6, 7, 8, 9, 10, 20, 30, 40, 50, 60, 70, 80, 90, 100, 500, or 1,000 fold.

In some embodiments, the present disclosure provides methods of delivering a polypeptide to the bloodstream of a subject, the method comprising a step of orally administering to the subject a polypeptide formulation (1) a carrier polypeptide composition; (2) an active polypeptide composition; and optionally (3) a pharmaceutically acceptable carrier. In some embodiments, an administered formulation is or comprises a truffle formulation, optionally wherein a truffle formulation comprises a pharmaceutically acceptable shell and a core that comprises (1) a carrier polypeptide composition and (2) an active polypeptide composition (e.g., a powder form that includes amorphous polypeptide or crystallized polypeptide). In some embodiments, an administered formulation is or comprises a globule formulation. In some embodiments, an administered formulation is or comprises a tablet formulation. In some embodiments, an administered formulation is or comprises a candy formulation. In some embodiments, an administered formulation is or comprises a capsule formulation, optionally a pharmaceutical acceptable carrier comprises a Vitamin E agent.

In some embodiments, the present disclosure provides methods of producing a truffle formulation for oral delivery, the method comprising a step of placing within a pharmaceutically acceptable shell a core comprising (1) a carrier polypeptide composition; (2) an active polypeptide composition (e.g., a powder form that includes amorphous polypeptide or crystallized polypeptide).

In some embodiments, the present disclosure provides methods of producing a polypeptide formulation for oral delivery, the method comprising a step of mixing (1) a carrier polypeptide composition; (2) an active polypeptide composition (e.g., a powder form that includes amorphous polypeptide or crystallized polypeptide); and (3) a pharmaceutically acceptable carrier. In some embodiments, a formulation produced by a provided method is or comprises a tablet formulation. In some embodiments, a formulation produced by a provided method is or comprises a globule formulation.

In some embodiments, the present disclosure provides methods of producing a candy formulation for oral delivery, the method comprising a step of mixing (1) a carrier polypeptide composition; (2) an active polypeptide composition (e.g., a powder form that includes amorphous polypeptide or crystallized polypeptide); and (3) a pharmaceutically acceptable carrier, optionally wherein a pharmaceutically acceptable carrier comprises food ingredients, e.g., chocolate, cocoa, milk, milk product, natural dye, artificial dye, gum base, flavors, sweeteners, gelatin, starch, syrup, citric acid, sugar, etc.

In some embodiments, a carrier polypeptide composition and an active polypeptide composition of a provided formulation (e.g., truffle, globule, tablet, candy, capsule, etc.) are produced together in a crystallization process. In some embodiments, a carrier polypeptide composition and an active polypeptide composition of a provided formulation (e.g., truffle, globule, tablet, candy, capsule, etc.) are produced together during a process of crystallizing a carrier polypeptide composition, wherein an active polypeptide composition is embedded in a carrier polypeptide composition in such process.

In certain embodiments, an active polypeptide composition amenable to formulation as described herein may be or comprise a therapeutic polypeptide. In some embodiments an active polypeptide composition amenable to formulation as described herein may be or comprise, for example (i) an antibody agent (e.g., a monoclonal antibody, a bispecific antibody, etc.) or antigen-binding portion thereof; (ii) a fusion polypeptide; (iii) an immunoglobulin; (iv) an enzyme; (v) a hormone; (vi) a cytokine; or (vi) an analog or combination of any of the foregoing. In some embodiments, an active polypeptide composition amenable to formulation as described herein may include one or more covalent modifications such as, for example, one or more of acetylation, acylation, amidation, fatty acids, glycation, glycosylation, lipidation, mannosylation, methylation, nitrosylation, phosphorylation, sulfation, palmitoylation, pegylation, prenylation, or a combination thereof.

In certain embodiments, a carrier polypeptide composition amenable to formulation as described herein may be or comprise a therapeutic polypeptide. In some embodiments a carrier polypeptide composition amenable to formulation as described herein may be or comprise, for example (i) an antibody agent (e.g., a monoclonal antibody, a bispecific antibody, etc.) or antigen-binding portion thereof; (ii) a fusion polypeptide; (iii) an immunoglobulin; (iv) an enzyme; (v) a hormone; (vi) a cytokine; or (vi) an analog or combination of any of the foregoing. In some embodiments, a carrier polypeptide composition amenable to formulation as described herein may include one or more covalent modifications such as, for example, one or more of acetylation, acylation, amidation, fatty acids, glycation, glycosylation, lipidation, mannosylation, methylation, nitrosylation, phosphorylation, sulfation, palmitoylation, pegylation, prenylation, or a combination thereof.

In certain embodiments, a carrier polypeptide composition amenable to formulation as described herein may be or comprise a non-therapeutic polypeptide. In certain embodiments, a carrier polypeptide composition amenable to formulation as described herein may be or comprise a non-therapeutic polypeptide which is otherwise beneficial to therapeutic outcome when utilized in combination of a provided active polypeptide composition.

In various embodiments, a carrier polypeptide composition comprises or is, for example, selected from antibodies, contractile proteins, enzymes, hormonal proteins, structural proteins, storage proteins, and transport protein, or combinations thereof.

In some embodiments, a carrier polypeptide composition comprises or is, for example, selected from albumins, gluten, globulins, glutenin, prolamin, legumin, vicillin, glycinin, conglycinin, gliadins, myoglobulins, collagen, elastin, myosin, actin, tropomysin, troponin, alpha, beta and kappa caseins, alpha and beta zein, convicillin, gelatin, ovalbumin, sericin, fibroin, beta lactoglobulin, glutelins, helianthinin, immunoglobulins, ovomucoid, ovomucin lysozyme, or ovotransferrin, or a combination thereof.

In some embodiments, a carrier polypeptide composition comprises or is amylase. In some embodiments, a carrier polypeptide composition comprises or is albumin.

Among other contributions, the present disclosure provides an insight that provided formulations include a polypeptide component (e.g., a carrier polypeptide composition, an active polypeptide composition) that, in some embodiments, is a single polypeptide that is in a crystallized or amorphous form. Alternatively, in some embodiments, a polypeptide in a provided formulation (e.g., a carrier polypeptide, an active polypeptide) is a combination of two or more polypeptides; in some such embodiments, all such polypeptides are in a crystalline or amorphous form but in some embodiments, not all polypeptides in such polypeptide component need to be crystalline. That is, in some embodiments, less than all of the polypeptides in a polypeptide component of a provided formulation are crystalline. Without wishing to be bound by any particular theory, the present disclosure proposes that one (or more than one) polypeptide in a polypeptide component can act as a crystallization carrier with respect to one (or more than one) other polypeptide in the component.

In certain embodiments, a polypeptide component of a provided formulation is or comprises a polypeptide is selected from, for example, Abaloparatide (Tymlos), Adlyxin Lixisenatide®, Afamelanotide Scenesse®, Angiotensin II (Giapreza), Angiotension 11 antagoist, Anidulafungin, Atosiban, Aviptadil, Belantamab mafodotin-blmf (Blenrep™), Bentiromide, Beta-endorphin, Bivalirudin, Bradykynin, Bremelanotide Vyleesi®, Bursin, Calcitonin, Capreomycin, Carbetocin, Carfilzomib, Caspofungin, Ceruletide, Cholecystokynin, Cu-DOTATATE (Detectnet™), Dalbavancin, Daptomycin, Degarelix, Dulaglutide, Edotreotide, Edotreotide gallium Ga-68, Enfortumab Vedotin-Ejfv PADCEV®, Enfuvirtide, Etelcalcetide (Parsabiv), Exenatide, Ga DOTA-TOC, gallium Ga-68, Ga-PSMA-11, Glatiramer acetate, Glatiramer, Glucagon, Gonadorelin, Goserelin, Goserilin, Gramicidin, Human growth hormone, Icatibant, Imcivree™, Insulin degludec Tresiba®, Interferons, Interferon Alfa-2a, Recombinant, Interferon alfacon-1, Interferon Alfa-2b, Recombinant, Interferon beta-1b, Interferon beta-1a, Interferon alfa-n3, Interferon alfa-n1, Interferon gamma-1b, Peginterferon alfa-2b, Peginterferon alfa-2a, Insulin, Ixazomib Ninlar®, Lanreotide, Leuprorelin, Leuprotide, Linaclotide, Liraglutide, Lu DOTA-TATE Lutathera®, Lumasiran (Oxlumo™), Lupkynis™, LUPRON DEPOT, Lutetium Lu 177 dotatate4, Macimorelin (Macrilen), Micafungin, Mifamurtide, Mycappsa®, Scenesse®, Nesiritide, Octreotide, Oritavancin, Oxytocin, Pasireotide, Plecanatide Trulance®, Polatuzumab Vedotin-Piiq Polivy®, Pramlintide, Romidepsin, Voclosporin, Romiplostim, Rybelsus®, Sandostatin, Secretin human, Semaglutide, Sermorelin, Setmelanotide (Imcivree™), Somatuline, Taltirelin, Teduglutide, Telavancin, Teriparatide, Terlipressin, Tetracosactide, Bacitracin, Vancomycin, Thymalfasin, Mecasermin, Cetrorelix, Vasopressin, Victoza, Viltolarsen (Viltepso™), Vyleesi®, Zegalogue, Ziconotide, Lupkynis™ Zoladex, Desmopressin. Insulin degludec Tresiba®, Ixazomib Ninlar®, Macimorelin Macrilen®, 177Lu DOTA-TATE Lutathera®, 68Ga DOTA-TOC, Insulin recombinant, Exentide (Byetta), Lancreotide (Somatuline), Pramilintide (Symlin), Etanercept, Bevacizumab, Rituximab, Infliximab, Trastuzumab, Insulin glargine, Epoetin alfa, Darbepoetin alfa, Epoetin beta, Pegfilgrastim, Ranibizumab, Insulin aspart, Rhu insulin, Octocog alfa, Insulin lispro, Cetuximab, Eptacog alfa, Onabotulinumtoxin A, Filgrastin, Insulin detemir, Natalizumab, nsulin (humulin), Palivizumab, Bleomycin, Bortezomib Blenoxane, Buserelin, Carfilzomib, Cobicistat, Corticotropin, Cosyntropin, Cyclosporia, Dactinomycin, Depreotide, Eptifibatide, Ganirelix, Glutathion, Histrelin, Leuprolide, Lucinactant, Lypressin, Nafarelin, Pentagastrin, Pentetreotide, Polymyxin B, Protirelin, Saralasin, Secretin porcine, Sincalide, Somatorelin, Somatostatin, Teicoplanin, Triptorelin, Urofollitropin, Abarelix, Pegvisomant, Somatropin recombinant, Lutropin alfa, Follitropin beta, Menotropins, Thyrotropin Alfa, Choriogonadotropin alfa, Aldesleukin, Coagulation Factor IX, Antihemophilic Factor, Eptifibatide, Exenatide Bydureon, Lepirudin, Angiotensin 1-7, Boceprevir Victrelis, Kyprolis, Ciclosporin Ikervis, Ciclosporin Verkazia, Dalbavancin Xydalba, Lutetium (177Lu) oxodotreotide Lutathera, Ombitasvir (paritaprevir and ritonavir) Viekirax, Televancin Vibativ, Avexitide, Calcitonin gene-related peptide, Corticorelin, Leptin, Aclerastide, Albusomatropin, Anamorelin, G17DT, Insulin peglispro, Lenomorelin, Selepressin, Somapacitan, Taspoglutide, Thymosin beta-4, Tirzepatide, Ularitide, Vosoritide, Zoptarelin doxorubicin, Bombesin, Cenderitide, Deslorelin, Gastric inhibitory polypeptide, MK-3207, Olcegepant, Pancreatic Polypeptide, Peptide YY (3-36), Pirnabine, Somatoprim, TT-232, BPI-3016, NBI-6024, Albiglutide, Taltirelin hydrate, Tesamorelin, Peginesatide, Cyclosporin A, Chiasma, Plecanotide, Colistin sulfate, Tyrothricin, Pancrelipase, Tilactase, Sacrosidase, Diamine oxidase, NOBEX insulin by the Palmitoylatios, Thymopentin, β-LGDP, PTH1-34, BSA, sCT, hGH, BSM, Captopril, Enfurvitide, Streptokinase, Dolcanatide, Efpeglenation-Sanofi, MEDI4166-Astra Zeneca, or PF-06836922(MOD-4023)-Pfizer, or derivative variant thereof, optionally where the polypeptide is natural, synthetic, or engineered.

In certain embodiments, a polypeptide amenable to formulation as described herein (e.g., a carrier polypeptide composition, an active polypeptide composition) has a molecular weight between about 100 Da and about 25 kDa, optionally where the molecular weight is between about 100 Da and about 1 kDa, about 100 Da and about 2 kDa, about 100 Da and about 3 kDa, about 100 Da and about 4 kDa, about 100 Da and about 5 kDa, about 100 Da and about 10 kDa, about 100 Da and about 15 kDa, or about 100 Da and about 20 kDa. In certain embodiments, a polypeptide has a molecular weight between about 25 kDa and about 1,000 kDa, optionally where the molecular weight is between about 25 kDa and about 500 kDa, about 100 kDa and about 500 kDa, about 120 kDa and about 250 kDa, or about 150 kDa and about 300 kDa.

In certain embodiments, a polypeptide formulation provided herein includes about 1 µg to about 2,000 mg of carrier polypeptide (e.g., of a carrier polypeptide composition, which may, in some embodiments, be a single polypeptide) or active polypeptide (e.g., of an active polypeptide composition, which may, in some embodiments, be a single polypeptide), optionally where the polypeptide formulation includes about 1 µg to about 1,000 mg, about 1 µg to about 500 mg, about 1 µg to about 400 mg, about 1 µg to about 300 mg, about 1 µg to about 200 mg, about 1 µg to about 100 mg, about 1 µg to about 50 mg, about 1 µg to about 25 mg, about 1 µg to about 20 mg, about 1 µg to about 15 mg, about 1 µg to about 10 mg, about 1 µg to about 5 mg, about 1 µg to about 1 mg, about 1 µg to about 500 µg, about 1 µg to about 250 µg, about 1 µg to about 200 µg, about 1 µg to about 150 µg, about 1 µg to about 100 µg, about 1 µg to about 50 µg, about 1 mg to about 1,000 mg, about 1 mg to about 500 mg, about 1 mg to about 400 mg, about 1 mg to about 300 mg, about 1 mg to about 200 mg, about 1 mg to about 100 mg, about 1 mg, to about 50 mg, about 1 mg to about 25 mg of carrier polypeptide (e.g., of a carrier polypeptide composition, which may, in some embodiments, be a single polypeptide) or active polypeptide (e.g., of an active polypeptide composition, which may, in some embodiments, be a single polypeptide).

In certain embodiments, a provided formulation includes crystals of polypeptide (e.g., those in a carrier polypeptide composition, those in an active polypeptide composition) having an average particle size of less than 25 microns, e.g., less than 20, 15, 10, 5, 4, 3, 2, 1, or 0.5 microns, optionally where the crystals of polypeptide have an average particle size that is between 0.5 microns and 1, 2, 3, 4, 5, 10, 15, 20, or 25 microns or where the crystals of polypeptide have an average particle size that is between 1 micron and 1, 2, 3, 4, 5, 10, 15, 20, or 25 microns.

In certain embodiments, a provided formulation includes amorphous polypeptide particles of polypeptide (e.g., those in a carrier polypeptide composition, those in an active polypeptide composition) having an average particle size of less than 25 microns, e.g., less than 20, 15, 10, 5, 4, 3, 2, 1, or 0.5 microns, optionally where the particles of polypeptide have an average particle size that is between 0.5 microns and 1, 2, 3, 4, 5, 10, 15, 20, or 25 microns or where such particles have an average particle size that is between 1 micron and 1, 2, 3, 4, 5, 10, 15, 20, or 25 microns.

In certain embodiments, a carrier polypeptide composition of a provided polypeptide formulation includes lyophilized polypeptide. In certain embodiments, a carrier polypeptide composition of a provided polypeptide formulation includes microcrystals of polypeptide. In certain embodiments, a carrier polypeptide composition of a provided polypeptide formulation includes a powder including crystallized polypeptide.

In certain embodiments, an active polypeptide composition of a provided polypeptide formulation includes lyophilized polypeptide. In certain embodiments, an active polypeptide composition of a provided polypeptide formulation includes microcrystals of polypeptide. In certain embodiments, an active polypeptide composition of a provided polypeptide formulation includes a powder including crystallized polypeptide.

In certain embodiments, a core (e.g., of a truffle, tablet, or capsule formulation) is a viscous solution. In certain embodiments, such a core comprises crystallized carrier polypeptide composition. In certain embodiments, such a core comprises crystallized active polypeptide composition. In certain embodiments, a core comprises amorphous carrier polypeptide composition. In certain embodiments, a core comprises amorphous active polypeptide composition.

In certain embodiments, a shell (e.g., of a truffle, table, or a capsule formulation) is or comprises sugar. In certain embodiments, a shell is or comprises cane sugar. In certain embodiments, a shell is or comprises palm sugar. In certain embodiments, a shell is or comprises lactose. In certain embodiments, a shell is or comprises xylitol. In certain embodiments, a shell is or comprises milk sugar. In certain embodiments, a shell is cane sugar. In certain embodiments, a shell is palm sugar. In certain embodiments, a shell is hollow. In certain embodiments, a shell is hollow and a core is situated in empty space of a shell. In certain embodiments, a truffle formulation comprises a shell and a core, wherein a shell is hollow and a core is situated in empty space of a shell. In certain embodiments, a truffle shell is hollow and shell is fully filled with space of a core. In certain embodiments, a truffle shell is hollow and the shell is partially filled with space of a core.

In certain embodiments, a polypeptide formulation is formulated for delivery via the gut, optionally where a polypeptide formulation is a capsule. In certain embodiments, a polypeptide formulation is formulated for delivery via the stomach and/or intestine. In certain embodiments, a polypeptide formulation includes an enteric coating.

In certain embodiments, a provided polypeptide formulation, in addition to (1) a carrier polypeptide composition; (2) an active polypeptide composition; and optionally (3) a pharmaceutically acceptable carrier, comprises one or more excipients or additives selected from the group consisting of aggregation-reducing agents, sugars or sugar alcohols, polysaccharides, stabilizers, hyaluronidase, buffering agents, preservatives, carriers, antioxidants, chelating agents, natural or synthetic polymers, cryoprotectants, lyoprotectants, surfactants, bulking agents, acidifying agents, ingredients to reduce injection site discomfort, antifoaming agents, alkalizing agents, vehicles, aggregation inhibitors, solubilizing agents, tonicity modifiers, permeation enhancers, muco bioadhesive agents, and stabilizing agents and combinations thereof.

In certain embodiments, one or more excipients or additives are individually or cumulatively present in a provided formulation at a concentration between 0.1 mM and about 1,000 mM, between about 0.1 mM and about 500 mM, between about 0.1 mM and about 200 mM, or between about 0.1 mM and about 100 mM.

In certain embodiments, a provided formulation includes one or more aggregation-reducing agent(s)s, such as may be selected from the group consisting of nicotinic acid, caffeine citrate, caffeine nicotinate, caffeine, octyl-β-D-glucopyranoside, and n-dodecyl-β-D-maltoside and optionally in combination with one or more of arginine, tryptophan, histidine, proline, cysteine, methionine, β-alanine, Potassium Glutamate, Arginine Ethylester, lysine, aspartic acid, glutamic acid, glycine, DTPA (diethylenetriaminepentaacetic acid), EGTA (aminopolycarboxylic acid), EDTA (Ethylenediaminetetraacetic acid), hydroxy propyl beta (HP-Beta) cyclodextrins, hydroxy propyl gamma (HP-Gamma) cyclodextrins, sulfo-butyl ether (SBE) cyclodextrins, TMAO (trimethylamine N-oxide), trehalose, ethylene glycol, betaine, xylitol, sorbitol, 6-(N-(7-nitrobenz-2-oxa-1,3-diazol-4-yl)amino)hexanoic acid (NBD-X), methyl acetyl phosphate (MAP), citraconic anhydride, pyrophosphate, citrate, and combinations thereof.

Alternatively or additionally, in some embodiments, a provided formulation may include a tonicity modifier(s), for example which may be selected from the group consisting of arginine, cysteine, histidine, glycine, sodium chloride, potassium chloride, sodium citrate, saccharides such as sucrose, glucose, dextrose, glycerin or mannitol, and combinations thereof.

Alternatively or additionally, in some embodiments, a provided formulation may include an antioxidant(s), for example which may be selected from the group consisting of glycine, lysine, EDTA, DTPA, sorbitol, mannitol, ascorbic acid, ascorbyl palmitate, butylated hydroxyanisole, butylated hydroxytoluene, hypophosphorous acid, monothioglycerol, propyl gallate, sodium bisulfite, sodium formaldehyde sulfoxylate, sodium metabisulfite, sodium thiosulfate, sulfur dioxide, tocopherol, and combinations thereof.

Alternatively or additionally, in some embodiments, a provided formulation may include a lyoprotectant(s), for example which may be selected from the group consisting of sucrose, lactose, trehalose, dextran, erythritol, arabitol, xylitol, sorbitol, maltose, lactulose, maltulose, glucitol, maltitol, lactitol, isomaltulose and mannitol; amino acids, such as arginine or histidine or proline or glycine; lyotropic salts, such as magnesium sulfate; propylene glycol, glycerol, poly(ethylene glycol), or poly(propylene glycol); gelatin, dextrins, modified starch, carboxymethyl cellulose, and combinations thereof.

Alternatively or additionally, in some embodiments, a provided formulation may include a permeation enhancer(s), for example which may be selected from the group consisting of bile salts, e.g., tri-hydroxy salts sodium cholate, sodium glyco-cholate, sodium taurocholate and di-hydroxy salt, sodium deoxy cholate, sodium glyco-deoxy Cholate, sodium tauro-deoxy cholate; fatty acids, their salt and esters, e.g., oleic acid, lauric acid, cod liver oil extract, sodium laurate, sodium caprate, glyceryl monostearate, di-ethylene glycol mono ethyl ether and various sucrose fatty acid esters, medium-chain fatty acid glycerides, polycaprolactoneomega-3 fatty acids, lecithin (phosphatidylcholine), lysophosphatidylcholine; surfactants, e.g., sodium dodecyl (lauryl) sulphate, poly sorbates (polysorbate 80), laureths, brijs and benzalkonium chloride; complexing agents, e.g., cyclodextrins, dextran sulphate, dextran sulphate, sodium edetate; complexing agents, e.g., cyclodextrins, dextran sulphate, dextran sulphate, sodium edetate, co-solvents, e.g., ethanol and propylene glycol, combination of 1% oleic acid and 5%/10% polyethylene glycol 200, 2% glyceryl mono laurate and 40% alcohol, sodium caprate and alcohol or propylene glycol, 10% lauric acid in propylene glycol, polyoxyethylene, 2,3-lauryl ether, menthol, sodium caprate, sodium caprylate, sodium glycodeoxycholate, glycol; polysaccharides, e.g., chitosan and chitosan glutamate; and others such as, aprotinin, benzalkonium chloride, cetylpyridinium chloride, cetyltrimethyl ammonium bromide, sodium salicylate, lysophosphatidylcholine, methoxysalicylate, methyloleate, sodium edta, sulfoxides, various alkyl glycosides, ethylenediamide tetra acetic acid (edta), tartaric acid; lyotropic salts, such as magnesium sulfate; propylene glycol, glycerol, poly(ethylene glycol), or poly(propylene glycol); gelatin, dextrins, modified starch, carboxymethyl cellulose, and combinations thereof.

Alternatively or additionally, in some embodiments, a provided formulation may include an absorption enhancer(s), for example which may be selected from the group consisting of surfactants, cholesterol, glycerides, salicylates, bile salts, chelating agents, sodium caprate, a salt of capric acid and other includes N-(5-chlorosalicylol)-8-aminocaprylic acid (5-CNAC), 4-((4-chloro-2-hydroxybenzoyl))-amino) butanoic acid (4-CNAB) and N-(8-(2-hydroxybenzoyl))-amino) caprylic acid, also known as salcaprozate sodium (SNAC, caprylic acid, C8, castor oil, medium chain, acyl carnitine, EDTA, glyceryl monolaurate, bovine β-casein, tocopherol succinate glycol chitosan conjugates, lecithins, glyceryl monostearate (GMS), chitosan and alginate, PLGA, silica, stearic acid, oleic acid, hydrogenated castor oil, and glyceryl trimyristate, etoposide phosphate (Vepesid®), sulindac (Clinoril®), enalapril maleate (Vasotec®), ramipril (Altace®), olmesartan medoxomil (Benicar®), valacyclovir (Valtrex®), midodrine (Amatine®), gabapentin enacarbil (Horizant®), sulfasalazine (Azulfidine®); or Alternatively or additionally, in some embodiments, a provided formulation may include a muco bioadhesive agent(s), for example which may be selected from the group consisting of sucrose, lactose, trehalose, dextran, erythritol, arabitol, xylitol, sorbitol, maltose, lactulose, maltulose, glucitol, maltitol, lactitol, isomaltulose and mannitol; amino acids, such as arginine or histidine or proline or glycine; lyotropic salts, such as magnesium sulfate; propylene glycol, glycerol, poly(ethylene glycol), or poly(propylene glycol); gelatin, dextrins, modified starch, carboxymethyl cellulose, and combinations thereof. mucoadhesive system such as from naturae, e.g., gelatin, agarose, chitosan, hyaluronic acid and synthetic polymers, e.g., polyvinylpyrolidone (PVP), polycrylates, polyvinyl alcohol, sodium carboxymethyl cellulose (SCMC) and pectin, all anionic-type polymers, chitosan (cationic type), and hydroxypropyl methylcellulose (HPMC) as a nonionic polymer, polyacrylic acid (PAA) derivatives (CP934, CP940, PCP), 15% CMC and 35% CP, copolymers of acrylic acid and poly(ethylene glycol) monomethylether monomethacrylate (PEGMM), eudragit1 NE40D is a neutral poly(ethylacrlate methylmethacrylate, hydrophilic polymers, e.g., methocel K4M, methocel K15M, SCMC 400, Cekol 700, Cekol 10000, CP934P, CP971P and CP974P, carboxyvinyl polymer and triethanolamine, HPC (hydroxy propyl celluose), CP (carbopol 934P), carbopol (CP) EX-55 CMC (sodium carboxymethyl cellulose), HPMC (hydroxy propyl methyl cellulose), HEC (hydroxy ethyl cellulose), PIP [poly(isoprene)], PIB [poly(Isobutylene)], xanthum gum, locust bean gum, pectin, polycarbophil, benzyl esters, hydroxyethylcellulose, poly(acrylic acid), poly(acrylic acid-co-acrylamide), poly(acrylic acid-co-methyl methacrylate), poly(acrylic acid-co-butylacrylate), HEMA copolymerized with Polymeg® (polytetramethylene glycol), Cydot® (bioadhesive polymeric blend of CP and PIB), formulation consisting of PVP, cetylpyridinium chloride (as stabilizer), chitosan chloride, polyethylene oxide, polymethylvinylether/maleic anhydride (PME/MA), and tragacanth, poly ethyleneglycol monomethylether monomethacrylate, drum dried waxy maize starch (DDWM), carbopol 974P, and sodium stearylfumarate, and cellulose derivatives; hyderogels-acrylic acid (polar) and butyl acrylate (apolar), and combinations thereof.

Definitions

A, An, The: As used herein, "a" "an", and "the" refer to one or to more than one (i.e., to at least one) of the grammatical object of the article. By way of example, "an element" discloses embodiments of exactly one element and embodiments including more than one element.

About: As used herein, term "about", when used in reference to a value, refers to a value that is similar, in context to the referenced value. In general, those skilled in the art, familiar with the context, will appreciate the relevant degree of variance encompassed by "about" in that context. For example, in some embodiments, the term "about" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referenced value.

Administration: As used herein, the term "administration" typically refers to administration of a composition to a subject or system to achieve delivery of an agent that is, or is included in, the composition.

Agent: As used herein, the term "agent" may refer to any chemical entity, including without limitation any of one or more of an atom, molecule, compound, amino acid, polypeptide, nucleotide, nucleic acid, polypeptide complex, liquid, solution, saccharide, polysaccharide, lipid, or combination or complex thereof.

Amino acid: In its broadest sense, as used herein, refers to any compound and/or substance that can be incorporated into a polypeptide chain, e.g., through formation of one or more peptide bonds. In some embodiments, an amino acid has the general structure $H_2N-C(H)(R)-COOH$. In some embodiments, an amino acid is a naturally-occurring amino acid. In some embodiments, an amino acid is a non-natural amino acid; in some embodiments, an amino acid is a D-amino acid; in some embodiments, an amino acid is an L-amino acid. "Standard amino acid" refers to any of the twenty standard L-amino acids commonly found in naturally occurring peptides. "Nonstandard amino acid" refers to any amino acid, other than the standard amino acids, regardless of whether it is prepared synthetically or obtained from a natural source. In some embodiments, an amino acid, including a carboxy- and/or amino-terminal amino acid in a polypeptide, can contain a structural modification as compared with a typical or canonical amino acid structure. For example, in some embodiments, an amino acid can be modified by methylation, amidation, acetylation, pegylation, glycosylation, phosphorylation, and/or substitution (e.g., of the amino group, the carboxylic acid group, one or more protons, and/or the hydroxyl group) as compared with the general structure. In some embodiments, such modification can, for example, alter the circulating half-life of a polypeptide containing the modified amino acid as compared with one containing an otherwise identical unmodified amino acid. In some embodiments, such modification does not significantly alter a relevant activity of a polypeptide containing the modified amino acid, as compared with one containing an otherwise identical unmodified amino acid. As will be clear from context, in some embodiments, the term "amino acid" can be used to refer to a free amino acid; in some embodiments it can be used to refer to an amino acid residue of a polypeptide.

Amorphous: As used herein, the term "amorphous" generally refers to a non-crystalline solid form of polypeptide, sometimes referred to as an amorphous solid" or "amorphous precipitate", which typically has no, or essentially no, molecular lattice structure characteristic of the crystalline solid state.

Analog: As used herein, the term "analog" refers to a substance that shares one or more particular structural features, elements, components, or moieties with a reference substance. Typically, an "analog" shows significant structural similarity with the reference substance, for example sharing a core or consensus structure, but also differs in certain discrete ways. In some embodiments, an analog is a substance that can be generated from the reference substance, e.g., by chemical manipulation of the reference substance. In some embodiments, an analog is a substance that can be generated through performance of a synthetic process substantially similar to (e.g., sharing a plurality of steps with) one that generates the reference substance. In some embodiments, an analog is or can be generated through performance of a synthetic process different from that used to generate the reference substance.

Antibody: As used herein, the term "antibody" refers to a polypeptide that includes one or more canonical immunoglobulin sequence elements sufficient to confer specific binding to a particular antigen (e.g., a heavy chain variable domain, a light chain variable domain, and/or one or more CDRs). Thus, the term antibody includes, without limitation, human antibodies, non-human antibodies, synthetic and/or engineered antibodies, fragments thereof, and agents including the same. Antibodies can be naturally occurring immunoglobulins (e.g., generated by an organism reacting to an antigen). Synthetic, non-naturally occurring, or engineered antibodies can be produced by recombinant engineering, chemical synthesis, or other artificial systems or methodologies known to those of skill in the art.

As is well known in the art, typical human immunoglobulins are approximately 150 kD tetrameric agents that include two identical heavy (H) chain polypeptides (about 50 kD each) and two identical light (L) chain polypeptides (about 25 kD each) that associate with each other to form a structure commonly referred to as a "Y-shaped" structure. Typically, each heavy chain includes a heavy chain variable domain (VH) and a heavy chain constant domain (CH). The heavy chain constant domain includes three CH domains: CH1, CH2 and CH3. A short region, known as the "switch", connects the heavy chain variable and constant regions. The "hinge" connects CH2 and CH3 domains to the rest of the immunoglobulin. Each light chain includes a light chain variable domain (VL) and a light chain constant domain (CL), separated from one another by another "switch." Each variable domain contains three hypervariable loops known as "complement determining regions" (CDR1, CDR2, and CDR3) and four somewhat invariant "framework" regions (FR1, FR2, FR3, and FR4). In each VH and VL, the three CDRs and four FRs are arranged from amino-terminus to carboxy-terminus in the following order: FR1, CDR1, FR2, CDR2, FR3, CDR3, and FR4. The variable regions of a heavy and/or a light chain are typically understood to provide a binding moiety that can interact with an antigen. Constant domains can mediate binding of an antibody to various immune system cells (e.g., effector cells and/or cells that mediate cytotoxicity), receptors, and elements of the complement system. Heavy and light chains are linked to one another by a single disulfide bond, and two other disulfide bonds connect the heavy chain hinge regions to one another, so that the dimers are connected to one another and the tetramer is formed. When natural immunoglobulins fold, the FR regions form the beta sheets that provide the structural framework for the domains, and the CDR loop regions from both the heavy and light chains are brought together in three-dimensional space so that they create a single hypervariable antigen binding site located at the tip of the Y structure.

In some embodiments, an antibody is polyclonal, monoclonal, monospecific, or multispecific antibodies (including bispecific antibodies). In some embodiments, an antibody includes at least one light chain monomer or dimer, at least one heavy chain monomer or dimer, at least one heavy chain-light chain dimer, or a tetramer that includes two heavy chain monomers and two light chain monomers. Moreover, the term "antibody" can include (unless otherwise stated or clear from context) any art-known constructs or formats utilizing antibody structural and/or functional features including without limitation intrabodies, domain antibodies, antibody mimetics, Zybodies®, Fab fragments, Fab' fragments, F(ab')2 fragments, Fd' fragments, Fd fragments, isolated CDRs or sets thereof, single chain antibodies, single-chain Fvs (scFvs), disulfide-linked Fvs (sdFv), polypeptide-Fc fusions, single domain antibodies (e.g., shark single domain antibodies such as IgNAR or fragments thereof), cameloid antibodies, camelized antibodies, masked antibodies (e.g., Probodies®), affybodies, anti-idiotypic (anti-Id) antibodies (including, e.g., anti-anti-Id antibodies), Small Modular ImmunoPharmaceuticals ("SMIPs™"), single chain or Tandem diabodies (TandAb®), VHHs, Anticalins®, Nanobodies® minibodies, BiTE®s, ankyrin repeat proteins or DARPINs®, Avimers®, DARTs, TCR-like antibodies, Adnectins®, Affilins®, Trans-Bodies®, Affibodies®, TrimerX®, MicroProteins, Fynomers®, Centyrins®, and KALBITOR®s, CARs, engineered TCRs, and antigen-binding fragments of any of the above.

In various embodiments, an antibody includes one or more structural elements recognized by those skilled in the art as a complementarity determining region (CDR) or variable domain. In some embodiments, an antibody can be a covalently modified ("conjugated") antibody (e.g., an antibody that includes a polypeptide including one or more canonical immunoglobulin sequence elements sufficient to confer specific binding to a particular antigen, where the polypeptide is covalently linked with one or more of a therapeutic agent, a detectable moiety, another polypeptide, a glycan, or a polyethylene glycol molecule). In some embodiments, antibody sequence elements are humanized, primatized, chimeric, etc, as is known in the art.

An antibody including a heavy chain constant domain can be, without limitation, an antibody of any known class, including but not limited to, IgA, secretory IgA, IgG, IgE and IgM, based on heavy chain constant domain amino acid sequence (e.g., alpha (α), delta (δ), epsilon (ε), gamma (γ) and mu (μ)). IgG subclasses are also well known to those in the art and include but are not limited to human IgG1, IgG2, IgG3 and IgG4. "Isotype" refers to the Ab class or subclass (e.g., IgM or IgG1) that is encoded by the heavy chain constant region genes. As used herein, a "light chain" can be of a distinct type, e.g., kappa (κ) or lambda (λ), based on the amino acid sequence of the light chain constant domain. In some embodiments, an antibody has constant region sequences that are characteristic of mouse, rabbit, primate, or human immunoglobulins. Naturally-produced immunoglobulins are glycosylated, typically on the CH2 domain. As is known in the art, affinity and/or other binding attributes of Fc regions for Fc receptors can be modulated through glycosylation or other modification. In some embodiments, an antibody may lack a covalent modification (e.g., attachment of a glycan) that it would have if produced naturally. In some embodiments, antibodies produced and/or utilized in accordance with the present invention include glycosylated Fc domains, including Fc domains with modified or engineered such glycosylation.

Antibody fragment: As used herein, an "antibody fragment" refers to a portion of an antibody or antibody agent as described herein, and typically refers to a portion that includes an antigen-binding portion or variable region thereof. An antibody fragment can be produced by any means. For example, in some embodiments, an antibody fragment can be enzymatically or chemically produced by fragmentation of an intact antibody or antibody agent. Alternatively, in some embodiments, an antibody fragment can be recombinantly produced (i.e., by expression of an engineered nucleic acid sequence. In some embodiments, an antibody fragment can be wholly or partially synthetically produced. In some embodiments, an antibody fragment (particularly an antigen-binding antibody fragment) can have a length of at least about 50, 60, 70, 80, 90, 100, 110, 120, 130, 140, 150, 160, 170, 180, 190 amino acids or more, in some embodiments at least about 200 amino acids.

Associated with: Two events or entities are "associated" with one another, as that term is used herein, if the presence, level and/or form of one is correlated with that of the other.

For example, a particular entity (e.g., polypeptide, genetic signature, metabolite, microbe, etc.) is considered to be associated with a particular disease, disorder, or condition, if its presence, level and/or form correlates with incidence of and/or susceptibility to the disease, disorder, or condition (e.g., across a relevant population). In some embodiments, two or more entities are physically "associated" with one another if they interact, directly or indirectly, so that they are and/or remain in physical proximity with one another. In some embodiments, two or more entities that are physically associated with one another are covalently linked to one another; in some embodiments, two or more entities that are physically associated with one another are not covalently linked to one another but are non-covalently associated, for example by means of hydrogen bonds, van der Waals interaction, hydrophobic interactions, magnetism, or a combination thereof.

Between or From: As used herein, the term "between" refers to content that falls between indicated upper and lower, or first and second, boundaries (or "bounds"), inclusive of the boundaries. Similarly, the term "from", when used in the context of a range of values, indicates that the range includes content that falls between indicated upper and lower, or first and second, boundaries, inclusive of the boundaries.

Bioavailability: As used herein, the term "bioavailability" can refer to the degree to which a substance, e.g., a polypeptide such as an antibody or antibody fragment, administered to an in vivo subject, becomes available to a tissue to which the substance is targeted (e.g., the bloodstream and/or plasma). Bioavailability can refer to the degree to which a substance that has been administered to an in vivo subject is delivered to blood of the subject. Bioavailability can refer to the ability of a substance to perform a function in the subject. Bioavailability can be measured in a number of ways, e.g., as the concentration of a substance in the bloodstream or plasma. In some embodiments, bioavailability can be assessed, for example, by comparing the "area under the curve" (AUC) in a plot of the plasma concentration as a function of time (area under the plasma concentration curve from time zero to a time where the plasma concentration returns to baseline levels). AUC can be calculated, for example, using the linear trapezoidal rule. "AUC0-t" refers to the area under the plasma concentration curve from time zero to a time, t, later, for example to the time of reaching baseline.

Cancer: As used herein, the term "cancer" refers to a disease, disorder, or condition in which cells exhibit relatively abnormal, uncontrolled, and/or autonomous growth, so that they display an abnormally elevated proliferation rate and/or aberrant growth phenotype characterized by a significant loss of control of cell proliferation. In some embodiments, a cancer can include one or more tumors. In some embodiments, a cancer can be or include cells that are precancerous (e.g., benign), malignant, pre-metastatic, metastatic, and/or non-metastatic. In some embodiments, a cancer can be or include a solid tumor. In some embodiments, a cancer can be or include a hematologic tumor.

Carrier polypeptide: As used herein, the term "carrier polypeptide" refers to a polypeptide that is crystallized or otherwise crystalline as used in the present disclosure. In some embodiments, a carrier polypeptide may have biological activity (e.g., may be considered an "active" in a drug product). In some embodiments, a carrier polypeptide may not have biological activity (e.g., may not have biological activity sufficient to be considered an "active" in a drug product"). In some particular embodiments, a biologically inactive carrier polypeptide may be selected from the group consisting of actin, albumins, caseins (e.g., alpha, beta and kappa caseins), collagen, conglycinin, convicillin, elastin, fibroin, gelatin, gliadins, globulins, glutelins, gluten, glutenin, glycinin, helianthinin, immunoglobulins, lactoglobulin (e.g., beta lactoglobulin), legumin, lysozyme, myoglobulins, myosin, ovalbumin, ovomucin, ovomucoid, ovotransferrin, prolamin, sericin, tropomysin, troponin, vicillin, zein (e.g., alpha and beta zein).

Crystalline: As used herein, the term "crystalline" or "crystal" refers to a material whose constituents (such as atoms, molecules, or ions) are arranged in a highly ordered microscopic structure, forming a crystal lattice that extends in all directions. In many embodiments, presence of crystalline material can be detected, for example, by X-ray diffraction (e.g., by X-ray Powder Diffraction analysis, XRPD).

Engineered: As used herein, the term "engineered" refers to the aspect of having been manipulated by the hand of man. For example, a polynucleotide is considered to be "engineered" when two or more sequences, that are not linked together in that order in nature, are manipulated by the hand of man to be linked to one another in the engineered polynucleotide. Those of skill in the art will appreciate that an "engineered" nucleic acid or amino acid sequence can be a recombinant nucleic acid or amino acid sequence. In some embodiments, an engineered polynucleotide includes a coding sequence and/or a regulatory sequence that is found in nature operably linked with a first sequence but is not found in nature operably linked with a second sequence, which is in the engineered polynucleotide and operably linked in with the second sequence by the hand of man. In some embodiments, a cell or organism is considered to be "engineered" if it has been manipulated so that its genetic information is altered (e.g., new genetic material not previously present has been introduced, for example by transformation, mating, somatic hybridization, transfection, transduction, or other mechanism, or previously present genetic material is altered or removed, for example by substitution, deletion, or mating). As is common practice and is understood by those of skill in the art, progeny or copies, perfect or imperfect, of an engineered polynucleotide or cell are typically still referred to as "engineered" even though the direct manipulation was of a prior entity.

Excipient: As used herein, "excipient" refers to a non-therapeutic agent that may be included in a pharmaceutical composition, for example to provide or contribute to a desired consistency or stabilizing effect. In some embodiments, suitable pharmaceutical excipients may include, for example, starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol, or the like.

"Improve," "increase," "inhibit," or "reduce": As used herein, the terms "improve", "increase", "inhibit", and "reduce", and grammatical equivalents thereof, indicate qualitative or quantitative difference from a reference.

Muco bioadhesive agent: As used herein, the term "muco bioadhesive agent" refers to an agent which increases the contact time between a material (e.g., a drug, an active ingredient of a drug, a polypeptide formulation as described herein or polypeptide released therefrom) and mucus or mucous membrane. In some embodiments, a muco bioadhesive agent prolongs the retention of a material at a site of application. In some embodiments, a muco bioadhesive agent alters the rate of release of a material for improved therapeutic outcome.

Oral administration: As used herein, the term "oral administration" refers to a route of administration where a substance is taken through the mouth. In some embodiments, oral administration is or comprises buccal administration. In some embodiments, oral administration is or comprises sublingual administration. In some embodiments, oral administration is or comprises spray to mouth. In some embodiments, oral administration is via a patch. In some embodiments, oral administration is via application of a film. In some embodiments, oral administration involves administration of drops. In some embodiments, oral administration is or comprises application of a gels. In some embodiments, oral administration is via a wafer. In some embodiments, oral administration is via a capsule. In some embodiments, oral administration is via a tablet. In some embodiments, oral administration is via a suspension. In some embodiments, oral administration is via a formulation as described herein.

Permeation enhancer: As used herein, the term "permeation enhancer" refers to an agent whose presence or level correlates with improved transport of a material e.g., a drug product or active ingredient thereof, a polypeptide formulation as described herein or a polypeptide component thereof, etc, across an epithelial barrier. In some embodiments, an epithelial barrier is or comprises a mucosal membrane.

Pharmaceutically acceptable: As used herein, the term "pharmaceutically acceptable," as applied to one or more, or all, component(s) for formulation of a composition as disclosed herein, means that each component must be compatible with the other ingredients of the composition and not deleterious to the recipient thereof.

Pharmaceutical composition or formulation: As used herein, the term "pharmaceutical composition" or "formulation" refers to a composition in which a therapeutic agent is formulated together with one or more pharmaceutically acceptable carriers.

Polypeptide: As used herein, "polypeptide" refers to any polymeric chain of two or more amino acids. In some embodiments, a polypeptide has an amino acid sequence that occurs in nature. In some embodiments, a polypeptide has an amino acid sequence that does not occur in nature. In some embodiments, a polypeptide has an amino acid sequence that is engineered in that it is designed and/or produced through action of the hand of man. In some embodiments, a polypeptide may be or include of natural amino acids, non-natural amino acids, or both. In some embodiments, a polypeptide may be or include only natural amino acids or only non-natural amino acids. In some embodiments, a polypeptide can include D-amino acids, L-amino acids, or both. In some embodiments, a polypeptide may include only L-amino acids. In some embodiments, a polypeptide may include one or more pendant groups or other modifications, e.g., one or more amino acid side chains, e.g., at the polypeptide's N-terminus, at the polypeptide's C-terminus, at non-terminal amino acids, or at any combination thereof. In some embodiments, such pendant groups or modifications may be selected from acetylation, amidation, lipidation, methylation, phosphorylation, glycosylation, glycation, sulfation, mannosylation, nitrosylation, acylation, palmitoylation, prenylation, pegylation, etc., including combinations thereof. In some embodiments, a polypeptide may be cyclic, and/or may include a cyclic portion.

In some embodiments, the term "polypeptide" may be appended to a name of a reference polypeptide, activity, or structure to indicate a class of polypeptides that share a relevant activity or structure. For such classes, the present specification provides and/or those skilled in the art will be aware of exemplary polypeptides within the class whose amino acid sequences and/or functions are known. In some embodiments, a member of a polypeptide class or family shows significant sequence homology or identity with, shares a common sequence motif (e.g., a characteristic sequence element) with, and/or shares a common activity (in some embodiments at a comparable level or within a designated range) with a reference polypeptide of the class. For example, in some embodiments, a member polypeptide shows an overall degree of sequence homology or identity with a reference polypeptide that is at least about 30-40%, and is often greater than about 50%, 60%, 70%, 80%, 90%, 91%, 92%, 93%, 94%, 95%, 96%, 97%, 98%, 99% or more and/or includes at least one region (e.g., a conserved region that can in some embodiments be or include a characteristic sequence element) that shows very high sequence identity, often greater than 90% or even 95%, 96%, 97%, 98%, or 99%. Such a conserved region usually encompasses at least 3-4 and in some instances up to 20 or more amino acids; in some embodiments, a conserved region encompasses at least one stretch of at least 2, 3, 4, 5, 6, 7, 8, 9, 10, 11, 12, 13, 14, 15 or more contiguous amino acids. In some embodiments, a relevant polypeptide can be or include a fragment of a parent polypeptide. In some embodiments, a useful polypeptide may be or include a plurality of fragments, each of which is found in the same parent polypeptide in a different spatial arrangement relative to one another than is found in the polypeptide of interest (e.g., fragments that are directly linked in the parent may be spatially separated in the polypeptide of interest or vice versa, and/or fragments may be present in a different order in the polypeptide of interest than in the parent), so that the polypeptide of interest is a derivative of its parent polypeptide.

Reference: As used herein, "reference" refers to a standard or control relative to which a comparison is performed. For example, in some embodiments, an agent, sample, sequence, subject, animal, or individual, or population thereof, or a measure or characteristic representative thereof, is compared with a reference, an agent, sample, sequence, subject, animal, or individual, or population thereof, or a measure or characteristic representative thereof. In some embodiments, a reference is a measured value. In some embodiments, a reference is an established standard or expected value. In some embodiments, a reference is a historical reference. A reference can be quantitative of qualitative. Typically, as would be understood by those of skill in the art, a reference and the value to which it is compared represents measure under comparable conditions. Those of skill in the art will appreciate when sufficient similarities are present to justify reliance on and/or comparison. In some embodiments, an appropriate reference may be an agent, sample, sequence, subject, animal, or individual, or population thereof, under conditions those of skill in the art will recognize as comparable, e.g., for the purpose of assessing one or more particular variables (e.g., presence or absence of an agent or condition), or a measure or characteristic representative thereof.

Small molecule: As used herein, the term "small molecule" means a low molecular weight organic and/or inorganic compound. In general, a "small molecule" is a molecule that is less than about 5 kilodaltons (kD) in size. In some embodiments, a small molecule is less than about 4 kD, 3 kD, about 2 kD, or about 1 kD. In some embodiments, the small molecule is less than about 800 daltons (D), about 600 D, about 500 D, about 400 D, about 300 D, about 200

D, or about 100 D. In some embodiments, a small molecule is less than about 2,000 g/mol, less than about 1500 g/mol, less than about 1,000 g/mol, less than about 800 g/mol, or less than about 500 g/mol. In some embodiments, a small molecule is not a polymer. In some embodiments, a small molecule does not include a polymeric moiety. In some embodiments, a small molecule is not and/or does not include a polypeptide. In some embodiments, a small molecule is not and/or does not include a polynucleotide (e.g., is not an oligonucleotide). In some embodiments, a small molecule is not and/or does not include a polysaccharide; for example, in some embodiments, a small molecule is not a glycoprotein, proteoglycan, glycolipid, etc.). In some embodiments, a small molecule is not a lipid. In some embodiments, a small molecule is a modulating agent (e.g., is an inhibiting agent or an activating agent). In some embodiments, a small molecule is biologically active. In some embodiments, a small molecule is detectable (e.g., includes at least one detectable moiety). In some embodiments, a small molecule is a therapeutic agent.

Subject: As used herein, the term "subject" refers to an organism, typically a mammal (e.g., a human, rat, or mouse). In some embodiments, a subject is suffering from a disease, disorder or condition. In some embodiments, a subject is susceptible to a disease, disorder, or condition. In some embodiments, a subject displays one or more symptoms or characteristics of a disease, disorder or condition. In some embodiments, a subject is not suffering from a disease, disorder or condition. In some embodiments, a subject does not display any symptom or characteristic of a disease, disorder, or condition. In some embodiments, a subject has one or more features characteristic of susceptibility to or risk of a disease, disorder, or condition. In some embodiments, a subject is a subject that has been tested for a disease, disorder, or condition, and/or to whom therapy has been administered. In some instances, a human subject can be interchangeably referred to as a "patient" or "individual." A subject administered an agent associated with treatment of a disease, disorder, or condition with which the subject is associated can be referred to as a subject in need of the agent, i.e., as a subject in need thereof.

Therapeutic agent: As used herein, the term "therapeutic agent" refers to any agent that elicits a desired pharmacological effect when administered to a subject. In some embodiments, an agent is considered to be a therapeutic agent if it demonstrates a statistically significant effect across an appropriate population. In some embodiments, the appropriate population can be a population of model organisms or a human population. In some embodiments, an appropriate population can be defined by various criteria, such as a certain age group, gender, genetic background, preexisting clinical conditions, etc. In some embodiments, a therapeutic agent is a substance that can be used for treatment of a disease, disorder, or condition. In some embodiments, a therapeutic agent is an agent that has been or is required to be approved by a government agency before it can be marketed for administration to humans. In some embodiments, a therapeutic agent is an agent for which a medical prescription is required for administration to humans.

Therapeutically effective amount: As used herein, "therapeutically effective amount" refers to an amount that produces the desired effect for which it is administered. In some embodiments, the term refers to an amount that is sufficient, when administered to a population suffering from or susceptible to a disease, disorder, and/or condition in accordance with a therapeutic dosing regimen, to treat the disease, disorder, and/or condition. In some embodiments, a therapeutically effective amount is one that reduces the incidence and/or severity of, and/or delays onset of, one or more symptoms of the disease, disorder, and/or condition. Those of ordinary skill in the art will appreciate that a therapeutically effective amount does not necessarily achieve successful treatment in every particular treated individual. Rather, a therapeutically effective amount may be that amount that provides a particular desired pharmacological response in a significant number of subjects when administered to patients in need of such treatment. In some embodiments, reference to a therapeutically effective amount may be a reference to an amount as measured in one or more specific tissues (e.g., a tissue affected by the disease, disorder or condition) or fluids (e.g., blood, saliva, serum, sweat, tears, urine, etc.). Those of ordinary skill in the art will appreciate that, in some embodiments, a therapeutically effective amount of a particular agent or therapy may be formulated and/or administered in a single dose. In some embodiments, a therapeutically effective agent may be formulated and/or administered in a plurality of doses, for example, as part of a dosing regimen.

Treatment: As used herein, the term "treatment" (also "treat" or "treating") refers to administration of a therapy that partially or completely alleviates, ameliorates, relieves, inhibits, delays onset of, reduces severity of, and/or reduces incidence of one or more symptoms, features, and/or causes of a particular disease, disorder, or condition, or is administered for the purpose of achieving any such result. In some embodiments, such treatment can be of a subject who does not exhibit signs of the relevant disease, disorder, or condition and/or of a subject who exhibits only early signs of the disease, disorder, or condition. Alternatively or additionally, such treatment can be of a subject who exhibits one or more established signs of the relevant disease, disorder and/or condition. In some embodiments, treatment can be of a subject who has been diagnosed as suffering from the relevant disease, disorder, and/or condition. In some embodiments, treatment can be of a subject known to have one or more susceptibility factors that are statistically correlated with increased risk of development of the relevant disease, disorder, or condition.

BRIEF DESCRIPTION OF THE DRAWING

FIG. 1 is a set of four images showing hollow sugar truffles.

FIG. 2 is an image showing microparticles of amylase crystals with trapped insulin.

FIG. 3 is an image showing microparticles of albumin crystals with trapped insulin.

FIG. 4 is an image showing microparticles of albumin crystals with trapped PTH.

FIG. 5 is a graph showing plasma concentration of insulin over time following intravenous administration of a standard of care formulation of human insulin R to pigs.

FIG. 6 is a graph showing plasma concentration of insulin over time following an administration of a capsule formulation comprising insulin embedded in amylase crystals to pigs.

FIG. 7 is a graph showing plasma concentration of insulin over time following an administration of a capsule formulation comprising insulin embedded in albumin crystals to pigs.

FIG. 8 is a graph showing plasma concentration of insulin over time following intravenous administration of a standard of care formulation of human insulin R to pigs.

FIG. 9 is a graph showing plasma concentration of insulin over time following buccal/sublingual administration of a truffle formulation comprising insulin embedded in amylase crystals to pigs.

FIG. 10 is a graph showing plasma concentration of insulin over time following buccal/sublingual administration of a truffle formulation comprising insulin embedded in albumin crystals to pigs.

FIG. 11 is a graph showing plasma concentration of insulin over time following intravenous administration of a standard of care formulation of PTH to pigs.

FIG. 12 is a graph showing plasma concentration of PTH over time following an administration of a capsule formulation comprising PTH embedded in albumin crystals to pigs.

FIG. 13 is a graph showing plasma concentration of insulin over time following intravenous administration of a standard of care formulation of PTH to pigs.

FIG. 14 is a graph showing plasma concentration of PTH over time following buccal/sublingual administration of a truffle formulation comprising insulin embedded in albumin crystals to pigs.

FIG. 15 is an image showing microparticles of albumin crystals with trapped human growth Hormone.

FIG. 16 is an image showing microparticles of albumin crystals with trapped Adalimumab.

FIG. 17 is a graph showing plasma concentration of human growth hormone over time following intravenous administration to pigs.

FIG. 18 is a graph showing plasma concentration of human growth hormone over time following administration of human growth hormone embedded in albumin crystals in capsule form and through gut delivery to pigs.

FIG. 19 is a graph showing plasma concentration of human growth hormone over time following intravenous administration to pigs.

FIG. 20 is a graph showing plasma concentration of human growth hormone over time following administration of human growth hormone embedded in albumin crystals in sugar truffle shell form and through buccal/sublingual delivery to pigs.

FIG. 21 is a graph showing plasma concentration of Adalimumab over time following intravenous administration to pigs.

FIG. 22 is a graph showing plasma concentration of Adalimumab over time following administration of Adalimumab embedded in albumin crystals in capsule form and through gut delivery to pigs.

FIG. 23 is a graph showing plasma concentration of Adalimumab over time following intravenous administration to pigs.

FIG. 24 is a graph showing plasma concentration of Adalimumab over time following administration of Adalimumab embedded in albumin crystals in sugar truffle shell form and through buccal/sublingual delivery to pigs.

DETAILED DESCRIPTION

Extensive effort has been expended by the pharmaceutical industry to bring polypeptide therapeutics to market. Clinical trials have included hundreds of polypeptides for treatment of multiple different conditions. However, clinical use of polypeptides has been hampered by numerous obstacles to obtaining suitable forms (e.g., polymorphs of solids) for formulation and their successful delivery. Bioavailability, stability, and therapeutic efficacy are among the factors considered in the development of formulations for polypeptide delivery.

Many polypeptides are traditionally administered by parenteral routes such as subcutaneous, intramuscular, or intravenous injection. The present disclosure identifies a source of a problem with prior technologies for administration of polypeptides, e.g., therapeutic polypeptides in their reliance primarily on parenteral strategies. The present disclosure provides an insight that oral administration would generally be preferable to injection of polypeptide therapeutics, among other things for patient acceptance, home use, and compliance with long-term regimens. Further, the present disclosure provides an insight that certain forms of polypeptide formulation are suitable for oral administration of polypeptides and can effectively achieve polypeptide delivery.

Additionally, the present disclosure encompasses an insight that during a process of crystallizing a carrier polypeptide composition, an active polypeptide composition can be embedded in such carrier polypeptide composition, thereby creating a composition comprising both a carrier polypeptide composition and an active polypeptide composition. In some embodiments, a carrier polypeptide and an active polypeptide form a co-crystal during crystallization. In some embodiments, such composition comprising both a carrier polypeptide composition and an active polypeptide composition (e.g., a co-crystal of carrier polypeptide composition and an active polypeptide composition) is amenable for formulation.

The present disclosure provides a variety of formulations that achieve systemic delivery of polypeptides via oral administration of the formulation. For example, in some embodiments, the present disclosure provides formulations that comprise (1) a carrier polypeptide composition; (2) an active polypeptide composition; and optionally (3) a pharmaceutically acceptable carrier.

In some embodiments, a provided formulation is a truffle formulation which comprises a pharmaceutically acceptable shell and a core comprising polypeptide situated in a shell, optionally wherein a core comprises (1) a carrier polypeptide composition and (2) an active polypeptide composition.

In some embodiments, the present disclosure provides a tablet formulation. In some embodiments, the present disclosure provides a globule formulation. In some embodiments, the present disclosure provides a candy formulation. In some embodiments, the present disclosure provides a capsule formulation, optionally wherein a pharmaceutically acceptable carrier of a capsule formulation comprises a vitamin E agent.

In some embodiments, a carrier polypeptide composition and an active polypeptide composition of a provided formulation (e.g., truffle, globule, tablet, candy, capsule, etc.) are produced together in a crystallization process. In some embodiments, a carrier polypeptide composition and an active polypeptide composition of a provided formulation (e.g., truffle, globule, tablet, candy, capsule, etc.) are produced together during a process of crystallizing a carrier polypeptide composition, wherein an active polypeptide composition is embedded in a carrier polypeptide composition in such process.

The present disclosure provides an insight that a crystallization process designed for one carrier polypeptide composition can be applied to embedding different active polypeptide compositions, thereby conveniently creating a wide range of polypeptide compositions without extensive experimentation (e.g., developing a different crystallization method for each active polypeptide composition).

The present disclosure provides an insight that polypeptide compositions as described herein, e.g., truffle, globule, tablet, candy, capsule, etc. optionally comprise food ingredients and can be particularly desirable and/or effective for oral administration. In some embodiments, polypeptide compositions comprising food ingredients as described herein have improved flavor, more attractive appearance, and/or are easier to handle compared to other formulations for oral administration, and compared to parental formulations. These advantages among others could cause oral formulations of polypeptide products to have therapeutic and commercial value distinct from and/or greater than those of other formulations, specifically including parenteral formulations.

Despite tremendous efforts to achieve oral delivery of polypeptides, parenteral delivery remains the major mode of administration for polypeptide therapeutics. While oral delivery has been achieved for administration of various small molecules, the difficulty of oral delivery of polypeptides is a problem recognized by those of skill in the art. Intrinsic physicochemical and biological properties, including large molecular size, poor permeation through gastrointestinal membrane, poor stability attributed to low pH of gastric fluid, and susceptibility to proteolytic enzymes are among the factors that render oral delivery of polypeptides highly challenging.

Efforts to improve polypeptide stability and performance have included chemical modification of polypeptides such as PEGylation, hyperglycosylation, and mannosylation or use of colloidal carriers including microparticles, nanoparticles, liposomes, carbon nanotubes and micelles. Despite such efforts, parenteral administration of polypeptides has persisted as the norm. The present disclosure provides solutions to the long-standing difficulty of formulating polypeptides for oral administration.

Various compositions of the present disclosure can include a core within a pharmaceutically acceptable shell, optionally wherein a core comprises (1) a carrier polypeptide composition and (2) an active polypeptide composition. In some embodiments, a core exists in a truffle formulation as described herein. In some embodiments, a core exists in a tablet formulation as described herein and a core of such tablet is coated with a coating as described herein. In some embodiments, a core exists in a globule formulation as described herein. In some embodiments, a core exists in a candy formulation as described herein. In various embodiments, the core includes an amorphous polypeptide composition or a crystallized polypeptide composition.

Vitamin E

Vitamin E agents, as used herein, refer to compounds or entities that, when administered to a subject, deliver to that subject a vitamin E active moiety. In some embodiments, a vitamin E agent is provided and/or utilized as a salt, co-crystal, free acid or base, solvate, ester, hydrate, polymorph, or anhydrous form. In some embodiments, a vitamin E agent is provided and/or utilized in a particular stereoisomeric form, or as a mixture of stereoisomeric forms. In some embodiments, a vitamin E agent is a prodrug of vitamin E wherein vitamin E is the intended metabolite for a therapeutic effect.

Vitamin E agents (referred to herein interchangeably as Vitamin E) can be or include one or more vitamin E tocols selected from one or more vitamin E tocopherols and/or one or more vitamin E tocotrienols. Natural vitamin E tocols include two series of compounds: tocopherols with a saturated side chain and tocotrienols with an unsaturated side chain. Tocopherols and tocotrienols have a similar chemical structure, which is characterized by a long isoprenoid side chain attached at the 2 position of a 6-chromanol ring. Tocopherols include a chromanol ring and a 16-carbon tail. Tocotrienols differ from tocopherols in that they possess a farnesyl rather than a saturated isoprenoid C16 side chain. Vitamin E tocols (e.g., tocopherols and tocotrienols) are designated as α, β, γ, or δ based on the methylation pattern of the chromanol ring. β- and γ- are dimethylated in the 5- and 8-positions or the 7- and 8-positions of the chromanol ring, respectively. α-tocols are trimethylated in the 5-, 7-, and 8-positions of the chromanol ring, and δ- are monomethylated in the 8-position of the chromanol ring. Vitamin E agents can include an α-, β-, γ-, or δ-tocol, or any mixture thereof. For example, vitamin E tocopherols can include any of one or more of tocopherols α, β, γ, and δ, as well as derivatives thereof. Vitamin E tocotrienols can include any of one or more of tocotrienols α, β, γ, and δ, as well as derivatives thereof. Of these vitamin E tocols, α-tocopherol and γ-tocopherol are the most abundant in nature. Certain commercially available vitamin E supplements can commonly include α-tocopherol. Certain commercially available vitamin E supplements can commonly include a mixture of vitamin E tocols having a variety of particular structures.

Vitamin E agents can include all stereoisomeric (e.g., enantiomeric or diastereomeric) forms of a vitamin E agent, as well as all geometric or conformational isomeric forms. For example, the R and S configurations of each stereocenter of a vitamin E agent are contemplated as part of the disclosure. Therefore, single stereochemical isomers, as well as enantiomeric, diastereomeric, and geometric (or conformational) mixtures of vitamin E agents are within the scope of the disclosure. For example, a Vitamin E agent can be or include a stereoisomer of a vitamin E tocopherol or tocotrienol. Tocopherol molecules have at least three stereocenters, at C-2, C-4' and C-8', making possible at least eight stereoisomers. For instance, a Vitamin E agent can be or include a stereoisomer of α-tocopherol selected from RRR, RRS, RSS, SSS, RSR, SRS, SRR, and SSR. In various embodiments, the RRR stereoisomer is naturally occurring. In some embodiments, a vitamin E agent includes a mixture of one or more stereoisomers, e.g., one or more α-tocopherol stereoisomers (e.g., 1, 2, 3, 4, 5, 6, 7, or 8 stereoisomers). Natural tocopherols occur in the RRR-configuration while synthetic forms can include eight different stereoisomers and is called all-rac-alpha-tocopherol. Tocotrienols possess only the stereocenter at C-2 and naturally occurring tocotrienols are exclusively in the 2R,3'E,7'E configuration.

Vitamin E agents include derivatives and/or analogs of vitamin E tocols. Vitamin E agents are amenable to various modifications, e.g., at the chroman moiety of vitamin E tocols. Examples of derivatives of vitamin E tocols include 2-, 5- or 6-substituted chroman derivatives. Vitamin E tocols can be derivatized by conjugation with an agent such as a peg moiety (pegylation) or an acid (e.g., hyaluronic acid).

A Vitamin E agent can be or include a prodrug of a vitamin E tocol, e.g., an ester of a vitamin E tocol (e.g., an ester of acetic acid, succinic acid, or nicotinic acid). In certain embodiments, an ester of a vitamin E agent is prepared from a phenol form of a vitamin E agent using conventional methods known in the art. Tocopheryl esters (e.g., alpha-tocopheryl acetate, tocopheryl succinate, tocopheryl nicotinate, tocopheryl linolate, alpha-tocopheryl phosphates, etc.) can demonstrate decreased susceptibility to oxidation. Tocopheryl esters can be de-esterified in the gut (e.g., by the enzyme esterase) and absorbed as free tocopherol. A Vitamin E agent can be or include an unesterified vitamin E tocol. In various embodiments, free and esterified Vitamin E tocols are understood to have comparable bioavailability.

In some embodiments, vitamin E agents are absorbed, e.g., by the human body. The present disclosure includes both liquid and solid forms of vitamin E. Exemplary solid forms of vitamin E can be white to tan-white granular powders. Liquid forms of Vitamin E can be insoluble in water, soluble in alcohol, and/or miscible (e.g., with ether, acetone, vegetable oils, and/or chloroform). Various liquid forms of vitamin E can be clear, yellow to brownish red, and/or viscous oils. The present disclosure provides vitamin E agents that are fat soluble. For example, in various embodiments, solid forms such as alpha tocopheryl acid succinate are is insoluble in water but soluble in fat (e.g., vegetable oil), and in various embodiments can coat crystallized polypeptide and/or polypeptide particles.

Pharmaceutically acceptable carrier including a vitamin E agent can include a vitamin E agent (e.g., a fat soluble vitamin E agent) and an oil. In various embodiments Vitamin E may work as nutritional supplement in addition to carrier. In various embodiments, a pharmaceutically acceptable carrier including a vitamin E agent (e.g., an oil that includes naturally present or added vitamin E agent) can include a vitamin E agent and an oil that is a plant-derived oil, optionally wherein the plant derived oil is selected from wheat germ oil, hazelnut oil, canola/rapeseed oil, sunflower oil, safflower oil, almond oil, grapeseed oil, sunflower seed kernels, almonds, almond butter, wheat germ, canola oil, palm oil, peanut oil, margarine, tub, hazelnuts, corn oil, olive oil, soybean oil, pine nuts, peanut butter, and peanuts. Exemplary concentrations of vitamin E in certain such compositions are provided in Table 1. These provided concentrations are merely exemplary and in some instances reflect the amount of vitamin E agent typically or naturally present, while the present disclosure includes that the amount of vitamin E agent in oil compositions can be modified, e.g., by addition of vitamin E to achieve a vitamin E amount or concentration disclosed herein for use in a suspension or encapsulated formulation of crystallized or amorphous polypeptide.

TABLE 1

Oils and Vitamin E Agent Concentrations

| Plant source | Concentration of Vitamin E agent (mg Vitamin E agent/100 g) |
|---|---|
| Wheat germ oil | 150 |
| Hazelnut oil | 47 |
| Canola/rapeseed oil | 44 |
| Sunflower oil | 41.1 |
| Safflower oil | 34.1 |
| Almond oil | 39.2 |
| Grapeseed oil | 28.8 |
| Sunflower seed kernels | 26.1 |
| Almonds | 25.6 |
| Almond butter | 24.2 |
| Wheat germ | 19 |
| Canola oil | 17.5 |
| Palm oil | 15.9 |
| Peanut oil | 15.7 |
| Margarine, tub | 15.4 |
| Hazelnuts | 15.3 |
| Corn oil | 14.8 |
| Olive oil | 14.3 |
| Soybean oil | 12.1 |
| Pine nuts | 9.3 |
| Peanut butter | 9.0 |
| Peanuts | 8.3 |

Pharmaceutically Acceptable Carriers

Formulations provided herein can include a pharmaceutically acceptable carrier. As used herein, the term "pharmaceutically acceptable carrier" refers to a pharmaceutically-acceptable material, composition, or vehicle, such as a liquid or solid filler, diluent, excipient, or solvent encapsulating material, that facilitates formulation of an agent (e.g., a pharmaceutical agent), modifies bioavailability of an agent, or facilitates transport of an agent from one organ or portion of a subject to another. Some examples of materials which can serve as pharmaceutically-acceptable carriers include: Vitamin E agents, sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients; oils, such as peanut oil, cottonseed oil, virgin coconut oil, almond oil, wheatgerm oil, any edible oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; food ingredients, e.g., chocolate, cocoa, milk, milk product, natural dye, artificial dye, gum base, flavors, sweeteners, gelatin, starch, syrup, citric acid, and other non-toxic compatible substances employed in pharmaceutical formulations. In some embodiments, a pharmaceutically acceptable carrier of a provided polypeptide formulation comprises a Vitamin E agent. In some embodiments, a pharmaceutically acceptable carrier of a provided polypeptide formulation is a Vitamin E agent. In some embodiments, the present disclosure provides formulations that comprise (1) a carrier polypeptide composition; (2) an active polypeptide composition; and optionally (3) a pharmaceutically acceptable carrier comprising a Vitamin E agent. Excipients can include a non-therapeutic agent that may be included in a pharmaceutical composition, for example to provide or contribute to a desired consistency or stabilizing effect. In some embodiments, suitable pharmaceutical excipients may include, for example, starch, glucose, lactose, sucrose, gelatin, malt, rice, flour, chalk, silica gel, sodium stearate, glycerol monostearate, talc, sodium chloride, dried skim milk, cocoa butter, suppository waxes, glycerol, propylene, glycol, water, ethanol, or the like. In various embodiments, one or more pharmaceutically acceptable carriers are selected from the group consisting of aggregation-reducing agents, sugars or sugar alcohols, polysaccharides, stabilizers, hyaluronidase, buffering agents, preservatives, carriers, antioxidants, chelating agents, natural or synthetic polymers, cryoprotectants, lyoprotectants, surfactants, bulking agents, acidifying agents, ingredients to reduce injection site discomfort, antifoaming agents, alkalizing agents, vehicles, aggregation inhibitors, permeation enhancers, muco bioadhesive agents, solubilizing agents, tonicity modifiers, and stabilizing agents and combinations thereof.

In various embodiments, aggregation-reducing agents can include one or more of nicotinic acid, caffeine citrate, caffeine nicotinate, caffeine, octyl-β-D-glucopyranoside, and n-dodecyl-β-D-maltoside and optionally in combination with one or more of arginine, tryptophan, histidine, proline, cysteine, methionine, β-alanine, Potassium Glutamate, Arginine Ethylester, lysine, aspartic acid, glutamic acid, glycine, DTPA (diethylenetriaminepentaacetic acid), EGTA (aminopolycarboxylic acid), EDTA (Ethylenediaminetetraacetic acid), hydroxy propyl beta (HP-Beta) cyclodextrins, hydroxy propyl gamma (HP-Gamma) cyclodextrins, sulfobutyl ether (SBE) cyclodextrins, TMAO (trimethylamine N-oxide), trehalose, ethylene glycol, betaine, xylitol, sorbitol, 6-(N-(7-nitrobenz-2-oxa-1,3-diazol-4-yl)amino) hexanoic acid (NBD-X), methyl acetyl phosphate (MAP), citraconic anhydride, pyrophosphate, citrate, and combinations thereof.

In various embodiments, tonicity modifiers can include one or more of arginine, cysteine, histidine, glycine, sodium chloride, potassium chloride, sodium citrate, saccharides such as sucrose, glucose, dextrose, glycerin or mannitol, and combinations thereof.

In various embodiments, antioxidants can include one or more of glycine, lysine, EDTA, DTPA, sorbitol, mannitol, ascorbic acid, ascorbyl palmitate, butylated hydroxyanisole, butylated hydroxytoluene, hypophosphorous acid, monothioglycerol, propyl gallate, sodium bisulfite, sodium formaldehyde sulfoxylate, sodium metabisulfite, sodium thiosulfate, sulfur dioxide, tocopherol, and combinations thereof.

In various embodiments, lyoprotectants can include one or more of sucrose, lactose, trehalose, dextran, erythritol, arabitol, xylitol, sorbitol, maltose, lactulose, maltulose, glucitol, maltitol, lactitol, isomaltulose and mannitol; amino acids, such as arginine or histidine or proline or glycine; lyotropic salts, such as magnesium sulfate; propylene glycol, glycerol, poly(ethylene glycol), or poly(propylene glycol); gelatin, dextrins, modified starch, carboxymethyl cellulose, and combinations thereof.

In various embodiments, permeation enhancer(s) can include one or more of bile salts, e.g., tri-hydroxy salts sodium cholate, sodium glyco-cholate, sodium taurocholate and di-hydroxy salt, sodium deoxy cholate, sodium glycodeoxy Cholate, sodium tauro-deoxy cholate; fatty acids, their salt and esters, e.g., oleic acid, lauric acid, cod liver oil extract, sodium laurate, sodium caprate, glyceryl monostearate, di-ethylene glycol mono ethyl ether and various sucrose fatty acid esters, medium-chain fatty acid glycerides, polycaprolactoneomega-3 fatty acids, lecithin (phosphatidylcholine), lysophosphatidylcholine; surfactants, e.g., sodium dodecyl (lauryl) sulphate, poly sorbates (polysorbate 80), laureths, brijs and benzalkonium chloride; complexing agents, e.g., cyclodextrins, dextran sulphate, dextran sulphate, sodium edetate; complexing agents, e.g., cyclodextrins, dextran sulphate, dextran sulphate, sodium edetate, co-solvents, e.g., ethanol and propylene glycol, combination of 1% oleic acid and 5%/10% polyethylene glycol 200, 2% glyceryl mono laurate and 40% alcohol, sodium caprate and alcohol or propylene glycol, 10% lauric acid in propylene glycol, polyoxyethylene, 2,3-lauryl ether, menthol, sodium caprate, sodium caprylate, sodium glycodeoxycholate, glycol; polysaccharides, e.g., chitosan and chitosan glutamate; and others such as, aprotinin, benzalkonium chloride, cetylpyridinium chloride, cetyltrimethyl ammonium bromide, sodium salicylate, lysophosphatidylcholine, methoxysalicylate, methyloleate, sodium edta, sulfoxides, various alkyl glycosides, ethylene-diamide tetra acetic acid (edta), tartaric acid; lyotropic salts, such as magnesium sulfate; propylene glycol, glycerol, poly(ethylene glycol), or poly (propylene glycol); gelatin, dextrins, modified starch, carboxymethyl cellulose, and combinations thereof.

In various embodiments, absorption enhancer(s) can include surfactants, cholesterol, glycerides, salicylates, bile salts, chelating agents, sodium caprate, a salt of capric acid and other includes N-(5-chlorosalicylol)-8-aminocaprylic acid (5-CNAC), 4-((4-chloro-2-hydroxybenzoyl))-amino) butanoic acid (4-CNAB) and N-(8-(2-hydroxybenzoyl))-amino) caprylic acid, also known as salcaprozate sodium (SNAC, caprylic acid, C8, castor oil, medium chain, acyl carnitine, EDTA, glyceryl monolaurate, bovine β-casein, tocopherol succinate glycol chitosan conjugates, lecithins, glyceryl monostearate (GMS), chitosan and alginate, PLGA, silica, stearic acid, oleic acid, hydrogenated castor oil, and glyceryl trimyristate, etoposide phosphate (Vepesid®), sulindac (Clinoril®), enalapril maleate (Vasotec®), ramipril (Altace®), olmesartan medoxomil (Benicar®), valacyclovir (Valtrex®), midodrine (Amatine®), gabapentin enacarbil (Horizant®), sulfasalazine (Azulfidine®), and combinations thereof.

In various embodiments, muco bioadhesive agent(s) can include sucrose, lactose, trehalose, dextran, erythritol, arabitol, xylitol, sorbitol, maltose, lactulose, maltulose, glucitol, maltitol, lactitol, isomaltulose and mannitol; amino acids, such as arginine or histidine or proline or glycine; lyotropic salts, such as magnesium sulfate; propylene glycol, glycerol, poly(ethylene glycol), or poly(propylene glycol); gelatin, dextrins, modified starch, carboxymethyl cellulose, and combinations thereof mucoadhesive system such as from naturae, e.g., gelatin, agarose, chitosan, hyaluronic acid and synthetic polymers, e.g., polyvinylpyrolidone (PVP), polycrylates, polyvinyl alcohol, sodium carboxymethyl cellulose (SCMC) and pectin, all anionic-type polymers, chitosan (cationic type), and hydroxypropyl methylcellulose (HPMC) as a nonionic polymer, polyacrylic acid (PAA) derivatives (CP934, CP940, PCP), 15% CMC and 35% CP, copolymers of acrylic acid and poly(ethylene glycol) monomethylether monomethacrylate (PEGMM), eudragit1 NE40D is a neutral poly(ethylacrlate methylmethacrylate, hydrophilic polymers, e.g., methocel K4M, methocel K15M, SCMC 400, Cekol 700, Cekol 10000, CP934P, CP971P and CP974P, carboxyvinyl polymer and triethanolamine, HPC (hydroxy propyl celluose), CP (carbopol 934P), carbopol (CP) EX-55 CMC (sodium carboxymethyl cellulose), HPMC (hydroxy propyl methyl cellulose), HEC (hydroxy ethyl cellulose), PIP [poly(isoprene)], PIB [poly (Isobutylene)], xanthum gum, locust bean gum, pectin, polycarbophil, benzyl esters, hydroxyethylcellulose, poly (acrylic acid), poly(acrylic acid-co-acrylamide), poly (acrylic acid-co-methyl methacrylate), poly(acrylic acid-co-butylacrylate), HEMA copolymerized with Polymeg® (polytetramethylene glycol), Cydot® (bioadhesive polymeric blend of CP and PIB), formulation consisting of PVP, cetylpyridinium chloride (as stabilizer), chitosan chloride, polyethylene oxide, polymethylvinylether/maleic anhydride (PME/MA), and tragacanth, poly ethyleneglycol monomethylether monomethacrylate, drum dried waxy maize starch (DDWM), carbopol 974P, and sodium stearylfumarate, and cellulose derivatives; hyderogels-acrylic acid (polar) and butyl acrylate (apolar), and combinations thereof.

In various embodiments, pharmaceutically acceptable carriers expressly exclude a pharmaceutically active agent. In various embodiments, pharmaceutically acceptable carriers expressly exclude one or more, or all, biologically active polypeptides (e.g., those polypeptides sufficiently active to be considered an "active" agent in a drug product)

Crystallized and Amorphous Polypeptides

The present disclosure includes oral formulations that include a polypeptide component that is or comprises one or more polypeptides. Typically, a polypeptide component will be or comprise a polypeptide in a crystalline (e.g., crystallized) form or in an amorphous form. Thus, in many embodiments, provide formulations include a polypeptide (e.g., present in an amorphous polypeptide composition or a crystallized polypeptide composition) and a pharmaceutically acceptable carrier.

Those skilled in the art will appreciate that pharmaceutical agents, e.g., polypeptides (e.g., those in a carrier polypeptide composition, those in an active polypeptide composition), often can exist in a variety of solid forms, including polymorph, solvate, hydrate, salt, co-crystal and amorphous forms. In certain embodiments, provided formulations include a polypeptide component (e.g., polypeptide in a carrier polypeptide composition, polypeptide in an active polypeptide composition) in which at least one, and in some embodiments all, polypeptide(s) is in such a form. In some embodiments, a polypeptide component consists of crystalline polypeptide(s). In some embodiments, a polypeptide component is amorphous (e.g., consists of amorphous polypeptide(s)).

In some embodiments, a carrier polypeptide composition of a provided formulation is crystalline. In some embodiments, an active polypeptide composition of a provided formulation is crystalline. In some embodiments, an active polypeptide embedded in a carrier polypeptide composition of a provided formulation is crystalline. In some embodiments, an active polypeptide embedded in a carrier polypeptide composition, together with such carrier polypeptide composition form a co-crystal.

In some embodiments, a carrier polypeptide composition of a provided formulation is crystalline. In some embodiments, an active polypeptide composition of a provided formulation is amorphous. In some embodiments, an active polypeptide embedded in a carrier polypeptide composition of a provided formulation is amorphous.

Amorphous polypeptide compositions can include compositions in which polypeptide molecules are disordered or essentially disordered. Amorphous polypeptides can lack or essentially lack long-range order of the positions of the atoms. In various embodiments, an amorphous polypeptide can be more soluble than a crystallized form of the same polypeptide. In certain embodiments, an amorphous polypeptide is a composition that has not been crystallized and/or has not been processed according to a method of crystallization. In certain embodiments, an amorphous polypeptide composition can include short-range order, residual crystallinity, polymorphic states, and regions of different density, none of which necessarily constitute long-range order. In various embodiments an amorphous polypeptide composition can include a fraction of crystallized polypeptide, e.g., a fraction of crystallized polypeptide that is less than 20% total polypeptide (e.g., less than 20%, 15%, 10%, 9%, 8%, 7%, 6%, 5%, 4%, 3%, 2%, 1%, 0.5%, or 0.1% crystallized polypeptide) by mass, volume, or mols. Techniques for determining the degree of crystallinity include XRD, DSC, solution calorimetry, water sorption, isothermal calorimetry, and thermally stimulated current (TSC). In various embodiments, an amorphous polypeptide compositions does not diffract X-rays in a coherent manner and/or powder X-ray diffraction patterns are broad halos with no or very few characteristic peaks.

In various embodiments, an amorphous polypeptide composition (e.g., a carrier polypeptide composition, an active polypeptide composition) includes an average and/or maximum particle size of less than 25 microns, e.g., less than 20, 15, 10, 5, 4, 3, 2, 1, 0.5, or 0.1 microns, optionally wherein the particles have an average and/or maximum particle size that is between 0.1 microns and 0.5, 1, 2, 3, 4, 5, 10, 15, 20, or 25 microns or wherein the particles of polypeptide have an average and/or maximum particle size that is between 0.1 micron and 0.1, 0.5, 1, 2, 3, 4, 5, 10, 15, 20, or 25 microns. In various embodiments, particles of a polypeptide composition are microparticles or nanoparticles of polypeptide.

In some embodiments, amorphous polypeptide compositions (e.g., a carrier polypeptide composition, an active polypeptide composition) include compositions that include a high proportion of amorphous and/or non-crystallized polypeptide (e.g., of a polypeptide characterized by a particular amino acid sequence) relative to other agents or types of agents. In various embodiments, an amorphous polypeptide composition (e.g., a carrier polypeptide composition, an active polypeptide composition) includes at least 1%, 2%, 3%, 4%, 5%, 6%, 7%, 8%, 9%, 10%, 20%, 30%, 40%, 50%, 60%, 70%, 75%, 80%, 85%, 90%, 95%, 96%, 97%, 98%, 99%, or 100% amorphous and/or non-crystallized polypeptide (e.g., of a polypeptide characterized by a particular amino acid sequence) by weight, mole ratio, or volume of the composition or of polypeptide present in the composition. In various embodiments, an amorphous polypeptide composition (e.g., a carrier polypeptide composition, an active polypeptide composition) can be characterized by an amount of amorphous and/or non-crystallized polypeptide (e.g., of a polypeptide characterized by a particular amino acid sequence) that is in a range between a lower bound of 1%, 2%, 3%, 4%, 5%, 6%, 7%, 8%, 9%, 10%, 20%, 30%, 40%, 50%, 60%, 70%, 75%, 80%, 85%, or 90% by weight, mole ratio, or volume of the composition or of polypeptide present in the composition and an upper bound of 10%, 20%, 30%, 40%, 50%, 60%, 70%, 75%, 80%, 85%, 90%, 95%, 96%, 97%, 98%, 99%, or 100% by weight, mole ratio, or volume of the composition or of polypeptide present in the composition.

In various embodiments, an amorphous polypeptide (e.g., a carrier polypeptide composition, an active polypeptide composition) composition is free, or substantially free, of non-polypeptide agents (and/or of agents other than amorphous polypeptide), e.g., where the amorphous polypeptide composition includes no more than 1%, 2%, 3%, 4%, 5%, 10%, 15%, 20%, 25%, or 30% of non-polypeptide agents (and/or of agents other than amorphous polypeptide) by weight, by mole ratio, or by volume. In various embodiments, an amorphous polypeptide composition (e.g., a carrier polypeptide composition, an active polypeptide composition) includes no more than 1%, 2%, 3%, 4%, 5%, 10%, 15%, 20%, 25%, 30%, 40%, 50%, 60%, 70%, 75%, 80%, 85%, 90%, or 95% of non-polypeptide agents (and/or of agents other than amorphous polypeptide) by weight, by mole ratio, or by volume. In various embodiments, an amorphous polypeptide composition (e.g., a carrier polypeptide composition, an active polypeptide composition) includes particles of one or more particular polypeptides and is free or substantially free of other polypeptide agents (optionally including crystallized form(s) of the one or more particular polypeptides), e.g., where the amorphous polypeptide composition includes no more than 1%, 2%, 3%, 4%, 5%, 10%, 15%, 20%, 25%, or 30% of other polypeptide agents by weight, by mole ratio, or by volume. In various embodiments, an amorphous polypeptide composition (e.g., a carrier polypeptide composition, an active polypeptide composition) includes no more than 1%, 2%, 3%, 4%, 5% 10%, 15%, 20%, 25%, 30%, 40%, 50%, 60%, 70%, 75%, 80%, 85%, 90%, or 95% of other polypeptide agents by weight, by mole ratio, or by volume. In various embodiments, an amorphous polypeptide composition (e.g., a carrier polypeptide composition, an active polypeptide composition) includes particles of one or more particular polypeptides and is free or substantially free of other agents (optionally including crystallized form(s) of the one or more particular polypeptides), e.g., where the amorphous polypeptide composition includes no more than 1%, 2%, 3%, 4%, 5%, 10%, 15%, 20%, 25%, or 30% of other agents by weight, by mole ratio, or by volume. In various embodiments, an amorphous polypeptide composition (e.g., a carrier polypeptide composition, an active polypeptide composition) includes no more than 1%, 2%, 3%, 4%, 5%, 10%, 15%, 20%, 25%, 30%, 40%, 50%, 60%, 70%, 75%, 80%, 85%, 90%, or 95% of other agents by weight, by mole ratio, or by volume.

In various embodiments, an amorphous polypeptide composition (e.g., a carrier polypeptide composition, an active polypeptide composition) includes particles of one or more particular polypeptides where the particles of the one or more particular polypeptides are free, or substantially free, of non-polypeptide agents, e.g., where the particles include no more than 1%, 2%, 3%, 4%, 5%, 10%, 15%, 20%, 25%, or 30% of non-polypeptide agents by weight, by mole ratio, or by volume. In various embodiments, an amorphous polypeptide (e.g., a carrier polypeptide composition, an active polypeptide composition) composition includes particles of one or more particular polypeptides where the particles of the one or more particular polypeptides include no more than 1%, 2%, 3%, 4%, 5% 10%, 15%, 20%, 25%, 30%, 40%, 50%, 60%, 70%, 75%, 80%, 85%, 90%, or 95% of non-polypeptide agents by weight, by mole ratio, or by volume. In various embodiments, an amorphous polypeptide composition (e.g., a carrier polypeptide composition, an active polypeptide composition) includes particles of one or more particular polypeptides where the particles of the one or more particular polypeptides are free, or substantially free, of other polypeptides, e.g., where the particles of the one or more particular polypeptides include no more than 1%, 2%, 3%, 4%, 5%, 10%, 15%, 20%, 25%, or 30% of other polypeptides by weight, by mole ratio, or by volume. In various embodiments, an amorphous polypeptide composition (e.g., a carrier polypeptide composition, an active polypeptide composition) includes particles of one or more particular polypeptides where the particles of the one or more particular polypeptides include no more than 1%, 2%, 3%, 4%, 5%, 10%, 15%, 20%, 25%, 30%, 40%, 50%, 60%, 70%, 75%, 80%, 85%, 90%, or 95% of other polypeptides by weight, by mole ratio, or by volume. In various embodiments, an amorphous polypeptide composition (e.g., a carrier polypeptide composition, an active polypeptide composition) includes particles of one or more particular polypeptides where the particles of the one or more particular polypeptides are free, or substantially free, of other agents (optionally including non-crystallized form(s) of the one or more particular polypeptides), e.g., where the particles of the one or more particular polypeptides include no more than 1%, 2%, 3%, 4%, 5%, 10%, 15%, 20%, 25%, or 30% of other agents by weight, by mole ratio, or by volume. In various embodiments, an amorphous polypeptide composition (e.g., a carrier polypeptide composition, an active polypeptide composition) includes particles of one or more particular polypeptides where the particles of the one or more particular polypeptides include no more than 1%, 2%, 3%, 4%, 5%, 10%, 15%, 20%, 25%, 30%, 40%, 50%, 60%, 70%, 75%, 80%, 85%, 90%, or 95% of other agents by weight, by mole ratio, or by volume.

In some embodiments, processes for production of amorphous polypeptide compositions can include one or more of, for example, molecular quenching of melts, rapid precipitation by antisolvent addition, freeze-drying, spray-drying, spray-freeze-drying, precipitation in supercritical fluids, solid-dispersion, and solid-state chemical reactions (degradation) of crystalline precursors. For example, freeze drying of a protein/PEG blend solution and subsequent removal of PEG from the matrix has proven to yield precipitated protein particles in amorphous form. Processes that introduce mechanical or chemical stress (grinding, milling, and wet granulation) can render crystalline materials fully or partially amorphous.

In some embodiments, an amorphous polypeptide composition can be a hydrated form or prepared from a hydrated form. Hydrated forms can include an alcohol (e.g., ethanol). In some embodiments, an amorphous polypeptide composition is a solvated form or prepared form a solvated form. Exemplary solvents can include, for example, an acidic solvent or an organic solvent. In some embodiments, a solvent can include DMSO, DMF, acetic acid, acetonitrile, methanol, propanol, isopropanol, acetone, anisole, 1-butanol, 2-butanol, butyl acetate, ter/-butylmethyl ether, cumene, dimethyl sulfoxide, ethanol, ethyl acetate, ethyl ether, ethyl formate, formic acid, heptane, isobutyl acetate, isopropyl acetate, methyl acetate, 3-methyl-1-butanol, methylethyl ketone, methylisobutyl ketone, 2-methyl-1-propanol, pentane, 1-pentanol, 1-propanol, 2-propanol, propyl acetate, tetrahydrofuran, ethanol, and/or water. Certain methods of preparing amorphous polypeptide compositions can include removal of a solvent by rapid solvent evaporation from a solvated form, spray drying, roller drying, solvent precipitation, or freeze drying. In some embodiments, an amorphous polypeptide composition includes a cation such as a 2+ charged cation (e.g., $Ba^{2+}$, $Ca^{2+}$, $Cr^{2+}$, $Co^{2+}$, $Cu^{2+}$, $Fe^{2+}$, $Pb^{2+}$, $Mg^{2+}$, $Mn^{2+}$, $Ni^{2+}$, $Sr2+$, $Sn^{2+}$, or $Zn^{2+}$).

In some embodiments, crystal formation can include assembly of non-crystalline solid agents into a crystalline solid form. In some embodiments, crystal formation can utilize various molecular interactions, including, e.g., hydrogen bonding, p stacking, and Vander Waals Forces. Hydrogen bond formation is often responsible for intermolecular interactions in molecular solids. Crystallization is typically considered with respect to small molecule agents, and rarely considered with respect to polypeptides. Polypeptides typically lack well-defined conformation in solution. In certain embodiments, an amorphous polypeptide composition or a crystallized polypeptide composition is a powder form that includes crystals of polypeptide.

In various embodiments, a crystallized polypeptide composition (e.g., a carrier polypeptide composition, an active polypeptide composition) includes crystals of polypeptide having an average and/or maximum particle size of less than 25 microns, e.g., less than 20, 15, 10, 5, 4, 3, 2, 1, 0.5, or 0.1 microns, optionally wherein the crystals of polypeptide have an average and/or maximum particle size that is between 0.1 microns and 0.5, 1, 2, 3, 4, 5, 10, 15, 20, or 25 microns or wherein the crystals of polypeptide have an average and/or maximum particle size that is between 0.1 micron and 0.1, 0.5, 1, 2, 3, 4, 5, 10, 15, 20, or 25 microns. In various embodiments, crystals of a crystallized polypeptide composition (e.g., a carrier polypeptide composition, an active polypeptide composition) are microcrystals or nanocrystals of polypeptide.

In some embodiments, crystallized polypeptide compositions include compositions that include a high proportion of crystallized polypeptide (e.g., of a polypeptide characterized by a particular amino acid sequence) relative to other agents or types of agents. In various embodiments, a crystallized polypeptide composition includes at least 1%, 2%, 3%, 4%, 5%, 6%, 7%, 8%, 9%, 10%, 20%, 30%, 40%, 50%, 60%, 70%, 75%, 80%, 85%, 90%, 95%, or 100% crystallized polypeptide (e.g., of a polypeptide characterized by a particular amino acid sequence) by weight, by mole ratio, or by volume of the composition or of polypeptide present in the composition. In various embodiments, a crystallized polypeptide composition can be characterized by an amount of crystallized polypeptide (e.g., of a polypeptide characterized by a particular amino acid sequence) that is between that is between a lower bound of 1%, 2%, 3%, 4%, 5%, 6%, 7%, 8%, 9%, 10%, 20%, 30%, 40%, 50%, 60%, 70%, 75%, 80%, 85%, or 90% by weight, mole ratio, or volume of the composition or of polypeptide present in the composition and an upper bound of 10%, 20%, 30%, 40%, 50%, 60%, 70%, 75%, 80%, 85%, 90%, 95%, 96%, 97%, 98%, 99%, or 100% by weight, mole ratio, or volume of the composition or of polypeptide present in the composition.

In various embodiments, a crystallized polypeptide composition is free, or substantially free, of non-polypeptide agents e.g., where the crystallized polypeptide composition includes no more than 1%, 2%, 3%, 4%, 5%, 10%, 15%, 20%, 25%, or 30% of non-polypeptide agents by weight, by mole ratio, or by volume. In various embodiments, a crystallized polypeptide composition includes no more than 1%, 2%, 3%, 4%, 5%, 10%, 15%, 20%, 25%, 30%, 40%, 50%, 60%, 70%, 75%, 80%, 85%, 90%, or 95% of non-polypeptide agents by weight, by mole ratio, or by volume. In various embodiments, a crystallized polypeptide composition includes crystals of one or more particular polypeptides and is free or substantially free of other polypeptide agents (optionally including non-crystallized form(s) of the one or more particular polypeptides), e.g., where the crystallized polypeptide composition includes no more than 1%, 2%, 3%, 4%, 5%, 10%, 15%, 20%, 25%, or 30% of other polypeptide agents by weight, by mole ratio, or by volume. In various embodiments, a crystallized polypeptide composition includes crystals of one or more particular polypeptides and includes no more than 1%, 2%, 3%, 4%, 5%, 10%, 15%, 20%, 25%, 30%, 40%, 50%, 60%, 70%, 75%, 80%, 85%, 90%, or 95% of other polypeptide agents by weight, by mole ratio, or by volume. In various embodiments, a crystallized polypeptide composition includes crystals of one or more particular polypeptides and is free or substantially free of other agents (optionally including non-crystallized form(s) of the one or more particular polypeptides), e.g., where the crystallized polypeptide composition includes no more than 1%, 2%, 3%, 4%, 5%, 10%, 15%, 20%, 25%, or 30% of other agents by weight, by mole ratio, or by volume. In various embodiments, a crystallized polypeptide composition includes crystals of one or more particular polypeptides and includes no more than 1%, 2%, 3%, 4%, 5%, 10%, 15%, 20%, 25%, 30%, 40%, 50%, 60%, 70%, 75%, 80%, 85%, 90%, or 95% of other agents by weight, by mole ratio, or by volume.

In various embodiments, a crystallized polypeptide composition includes crystals of one or more particular polypeptides where the crystals of the one or more particular polypeptides are free, or substantially free, of non-polypeptide agents, e.g., where the crystals include no more than 1%, 2%, 3%, 4%, 5%, 10%, 15%, 20%, 25%, or 30% of non-polypeptide agents by weight, by mole ratio, or by volume. In various embodiments, a crystallized polypeptide composition includes crystals of one or more particular polypeptides where the crystals include no more than 1%, 2%, 3%, 4%, 5%, 10%, 15%, 20%, 25%, 30%, 40%, 50%, 60%, 70%, 75%, 80%, 85%, 90%, or 95% of non-polypeptide agents by weight, by mole ratio, or by volume. In various embodiments, a crystallized polypeptide composition includes crystals of one or more particular polypeptides where the crystals of the one or more particular polypeptides are free, or substantially free, of other polypeptides, e.g., where the crystals of the one or more particular polypeptides include no more than 1%, 2%, 3%, 4%, 5%, 10%, 15%, 20%, 25%, or 30% of other polypeptides by weight, by mole ratio, or by volume. In various embodiments, a crystallized polypeptide composition includes crystals of one or more particular polypeptides where the crystals of the one or more particular polypeptides include no more than 1%, 2%, 3%, 4%, 5%, 10%, 15%, 20%, 25%, 30%, 40%, 50%, 60%, 70%, 75%, 80%, 85%, 90%, or 95% of other polypeptides by weight, by mole ratio, or by volume. In various embodiments, a crystallized polypeptide composition includes crystals of one or more particular polypeptides where the crystals of the one or more particular polypeptides are free, or substantially free, of other agents (optionally including non-crystallized form(s) of the one or more particular polypeptides), e.g., where the crystals of the one or more particular polypeptides include no more than 1%, 2%, 3%, 4%, 5%, 10%, 15%, 20%, 25%, or 30% of other agents by weight, by mole ratio, or by volume. In various embodiments, a crystallized polypeptide composition includes crystals of one or more particular polypeptides where the crystals of the one or more particular polypeptides include no more than 1%, 2%, 3%, 4%, 5%, 10%, 15%, 20%, 25%, 30%, 40%, 50%, 60%, 70%, 75%, 80%, 85%, 90%, or 95% of other agents by weight, by mole ratio, or by volume.

In some embodiments, polypeptide crystals can be prepared from a polypeptide sample. Polypeptide crystals can be prepared form a polypeptide sample that is substantially pure of other agents and/or contaminants. Polypeptide crystals can be prepared from an amorphous material, e.g., a lyophilized material that is amorphous or an amorphous solid that has been precipitated. In some embodiments, polypeptide crystals can be prepared from a mixture of amorphous and crystalline material, e.g., a lyophilized material that is a mixture of amorphous and crystalline material or a mixture of amorphous and crystalline solids that has been precipitated. In various embodiments, polypeptide crystals can be prepared form a polypeptide sample having a polypeptide concentration between 0.1 and 200 mg/mL, e.g., having a polypeptide concentration between a lower bound of 0.1, 1, 5, 10, 15, 20, 25, 50, 75, or 100 mg/mL and an upper bound of 15, 20, 25, 50, 75, 100, 125, 150, 175, or 200 mg/mL.

In some embodiments, means of polypeptide crystallization can include, without limitation, one or more of, evaporation, slow diffusion (e.g., vapor diffusion at ambient or low temperature), slow cooling, slurrying, hanging drop, sitting drop, seeded crystal development, and/or other crystallization methods known in the art. Those of skill in the art will appreciate that many crystallization methods are well understood and known in the art, such that polypeptide crystallization is generally straightforward. Those of skill in the art will further appreciate that polypeptide crystallization is especially straight forward where a particular crystal size is not required, where large crystals are not required, where a particular crystalline form is not required, and/or where perfectly regular crystals are not required, any or all of which can characterize various embodiments as described herein.

In some embodiments, crystalline polypeptides can be prepared by mixing a polypeptide in a suitable solvent (e.g., water) and then causing the polypeptide to return to the solid phase. For example, polypeptides can form crystals when precipitated from an aqueous solution (e.g., of ammonium sulfate). In certain exemplary embodiments, a polypeptide-saturated solution is prepared by increasing the concentration of the polypeptide in the solution. At maximal solubility, polypeptide precipitation can occur and the precipitant can be crystalline. Slow precipitation can produce small numbers of larger crystals while more rapid precipitation can produce very large numbers of small crystals, such that the rate of precipitation is therefore not critical to the production of crystals in general.

In some embodiments, evaporation (e.g., slow evaporation) is a common means of crystallizing polypeptides. Precipitation of a polypeptide can occur by allowing the solvent of a solution of polypeptide to evaporate (e.g., slowly evaporate) until the solution reaches saturation, thereby allowing polypeptide precipitation to occur.

In some embodiments, cooling (e.g., slow cooling) is another method of crystallizing polypeptides. Precipitation of a polypeptide can occur by allowing a solution of polypeptide to cool (e.g., slowly cool), thereby reducing the maximum solubility of the polypeptide in the solution and inducing precipitation to occur.

In some embodiments, vapor diffusion and batch methods are also commonly employed in polypeptide crystallization. In vapor diffusion, a drop containing a mixture of precipitant and unprecipitated polypeptide is sealed in a chamber with pure precipitant. Water vapor then diffuses out of the drop until the osmolarity of the drop and the precipitant are equal. The dehydration of the drop causes a slow concentration of both polypeptide and precipitant until equilibrium can be achieved, favoring crystallization. Vapor diffusion can be performed in either hanging-drop or sitting-drop format. A hanging-drop method can involve a drop of polypeptide solution placed on an inverted cover slip, which is then suspended above the reservoir. A sitting-drop method can position a drop on a pedestal that is separated from the reservoir. Both of these methods require sealing of the environment so that equilibration between the drop and reservoir can occur.

In some embodiments, a batch method relies on bringing a polypeptide directly into the nucleation zone by mixing polypeptide with the appropriate amount of precipitant. Various Examples provided herein include batch crystallization. Batch crystallization is different from continuous crystallization in that the withdrawal of crystal product for the batch system is made only once at the end of the batch run. Batch crystallization may also include the semibatch system, in which one or more feed solutions are added to the crystallizer at a constant or variable rate throughout all or part of the batch. In various embodiments, batch crystallization can vary in volume from, e.g., 1 microliter (e.g., in an Eppendorf tube) to a liter or more (e.g., thousands of liters). In various embodiments, no vapor diffusion method is involved. In various embodiments, no evaporation is involved. In various embodiments, batch crystallization includes slowly adding precipitating reagents (e.g., with stirring if necessary, depending on batch size).

Typically, seeds of crystallizing material can be added early in the batch process in order to improve reproducibility and product quality. When a desired amount of solid has been formed, slurry is typically transferred to a solid-liquid separation unit.

In some embodiments, dialysis is another method commonly employed in polypeptide crystallization. This technique utilizes diffusion and equilibration of precipitant molecules through a semi-permeable membrane as a means of gradually approaching the concentration at which the macromolecule crystallizes. Dialysis tubes can be used in the case of large amounts of polypeptide being available.

In some embodiments, microdialysis buttons, also known as Cambridge buttons, offer a convenient way to produce crystals from a small amount of sample. A polypeptide sample is placed inside a small chamber on top of the button and the sample is covered with a dialysis membrane of appropriate molecular weight cut-off. The apparatus is then immersed in a reservoir containing precipitant solution. Equilibration of precipitant molecules can occur through the membrane.

In some embodiments, free interface diffusion can also be used to crystallize polypeptide. This technique can include carefully layering precipitant solution on top of concentrated polypeptide solution in a capillary, the ends of which are then sealed with wax. Narrow diameter of the capillary minimizes mixing from natural convection in the system. Thus, precipitant and polypeptide slowly inter-diffuse and the system reaches the equilibrium by a phenomenon called counter-diffusion. When the solutions initially come into contact and diffusive mixing occurs, the region of the polypeptide solution in the neighborhood of the interface becomes supersaturated and ideal conditions for nuclei formation are created. As time proceeds, the two solutions inter-diffuse along the axis of the capillary and dilute each other, thus promoting the dissolution of the smaller nuclei and the growth of the larger ones. The achievement, by the free liquid diffusion, of transient nucleation conditions in most cases allows to obtain high quality crystals. Thus free interface diffusion can be view as a rational crystallization approach to minimize supersaturation and impurity levels at the crystal growth front and to ensure steadiness of both values. A variant of free interface diffusion method is referred to as liquid bridge method, in which method a drop of polypeptide sample and a drop of precipitant solution are placed in close proximity on a cover glass and connected by a thin liquid bridge. The liquid diffusion between the two droplets, sealed from air, may induce crystal growth.

In some instances, crystallization nucleation can be induced by use of a material such as a nucleating agent, nucleant, or seed. Nucleation can occur on the surface of a nucleating agent, nucleant, or seed, which induces a higher local concentration of macromolecules, lowers the energy barrier for nucleation and bypasses kinetic barriers of spontaneous nucleation; a lower level of supersaturation can be required under such circumstances.

In some embodiments, pharmaceutical co-crystals can be crystalline materials comprised of a pharmaceutically active ingredient and one or more co-crystal formers ("coformers"), such that the active ingredient and coformers are together in the same crystal lattice. Co-crystals are distinguished from salts because unlike salts, the components that co-exist in the co-crystal lattice with a defined stoichiometry interact nonionically. In addition, co-crystals differ from polymorphs, which are defined as including 1) single-component crystalline forms that have different arrangements or conformations of the molecules in the crystal lattice, 2) amorphous forms, and 3) multicomponent phases such as solvate and hydrate forms. Co-crystals are similar to solvates at least in that both contain more than one component in the lattice. In some embodiments, an amorphous polypeptide composition or a crystallized polypeptide composition does not include co-crystallized polypeptide. In some embodiments, an amorphous polypeptide composition or a crystallized polypeptide composition includes co-crystallized polypeptide.

In some embodiments, an active polypeptide as described herein can be incorporated into a co-crystal during the process of crystallizing carrier polypeptide. In some embodiments, an active polypeptide is a coformer during the crystallization of a carrier polypeptide. In some embodiments, a carrier polypeptide is a coformer during the crystallization of an active polypeptide. In some embodiments, a carrier polypeptide and an active polypeptide are together in the same crystal lattice.

The present disclosure provides the recognition that a co-crystal comprising (1) a carrier polypeptide and (2) an active polypeptide, can be formulated into a formulation as described herein. In some embodiments, a co-crystal is formulated into a truffle formulation. In some embodiments, a co-crystal is formulated into a globule formulation. In some embodiments, a co-crystal is formulated into a tablet formulation. In some embodiments, a co-crystal is formulated into a candy formulation. In some embodiments, a co-crystal is formulated into a formulation suitable for oral administration as described herein. In some embodiments, a co-crystal is formulated into a suspension formulation. In some embodiments, a co-crystal is formulated into a capsule formulation. In some embodiments, a co-crystal is formulated into a formulation optionally comprising a further pharmaceutically acceptable carrier. In some embodiments, a co-crystal is formulated into a formulation optionally comprising Vitamin E. In some embodiments, a co-crystal is formulated into a capsule formulation optionally comprising Vitamin E.

Those of skill in the art will appreciate that a number of crystallization conditions can be adjusted to increase or decrease efficiency and/or purity of crystallization. For instance, crystallization conditions that can be adjusted include solubilization systems (aqueous systems and/or organic solvent systems), pH, counterions, salts, temperature, excipients, coformers, and polypeptide concentration. Modulating and testing ranges for these factors is trivial for those of skill in the art. In the art of crystallization, it is considered typical to sample a wide variety of crystallization conditions. Moreover, as those of skill in the art will appreciate, the present disclosure does not necessarily require that the most efficient form of crystallization be identified, only that crystals can be formed.

In some embodiments, crystallized polypeptide compositions can include a plurality of crystallized polypeptides. In various embodiments, crystallized polypeptides can be characterized by high concentration, high purity, and/or high stability. Any suitable methods known in the art can be used to characterize provided crystallized polypeptide compositions, including but not limited to X-ray powder diffraction (XRPD), differential scanning calorimetry (DSC), thermogravimetric analysis (TGA), high-performance liquid chromatography (HPLC), liquid chromatography-mass spectrometry (LCMS), laser diffraction, hot stage microscopy, polarized light microscopy, and the like.

In various embodiments, an amorphous polypeptide composition or a crystallized polypeptide composition (e.g., a carrier polypeptide composition, an active polypeptide composition) is free, or substantially free, of one or more, or any, precipitation reagents, optionally wherein the precipitation reagents includes one or more of salts, organic solvents, or polymers, optionally where the salts can include a salt selected from ammonium sulfate, citrate salts, and cetyltrimethylammonium salts, the organic solvents can include an organic solvent selected from 2-methyl-2,4-pentanediol or 2-Methyl-2,4-pentanediol, and/or the polymers can include a polymer that is a polyethylene glycol.

In various embodiments, an amorphous polypeptide composition or a crystallized polypeptide composition (e.g., a carrier polypeptide composition, an active polypeptide composition) includes polypeptide crystals that are free, or substantially free, of one or more, or any, precipitation reagents, optionally wherein the precipitation reagents includes one or more of salts, organic solvents, or polymers, optionally where the salts can include a salt selected from ammonium sulfate, citrate salts, and cetyltrimethylammonium salts, the organic solvents can include an organic solvent selected from 2-methyl-2,4-pentanediol or 2-Methyl-2,4-pentanediol, and/or the polymers can include a polymer that is a polyethylene glycol.

Except where otherwise specified, those of skill in the art will appreciate that references relating to crystallization in the art refer to crystallization of molecules that are not polypeptides, e.g., to crystallization of molecules that are small molecules, e.g., small molecule therapeutics.

In various applications, peptide crystallization can produce well-ordered crystals with generally uniform content. While the present disclosure includes polypeptide compositions that include well-ordered crystals, the present disclosure also specifically includes the recognition that formulations do not require crystals having a particular or consistent size or character. In various embodiments, crystallized polypeptide compositions include one or more crystalline forms of a polypeptide (e.g., one or more polymorphs or hydrates of a polypeptide).

Those of skill in the art will appreciate from the present disclosure that compositions and methods provided herein are useful for the delivery of a wide variety of polypeptides. Among other things, the present disclosure provides the recognition that a wide range of polypeptides with different characteristics (e.g., molecular weight, molecule size, hydrophilicity, lipophilicity, modification patterns, preparation methods, etc.) can be utilized in formulations and methods as described herein. Those skilled in the art will appreciate that polypeptides useful in formulations, compositions, and methods as described herein can be grouped into different categories in a variety of ways.

In some embodiments, a polypeptide is a stapled peptide. In some embodiments, a polypeptide is a cyclic peptide generated through cyclization. In some embodiments, a polypeptide is a peptide comprising bicycles through chemical linkage.

In some embodiments, a polypeptide is a hydrophobic peptide. In some embodiments, a polypeptide is a hydrophilic peptide.

In some embodiments, a polypeptide is a peptide comprising dual agonists.

In some embodiments, a polypeptide is generated through Phage display technology. In some embodiments, a polypeptide is generated through peptidomimetics approach. In some embodiments, a polypeptide is a polypeptide is generated through genetic engineering. In some embodiments, a polypeptide is generated from antibodies (e.g., antibody fragments) with a molecular weight of less than 60 k Da. In some embodiments, a polypeptide is generated through non-ribosomal method. In some embodiments, a polypeptide is rationally designed based on protein-protein interaction.

In some embodiments, a polypeptide is a polypeptide comprising sustained release properties.

In some embodiments, a polypeptide is able to establish intramolecular hydrogen bonding.

In some embodiments, a polypeptide is a peptide comprising pH dependent solubility and/or stability.

Those skilled in the art will appreciate that formulations or methods described herein provide surprisingly improved properties and such surprisingly improved properties are observed across a wide range of polypeptide formulations comprising polypeptides with different characteristics (e.g., molecular weight, molecule size, hydrophilicity, lipophilicity, modification patterns, preparation methods, etc.). For example, those of skill in the art will appreciate from the present disclosure that compositions and methods provided herein are advantageous at least in part because they deliver polypeptides to the bloodstream and/or plasma after oral administration, e.g., buccal/sublingual administration, e.g., with advantageous pharmacokinetic properties.

In some embodiments, a polypeptide amenable to formulation as described herein has a molecular weight that may be, for example, at least about 25 kDa, 50 kDa, 100 kDa, 150 kDa, 200 kDa, 250 kDa, 300 kDa, 400 kDa, 500 kDa, 1,000 kDa, 2,000 kDa or greater. In some embodiments, a polypeptide has a molecular weight within a range, for example, from about 100 to about 1,000 kDa, e.g., from about 25 kDa to about 1,000 kDa, about 25 kDa to about 500 kDa, about 100 kDa to about 500 kDa, about 125 kDa to about 250 kDa, about 125 kDa to about 175 kDa, or about 150 kDa to about 300 kDa. In various embodiments, a polypeptide can have a molecular weight having a lower bound of e.g., about 100, 150, 200, 250, 300, 350, 400, 450, or 500 kDa and an upper abound of, e.g., about 100, 150, 200, 250, 300, 350, 400, 450, 500, 750, or 1,000 kDa.

In some embodiments, a polypeptide amenable to formulation as described herein has a molecular weight that may be, for example, between about 100 Da and 25 kDa, optionally wherein the molecular weight is between about 100 Da and about 1 kDa, about 100 Da and about 2 kDa, about 100 Da and about 3 kDa, about 100 Da and about 4 kDa, about 100 Da and about 5 kDa, about 100 Da and about 10 kDa, about 100 Da and about 15 kDa, or about 100 Da and about 20 kDa, In various embodiments, a polypeptide can have a molecular weight within a range having a lower bound of e.g., about 100 Da, 150 Da, 200 Da, 250 Da, 300 Da, 400 Da, 500 Da, 600 Da, 700 Da, 800 Da, 900 Da, 1 kDa, 2 kDa, 3 kDa, 4 kDa, or 5 kDa and an upper abound of, e.g., about 250 Da, 300 Da, 400 Da, 500 Da, 600 Da, 700 Da, 800 Da, 900 Da, 1 kDa, 2 kDa, 3 kDa, 4 kDa, 5 kDa, 10 kDa, 15 kDa, 20 kDa, 25 kDa, 50 kDa, 100 kDa, 150 kDa, 200 kDa, 300 kDa, 500 kDa, 800 kDa, 1,000 kDa, 1,500 kDa, or 2,000 kDa, wherein the upper bound of the range is higher than the lower bound of the range.

In some embodiments, a polypeptide amenable to formulation as described herein has a molecular weight that may be, for example, between about 500 Da and 70 kDa. In some embodiments, a polypeptide has a molecular weight that may be, for example, between about 5 kDa and 2,000 kDa. In some embodiments, a polypeptide has a molecular weight that may be, for example, between about 10 kDa and 500 kDa. In some embodiments, a polypeptide has a molecular weight that may be, for example, between about 20 kDa and 500 kDa. In some embodiments, a polypeptide has a molecular weight that may be, for example, between about 100 kDa and 150 kDa. In some embodiments, a polypeptide has a molecular weight that may be, for example, between about 150 kDa and 200 kDa.

In some embodiments, a polypeptide amenable to formulation as described herein can include, e.g., about 3 to about 1,000 amino acids, e.g., about 10 to about 500, about 10 to about 250, about 10 to about 100, about 100 to about 1,000, about 100 to about 750, about 100 to about 500, about 100 to about 250, about 250 to about 1,000, about 250 to about 750, or about 250 to about 500 amino acids. In various embodiments, polypeptides can include a number of amino acids within a range having a lower bound of, e.g., about 3, 10, 20, 30, 40, 50, 75, 100, 150, 200, 250, 300, 350, 400, 450, or 500 amino acids and an upper abound of, e.g., about 100, 150, 200, 250, 300, 350, 400, 450, 500, 750, or 1,000 amino acids, the lower bound being smaller than the upper bound.

In various embodiments, a polypeptide amenable to formulation as described herein can be a therapeutic polypeptide, e.g., an antibody agent, or antigen-binding portion thereof, an enzyme (e.g., a replacement enzyme), a hormone, a cytokine, etc., e.g., for administration to a subject in need thereof. Those of skill in the art will be familiar with the identities and character of a wide variety of therapeutic polypeptides.

In various embodiments, polypeptides can be or include recombinant polypeptides, isolated or synthetic polypeptides, cytoskeletal proteins, extracellular matrix proteins, plasma proteins, coagulation factors, acute phase proteins, hemoproteins, cell adhesion proteins, transmembrane transport proteins, synport/antiport proteins, hormones, growth factors, receptors, transmembrane receptors, intracellular receptors, DNA-binding proteins, transcription regulation proteins, RNA-binding proteins, immune system proteins, nutrient storage and transport proteins, chaperone proteins, enzymes, glycoproteins, phosphoproteins, membrane proteins, transport proteins, or lipoproteins, antibodies, recombinant antibodies, antibody fragments, monoclonal antibodies, modified enzymes, pegylated polypeptides, therapeutic polypeptides, storage polypeptides, enzymes, growth factors or hormones, immunomodifiers, anti-infectives, antiproliferatives, vaccines or other therapeutics, prophylactic, diagnostic polypeptides, and combinations thereof.

In various embodiments, a polypeptide can be or include an antibody or antibody fragment. In some embodiments, an antibody is a monoclonal antibody or fragment thereof. In some embodiments, an antibody is a polyclonal antibody or fragment thereof. In some embodiments, an antibody is natural, synthetic, or engineered.

Antibody fragments include Fab fragments (a single Fab that is isolated from a complete antibody by digestion with the enzyme papain) and F(ab')2 fragments (two Fabs covalently-bound to each other, produced by digesting the antibody with the enzyme pepsin). Fab fragments are monospecific, while F(ab')2 fragments are bispecific. Antibody fragments include double-stranded Fv (dsFv) fragments and single-chain Fv (scFv) fragments (the "v" stands for "variable" in both cases). A dsFv fragment consists of a Fab fragment minus the constant regions, i.e., consisting only of the variable regions of a heavy and light chain covalently bound to each other. A scFv fragment is a single polypeptide chain, consisting of the variable region of a heavy chain linked via a peptide linker to the variable region of a light chain. Classically, both dsFv and scFv fragments are monovalent (and thus mono-specific). However, two dsFv fragments or two scFv fragments can themselves be linked to form a bispecific fragment (which would be analogous to a F(ab')2 fragment without the constant regions). Furthermore, it is possible to link two dsFv fragments or scFv fragments with different antigen-binding sites (i.e., different specificities), to form a bi-specific fragment. Such fragments may be used as either research tools or therapeutic or diagnostic reagents.

In some embodiments, an antibody is an immunoglobulin. In a naturally-occurring immunoglobulin, each tetramer is composed of two identical pairs of polypeptide chains, each pair having one "light" (about 25 kDa) and one "heavy" chain (about 50-70 kDa). The amino-terminal portion of each chain includes a "variable" ("V") region of about 100 to 110 or more amino acids which are primarily responsible for antigen recognition. The carboxy-terminal portion of each chain defines an invariable region primarily responsible for effector function. The four chains are arranged in a classic "Y" model. The bottom "leg" of the "Y" is called the Fc region ("c" stands for "crystallizable" or, alternatively, "complement-binding") and is used to anchor the antibody within cell membranes, and is also used to bind macrophage cells and thus activate complementation. The two "arms" at the top of the "Y" are called Fab regions (the "ab" stands for "antigen-binding"). Each Fab region contains an invariable region (at the junction of the Fab and the Fc regions) and a variable region (which extends to the tip of the "Y" or Fc region). Each variable region contains identical antigen-binding sites (at regions within the variable regions called "hypervariable" regions) at each tip of the "Y". The term "hypervariable" region refers to amino acid residues from a complementarity-determining region or CDR (i.e., residues 24-34 (L1), 50-56 (L2) and 89-97 (L3) in the light chain variable domain and 31-35 (H1), 50-65 (H2) and 95-102 (H3) in the heavy chain variable domain as described by Kabat et al., Sequences of Proteins of Immunological Interest, 5th Ed. Public Health Service, National Institutes of Health, Bethesda, Md. (1991)). "Framework" or FR residues are the remaining variable region residues other than the hypervariable region residues. Each Fab region has one antigen-binding site, and the complete antibody molecule therefore has two antigen-binding sites (i.e., is "bivalent"). The two antigen-binding sites on a naturally occurring antibody are identical to each other, and therefore the antibody is specific for one antigen (i.e., is "monospecific").

Antibodies can be assigned to different classes depending on the amino acid sequence of the invariable domain of their heavy chains. Heavy chains are classified as mu ($\mu$), delta ($\Delta$), gamma ($\gamma$), alpha ($\alpha$), and epsilon ($\epsilon$), and define the antibody's isotype as IgM, IgD, IgG, IgA, and IgE, respectively. Typically, IgG, IgE and IgD occur as monomers, while IgA can occur as not only a monomer, but also a dimer or trimer, and IgM can occur as a pentamer. Several of the above may be further divided into subclasses or isotypes, e.g. IgG1, IgG2, IgG3, IgG4, IgA1 and IgA2. Different isotypes have different effector functions; for example, IgG1 and IgG3 isotypes have antibody-dependent cellular cytotoxicity (ADCC) activities. Human light chains are classified as kappa ($\kappa$) and lambda ($\lambda$) light chains. Within light and heavy chains, the variable and invariable regions are joined by a "J" region of about 12 or more amino acids, with the heavy chain additionally encompassing a "D" region of about 10 more amino acids (See generally, Fundamental Immunology, Ch. 7 (Paul, W., ed., 2nd ed. Raven Press, N.Y. (1989)).

In some embodiments, a polypeptide may be a chimeric antibody. Though naturally occurring antibodies are derived from a single species, engineered antibodies and antibody fragments may be derived from more than one species of animal, i.e., may be chimeric. Mouse (murine)/human chimeric antibodies have been generated, though other combinations are possible. Chimeric antibodies have been further broken down into two subtypes: chimeric and humanized. Chimeric murine/human antibodies typically contain approximately 75% human and 25% mouse amino acid sequences, respectively. The human sequences represent invariable regions of an antibody while the mouse sequences represent variable regions (and thus contain the antigen-binding sites) of an antibody. The general rationale for using such chimeras is to retain antigen specificity of a mouse antibody but reduce the immunogenicity of a mouse antibody (a murine antibody would cause an immune response against it in species other than the mouse) and thus be able to employ a chimera in human therapies. Chimeric antibodies also include those which include CDR regions from different human antibodies. CDR regions, also called hypervariable regions, are sequences within variable regions of antibody molecules that generate antigen-binding sites. CDR regions are so-named because the binding site is complementary in shape and charge distribution to the epitope recognized on an antigen. Alternatively, chimeric antibodies include framework regions from one antibody and CDR regions from another antibody. Chimeric antibodies also include those which include CDR regions from at least two different human antibodies. Humanized antibodies typically contain approximately 90% (or more) human amino acid sequences. In this scenario, the only murine sequences present are those for a hypervariable region (that are the actual antigen-binding sites contained within a variable region). Humanized antibodies have minimal mouse immunogenicity as compared with chimeric antibodies.

Examples of antibodies and antibody fragments include, without limitation, Idarucizumab (Praxbind®), Raxibacumab (ABTHRAX®), Atezolizumab (TECENTRIQ®, RG7446 (Roche)), Ofatumumab (Arzerra®), Obinutuzumab (GAZYVA®, GA101 (Roche)), Bezlotoxumab (ZINPLAVA™), Necitumumab (Portrazza™), Obiltoxaximab (ANTHIM®), Olaratumab (Lartruvo™), Rituximab (RITUXAN®, ABP 798 (Amgen), MabThera®, GP2013 (Novartis)), Tositumomab (Bexxar®), Trastuzumab (HERCEPTIN®, ABP 980 (Amgen), HERTRAZ™, CANMAB™), Pertuzumab (PERJETA®, RG1273 (Roche)), Tocilizumab (ACTEMRA®), Bevacizumab (AVASTIN®, ABP 215 (Amgen)), Daratumumab (Darzalex®), Elotuzumab (EMPLICITI™), Siltuximab (SYLVANT™), Panitumumab (Vectibix®), Vedolizumab (Entyvio®), Eculizumab (Soliris®), Natalizumab (TYSABRI®), Cetuximab (ERBITUX®), Ipilimumab (YERVOY®), Reslizumab (CINQAIR®), Pembrolizumab (KEYTRUDA®), Nivolumab (OPDIVO®), Infliximab (REMICADE®, ABP 710 (Amgen), FLIXABI®), Abciximab (ReoPro®), Evolocumab (Repatha®), Secukinumab (Cosentyx®), Certolizumab pegol (Cimzia®), Ixekizumab (TALTZ™), Omalizumab (Xolair®), Canakinumab (Ilaris®), Alirocumab (Praluent®), Daclizumab (ZINBRYTA™, ZENAPAX®), Denosumab (XGEVA®), Denosumab (Prolia®), Mepolizumab (Nucala), Ustekinumab (Stelara®), Golimumab (Simponi®), Adalimumab (HUMIRA®, ABP501 (Amgen), GP2017 (Novartis)), Ramucirumab (CYRAMZA®), Ranibizumab (LUCENTIS®, RG3645 (Roche & Novartis)), Efalizumab (Raptiva®), Palivizumab (Synagis®), Ado-trastuzumab emtansine (KADCYLA™) Alemtuzumab (Campath®), Alemtuzumab (LEMTRADA™), Basiliximab (Simulect®), Belimumab (Benlysta®), Blinatumomab (BLINCYTO®), Brentuximab vedotin (Adcetris), Capromab pendetide (ProstaScint®), Dinutuximab (Unituxin), Elotuzumab (EMPLICITI™), Gemtuzumab ozogamicin (Mylotarg), Ibritumomab tiuxetan (Zevalin®), Itolizumab (Alzumab™), Muromonab (Orthoclone OKT3®), Nimotuzumab (Theracim®), Nofetumomab (Verluma®), and biosimilars and combinations thereof. In various embodiments, examples of antibodies and antibody fragments include, without limitation, Abciximab, Palivizumab, Murumonab-CD3, Gemtuzumab, Trastuzumab, Basiliximab, Daclizumab, Etanercept, Ibritumomab, and/or Tiuxetan.

Examples of antibodies and antibody fragments include, without limitation, anti-cytokine antibodies, anti-CD antigen antibodies (e.g. anti-CD3, -CD20 (Rituximab), anti-CD25, anti-CD52, anti-CD33, and anti-CD11a), anti-TNF-α (e.g., Infliximab), anti-rattlesnake venom, anti-ICAM (e.g., anti-ICAM-1 and anti-ICAM-3), anti-growth factor antibodies (e.g., anti-VEGF), anti-growth factor receptor antibodies (e.g., anti-HER2/neu (Trastuzumab), and anti-EGFR), anti-immunoglobulin antibodies (e.g., anti-IgE), anti-polyclonal Ab antibodies, anti-viral antibodies (e.g., anti-CMV, anti-HIV (anti-gp120), anti-HBV, anti-RSV (anti-F glycoprotein)), anti-complement antibodies (e.g., anti-C5), anti-clotting factor antibodies (e.g., anti-gpIIb/IIIa and anti-Factor VII), anti-interleukin antibodies (e.g., anti-IL-5, anti-IL-4, and anti-IL-8), antibodies targeted to the Major Histocompatability Complex (e.g., anti-HLA), anti-idiotypic antibodies, anti-integrin antibodies (e.g., anti-β-2-integrin), anti-17-IA cell surface antigen, anti-α4β7, anti-VLA-4, anti-CBL, and combinations thereof.

In some embodiments, a polypeptide is a biosimilar antibody. A biosimilar is generally similar to the reference either physiochemically or biologically, both in terms of safety and efficacy. A biosimilar can be evaluated against a reference using one or more in vitro studies. In vitro comparisons may be combined with in vivo data demonstrating similarity of pharmacokinetics, pharmacodynamics, and/or safety. Clinical evaluations can include comparisons of pharmacokinetic properties (e.g., AUC0-inf, AUC0-t, Cmax, tmax, Ctrough); pharmacodynamic endpoints; or similarity of clinical efficacy (e.g., using randomized, parallel group comparative clinical trials). Differences between a biosimilar and a reference can include post-translational modification, e.g. by conjugating one or more biochemical groups such as a phosphate, various lipids and carbohydrates; by proteolytic cleavage following translation; by changing the chemical nature of an amino acid (e.g., formylation); or by many other mechanisms. Other post-translational modifications can be a consequence of manufacturing process operations—for example, glycation may occur with exposure of the product to reducing sugars. In other cases, storage conditions may be permissive for certain degradation pathways such as oxidation, deamidation, or aggregation.

Those skilled in the art will be aware of a variety of contexts in which antibodies can generally be used therapeutically, e.g., for the treatment of cancer, inflammation, cardiovascular disease, and transplant rejection, by virtue of their specific target-binding properties and/or target neutralization, e.g., binding and/or neutralization of targets associated with disease states. For example, the monoclonal antibody Infliximab binds to tumor necrosis factor and neutralizes its role in inflammation by blocking its interaction with a cell surface receptor. Rituximab targets malignant B lymphocytes by binding to their cell surface CD20 antigen. Clinically relevant antibodies may also be classified according to the therapeutic area in which they are to be employed. In some embodiments, a clinical antibody employed for therapeutic use may include those for treating cancers (e.g., pancreatic cancer), inflammatory diseases (e.g., autoimmune diseases, arthritis), cardiovascular diseases (e.g., strokes), infectious disease (e.g., HIV/AIDS), respiratory diseases (e.g., asthma), tissue transplantation rejection and organ transplantation rejection. In some embodiments, a clinical antibody is employed for radioimmunotherapy.

In various embodiments, a polypeptide can be or include a polypeptide replacement therapy, an enzyme (such as a therapeutic replacement enzyme), and/or a fusion polypeptide. Examples of polypeptides and/or enzymes include, e.g., an antibody (e.g., an anti-HER2 antibody, e.g., trastuzumab), a GLP-1 receptor agonist, human glucagon-like peptide-1 (GLP-1) or an analog thereof (e.g., a synthetic analog, e.g., liraglutide), parathyroid hormone or an analog thereof (e.g., recombinant human parathyroid hormone analog, e.g., teriparatide), human growth hormone (e.g., Norditropin NordiFlex® R (human growth hormone (human recombinant)), insulin or an analog thereof (e.g., Humulin®), rituximab, bevacizumab, cetuximab, etanercept, infliximab, or an analog or derivative thereof. Examples of enzymes, e.g., for replacement enzyme therapy, can include agalsidase beta, agalsidase alfa, imiglucerase, aliglucerase alfa, velaglucerase alfa, alglucerase, sebelipase alpha, laronidase, idursulfase, elosulfase alpha, galsulfase, pancrelipase, sapropterin, eliglustat, galsulfase, asfotase alfa, pegvaliase, elapegademase, and/or sacrosidase. Examples of replacement polypeptides include Factor I, Factor II, Factor III, Factor IV, Factor V, Factor VI, Factor VII, Factor VIII, Factor IX, Factor X, Factor XI, Factor XII, Factor XIII, and/or von Willebrand factor. Examples of fusion polypeptides can include, e.g., etanercept, aflibercept, rilonacept, alefacept, romiplostim, abatacept/belatacept, and/or denileukin-diftitox. The present disclosure includes analogs and modified forms of polypeptides disclosed herein, e.g., that include one or more pendant groups or modifications, e.g., pegylation, acetylation, amidation, lipidation, methylation, phosphorylation, glycosylation, glycation, sulfation, mannosylation, nitrosylation, acylation, palmitoylation, prenylation, or combinations thereof. In various particular embodiments, a polypeptide includes one or more pendant groups or modifications selected from pegylation and/or fatty acids. Those skilled in the art will appreciate that the modified polypeptides of the present disclosure encompass polypeptides with non-natural amino acids, with altered amino acids, with altered intramolecular binding properties, with chemical modification of the backbone.

In some embodiments, a polypeptide is conjugated with another molecule, e.g., small molecules (e.g., fluorophores, chelating agents and therapeutics), oligosaccharides, lipids (e.g., ionizable cationic lipids), oligonucleotides, antibodies, etc. In some embodiments, a polypeptide is conjugated to a ligand that targets a site of therapeutic relevance. In some embodiments, a polypeptide is conjugated to a ligand that targets a cell surface receptor, e.g., carbohydrate receptors, lipoprotein receptors, transferring receptors, receptors involved cell adhesion, etc. In some embodiments, a polypeptide is conjugated to a cell penetrating peptide. In some embodiments, a polypeptide is conjugated to an albumin binding peptide. In some embodiments, a polypeptide is conjugated to an albumin binding antibody fragment. In some embodiments, a polypeptide is conjugated to a passive or active transport enhancers. In some embodiments, a polypeptide is conjugated to a mucoadhesive device.

In some embodiments, a polypeptide of the present disclosure is insulin or an analog thereof (e.g., Humulin®). In some embodiments, a polypeptide of the present disclosure is lantus/insulin glargine. In some embodiments, a polypeptide of the present disclosure is parathyroid hormone (PTH). In some embodiments, a polypeptide of the present disclosure is liraglutide. In some embodiments, a polypeptide of the present disclosure is octreotide acetate. In some embodiments, a polypeptide of the present disclosure is trastuzumab. In some embodiments, a polypeptide of the present disclosure is human growth hormone (e.g., Norditropin NordiFlex® R (human growth hormone (human recombinant). In some embodiments, a polypeptide of the present disclosure is adalimumab. In some embodiments, a polypeptide of the present disclosure is semaglutide.

The present disclosure further relates to engineered and/or biosimilar forms of therapeutic polypeptides, which such forms may, for example, show at least 80% sequence identity with their reference polypeptide, e.g., at least 80%, 85%, 90%, 95%, 96%, 97%, 98%, or 99% identity with such reference polypeptide.

The present disclosure further includes the recognition that polypeptides, including, e.g., antibodies and/or antibody fragments, are generally not referred to as "small molecules" or "compounds" in the art. Accordingly, because small molecules and compounds can have very different physical and pharmacokinetic properties than polypeptides as disclosed herein, e.g., than antibodies and/or antibody fragments, prior art disclosures relating to small molecules and compounds would not be understood as applicable by those of skill in the art to the formulations and methods relating to polypeptides as disclosed herein.

In various embodiments, a carrier polypeptide composition comprises or is, for example, selected from antibodies, contractile proteins, enzymes, hormonal proteins, structural proteins, storage proteins, and transport protein, or combinations thereof.

In some embodiments, a carrier polypeptide composition comprises or is, for example, selected from albumins, gluten, globulins, glutenin, prolamin, legumin, vicillin, glycinin, conglycinin, gliadins, myoglobulins, collagen, elastin, myosin, actin, tropomyosin, troponin, alpha, beta and kappa caseins, alpha and beta zein, convicillin, gelatin, ovalbumin, sericin, fibroin, beta lactoglobulin, glutelins, helianthinin, immunoglobulins, ovomucoid, ovomucin lysozyme, or ovotransferrin, or a combination thereof.

In some embodiments, a carrier polypeptide composition comprises or is amylase.

In some embodiments, a carrier polypeptide composition comprises or is albumin.

Formulations

As appreciated by those skilled in the art, in some aspects, a polypeptide formulation as described herein is in a form suitable for oral administration, e.g., buccal/sublingual administration. In some embodiments, a provided formulation is a truffle formulation. In some embodiments, a provided formulation is a tablet formulation. In some embodiments, a provided formulation is a globule formulation. In some embodiments, a provided formulation is a candy formulation. In some embodiments, a provided formulation is a capsule formulation. In some embodiments, a provided formulation may be in the form of a dry powder (e.g., a dry spray). In some embodiments, a provided formulation may be in the form of a solid particle suspension. In some embodiments, a provided formulation may be in the form of a fast-dissolving tablet. In some embodiments, a provided formulation may be in the form of a fast-dissolving film.

In various embodiments, a polypeptide formulation as described herein, e.g., a truffle formulation, a tablet formulation, a globule formulation, a candy formulation, a capsule formulation, can include a coating. In some embodiments, a coating is or comprises an enteric coating. An enteric coating is typically a barrier that controls the location of a recipients body (e.g., digestive system, e.g., gut, e.g., small and/or large intestine) in which an oral formulation's core is exposed and/or to which the oral formulation's core is delivered. Many enteric coatings are insoluble at a low pH but dissolve, swells, or becomes soluble at a higher pH in the intestinal tract. Typical materials used for enteric coatings can include CAP (cellulose acetate phthalate), CAT (cellulose acetate trimellitate), PVAP (poly(vinyl acetate phthalate)) and HPMCP (hydroxypropyl methylcellulose phthalate), poly(methacrylic acid-co-methyl methacrylate), fatty acids, waxes, shellac (e.g., esters of aleurtic acid), plastics, and plant fibers. In various embodiments, the dissolution pH of an enteric coating can be between, e.g., about 4.5 and about 7, e.g., about 4.5 to about 5.5, about 4.5 to about 6.0, about 5.5 to about 7.0, about 5.0, about 6.2, or about 7.0. In various embodiments an enteric coating has a pH release that is within a range that has a lower bound of about 4.5, 5.0, 5.5, or 6.0 and an upper bound of about 5.0, 5.5, 6.0, 6.5, 7.0, or 7.5.

The present disclosure expressly includes the recognition that enteric coatings are not necessary for delivery of a polypeptide disclosed herein according to various embodiments methods and compositions as described herein to reach the bloodstream, plasma, lymphatic system, and/or thoracic duct, e.g., in therapeutically effective amounts.

In various embodiments, a formulation that includes an amorphous polypeptide composition or a crystallized polypeptide composition is or includes a bioadhesive formulation, e.g., in or on the surface of a formulation, e.g., truffle, tablet, globule, candy, or capsule formulation. In various embodiments, a bioadhesive formulation adheres to a specific biological location such as a mucosal lining (mucoadhesion). Bioadhesive dosage forms can improve the oral absorption of polypeptide agent by delivering it in small doses over an extended period and/or localizing it in the intestine by bioadhesion. Various bioadhesive polymers can be broadly as specific or nonspecific. Specific bioadhesive polymers (e.g., lectins, and fimbrins) have the ability to adhere to specific chemical structures within the biological molecules while the nonspecific bioadhesive polymers (e.g., polyacrylic acid [PAA] and cyanoacrylates) have the ability to bind with both the cell surfaces and the mucosal layer. Further examples of bioadhesive polymers include CMC sodium, Carbopol, Polycarbophil, Tragacanth, Sodium alginate, HPMC, Gum karaya, Gelatin, Guar gum, Pectin, Acacia, Chitosan, and hydroxypropyl cellulose. Examples of bioadhesive polymers can include Hydrophilic polymers (e.g., Methyl Cellulose, hydroxyethyl cellulose, HPMC, Na CMC, and carbomers), Thiolated polymers (e.g., Chitosan-iminothiolane, PAA-cysteine, PAA-homocysteine, chitosan-thioglycolic acid, chitosan-thioethylamidine, alginate-cysteine, poly (methacrylic acid)-cysteine and sodium carboxymethylcellulose-cysteine), Lectin-based polymers (e.g., Lentil lectin, peanut agglutinin, and *Ulex europaeus* agglutinin), Polyox WSR (e.g., WSR N-10, WSR N-80, WSR N-205, and WSR N-750), and other polymers such as tomato lectin, PAA-co-PEG, and PSA.

The present disclosure includes methods and compositions that include a polypeptide formulation for oral delivery including a core within a pharmaceutically acceptable shell, where the core includes a polypeptide composition (e.g., an amorphous polypeptide composition or a crystallized polypeptide composition).

In various embodiments, a core comprises about 1 mg to 2,000 mg of carrier polypeptide (e.g., crystalized polypeptide or amorphous polypeptide). In various embodiments, a core comprises about 1 mg to 1,000 mg, 1 mg to 500 mg, 1 mg to 400 mg, 1 mg to 300 mg, 1 mg to 200 mg, or 1 mg to 100 mg of crystalized polypeptide or amorphous carrier polypeptide. In some embodiments the formulation includes an amount of crystalized polypeptide or amorphous polypeptide that is within a range having a lower bound of, e.g., 1, 5, 10, 15, 20, 25, 30, 35, 40, 45, 50, 75, 100, 150, 200, 250, 300, 350, 400, 450, or 500 mg crystalized polypeptide or amorphous polypeptide and an upper bound of 100, 150, 200, 250, 300, 350, 400, 450, 500, 1,000, or 2,000 mg crystalized polypeptide or amorphous polypeptide. In various embodiments, a core comprises about 50 µg to 2,000 mg of carrier polypeptide, optionally wherein the polypeptide formulation includes about 50 µg to 1,000 mg, 50 µg to 500 mg, 50 µg to 400 mg, 50 µg to 300 mg, 50 µg to 200 mg, 50 µg to 100 mg, 50 µg to 50 mg, 50 µg to 25 mg, 50 µg to 20 mg, 50 µg to 15 mg, 50 µg to 10 mg, 50 µg to 5 mg, 50 µg to 1 mg, 50 µg to 500 µg, 1 mg to 1,000 mg, 1 mg to 500 mg, 1 mg to 400 mg, 1 mg to 300 mg, 1 mg to 200 mg, 1 mg to 100 mg, 1 mg, to 50 mg, 1 mg to 25 mg crystalized polypeptide or amorphous polypeptide. In various embodiments, a core comprises about 1 µg to 2,000 mg of carrier polypeptide, optionally wherein the polypeptide formulation includes about 1 µg to 1,000 mg, 1 µg to 500 mg, 1 µg to 400 mg, 1 µg to 300 mg, 1 µg to 200 mg, 1 µg to 100 mg, 1 µg to 50 mg, 1 µg to 25 mg, 1 µg to 20 mg, 1 µg to 15 mg, 1 µg to 10 mg, 1 µg to 5 mg, 1 µg to 1 mg, 1 µg to 500 µg, 1 µg to 250 µg, 1 µg to 200 µg, 1 µg to 150 µg, 1 µg to 100 µg, 1 µg to 50 µg of the crystalized polypeptide or amorphous polypeptide. In some embodiments the formulation includes an amount of crystalized carrier polypeptide or amorphous carrier polypeptide that is within a range having a lower bound of, e.g., 1 µg, 5 µg, 10 µg, 15 µg, 20 µg, 25 µg 50 µg, 100 µg, 200 µg, 300 µg, 400 µg, 500 µg, 600 µg, 700 µg, 800 µg, 900 µg, 1 mg, 2 mg, 3 mg, 4 mg, 5 mg, 10 mg, or 25 mg crystalized polypeptide or amorphous polypeptide and an upper bound of 500 µg, 600 µg, 700 µg, 800 µg, 900 µg, 1 mg, 2 mg, 3 mg, 4 mg, 5 mg, 10 mg, 25 mg, 50 mg, 100 mg, 500 mg, 1,000 mg, or 2,000 mg crystalized polypeptide or amorphous polypeptide.

In various embodiments, a core comprises about 1 mg to 2,000 mg of active polypeptide (e.g., crystalized polypeptide or amorphous polypeptide). In various embodiments, a core comprises about 1 mg to 1,000 mg, 1 mg to 500 mg, 1 mg to 400 mg, 1 mg to 300 mg, 1 mg to 200 mg, or 1 mg to 100 mg of crystalized polypeptide or amorphous active polypeptide. In some embodiments the formulation includes an amount of crystalized polypeptide or amorphous polypeptide that is within a range having a lower bound of, e.g., 1, 5, 10, 15, 20, 25, 30, 35, 40, 45, 50, 75, 100, 150, 200, 250, 300, 350, 400, 450, or 500 mg crystalized polypeptide or amorphous polypeptide and an upper bound of 100, 150, 200, 250, 300, 350, 400, 450, 500, 1,000, or 2,000 mg crystalized polypeptide or amorphous polypeptide. In various embodiments, a core comprises about 50 µg to 2,000 mg of active polypeptide, optionally wherein the polypeptide formulation includes about 50 µg to 1,000 mg, 50 µg to 500 mg, 50 µg to 400 mg, 50 µg to 300 mg, 50 µg to 200 mg, 50 µg to 100 mg, 50 µg to 50 mg, 50 µg to 25 mg, 50 µg to 20 mg, 50 µg to 15 mg, 50 µg to 10 mg, 50 µg to 5 mg, 50 µg to 1 mg, 50 µg to 500 µg, 1 mg to 1,000 mg, 1 mg to 500 mg, 1 mg to 400 mg, 1 mg to 300 mg, 1 mg to 200 mg, 1 mg to 100 mg, 1 mg, to 50 mg, 1 mg to 25 mg crystalized polypeptide or amorphous polypeptide. In various embodiments, a core comprises about 1 µg to 2,000 mg of active polypeptide, optionally wherein the polypeptide formulation includes about 1 µg to 1,000 mg, 1 µg to 500 mg, 1 µg to 400 mg, 1 µg to 300 mg, 1 µg to 200 mg, 1 µg to 100 mg, 1 µg to 50 mg, 1 µg to 25 mg, 1 µg to 20 mg, 1 µg to 15 mg, 1 µg to 10 mg, 1 µg to 5 mg, 1 µg to 1 mg, 1 µg to 500 µg, 1 µg to 250 µg, 1 µg to 200 µg, 1 µg to 150 µg, 1 µg to 100 µg, 1 µg to 50 µg of the crystalized polypeptide or amorphous polypeptide. In some embodiments the formulation includes an amount of crystalized active polypeptide or amorphous active polypeptide that is within a range having a lower bound of, e.g., 1 µg, 5 µg, 10 µg, 15 µg, 20 µg, 25 µg 50 µg, 100 µg, 200 µg, 300 µg, 400 µg, 500 µg, 600 µg, 700 µg, 800 µg, 900 µg, 1 mg, 2 mg, 3 mg, 4 mg, 5 mg, 10 mg, or 25 mg crystalized polypeptide or amorphous polypeptide and an upper bound of 500 µg, 600 µg, 700 µg, 800 µg, 900 µg, 1 mg, 2 mg, 3 mg, 4 mg, 5 mg, 10 mg, 25 mg, 50 mg, 100 mg, 500 mg, 1,000 mg, or 2,000 mg crystalized polypeptide or amorphous polypeptide.

In various embodiments, one or more pharmaceutically acceptable carriers are present in a formulation (e.g., a truffle, a tablet, a globule, a candy, or a capsule formulation) or a core thereof at a concentration between 0.1 mM and about 1,000 mM, between about 0.1 mM and about 500 mM, between about 0.1 mM and about 200 mM, or between about 1 mM and about 100 mM. In various embodiments, one or more pharmaceutically acceptable carriers are present in a formulation (e.g., a truffle, a tablet, a globule, or a candy formulation) or a core thereof at a concentration within a range having a lower bound of 0.1, 1, 5, 10, 20, 30, 40, 50, 75, or 100 mM and an upper bound of 10, 20, 30, 40, 50, 75, 100, 150, 200, 250 or 500 mM.

In some embodiments, a polypeptide formulation as described herein is in a shape of sphere, cube, cone, cylinder, half sphere, torus, pyramid, triangular prism, hexagonal prism, cuboid, hexagonal pyramid, hallow cylinder, octahedron, diamond, star prism, hexagonal diamond, star pyramid, pentagonal prism, L shape prism, dodecahedron, tetrahedron, or icosahedron, or a modification thereof, or a combination thereof.

Those skilled in the art, reading the present disclosure will appreciate that, in some embodiments, a suitable means of administration for a particular provided formulation to a particular subject may be selected upon consideration, among other things, of, for example age and/or condition of a subject. Similarly, in some embodiments, unit dose, appropriate dosing regimen, and/or total dose to be administered may be selected based on sound medical judgment taking into consideration, for example, any designated or approved range is provided, weight, age, condition, and other characteristics of a patient, etc.

Those skilled in the art, reading the present disclosure will appreciate that, in some embodiments, it may be feasible to administer certain provided formulations by other routes. In some embodiments, certain provided formulations (e.g., truffle, tablet, globule, candy formulations) can be administered rectally as suppository formulations.

Suppository Formulations

Certain suppository formulations can include an amorphous polypeptide composition or a crystallized polypeptide composition and suppository excipients, e.g., a lipophilic base (e.g., cocoa butter, coconut oil, virgin coconut oil, almond oil, wheatgerm oil, any edible oil, hydrogenated vegetable oils, and hard fats) or hydrophilic base (e.g., glycerinated gelatin and polyethylene glycols). Lipophilic bases are immiscible with body fluids and readily melt at body temperature to release the drug on the mucosal surface, whereas hydrophilic bases need to dissolve in the physiological fluids for drug release. Suppository formulations can include solid, semi-solid, and liquid forms.

In various embodiments, a suppository formulation includes a semi-solid dosage form such as a gel or foam. A rectal gel can be a semi-solid formulations that contain a solvent trapped within a polymer network to create a viscous consistency. Viscosity of a gel can be modified by the addition of co-solvents (e.g., glycerin and propylene glycol) and electrolytes.

In various embodiments, a suppository formulation includes a liquid suppository, e.g., a liquid suppository including thermosensitive polymers (e.g., poloxamers), mucoadhesive polymers (e.g., carbopol, sodium alginate, polycarbophil, hydroxypropyl methylcellulose, hydroxyethyl cellulose, and methylcellulose), or a combination of thermosensitive and mucoadhesive polymers. Suppositories can further include, e.g., cellulose ether polymers (e.g., hydroxypropyl methylcellulose, hydroxyethyl cellulose, and methylcellulose).

In various embodiments, a suppository formulation includes a foam such as a colloidal dosage form with a hydrophilic liquid continuous phase containing a foaming agent and a gaseous dispersion phase distributed throughout. Following rectal administration, certain such formulations transition from a foam state to a liquid or semi-solid state on the mucosal surface. Foaming agents include amphiphilic substances that are important for foam generation and stabilization.

Exemplary Formulations
Truffle Formulations

In some embodiments, the present disclosure provides truffle formulations comprising a core and a pharmaceutically acceptable shell.

In some embodiments, a core comprises (1) a carrier polypeptide composition and (2) an active polypeptide composition (e.g., a powder form that includes amorphous polypeptide or crystallized polypeptide). In a provided truffle formulation, such a core can be situated in a shell. In some embodiments, a core comprises crystallized carrier polypeptide composition. In some embodiments, a core comprises crystallized active polypeptide composition. In some embodiments, a core comprises an amorphous carrier polypeptide composition. In some embodiments, a core comprises an amorphous active polypeptide composition.

In some embodiments, a shell is or comprises sugar. In some embodiments, a shell is or comprises cane sugar. In some embodiments, a shell is or comprises palm sugar. In certain embodiments, a shell is or comprises lactose. In certain embodiments, a shell is or comprises xylitol. In certain embodiments, a shell is or comprises milk sugar. In some embodiments, a shell is cane sugar. In some embodiments, a shell is palm sugar.

In some embodiments, a shell includes hardshell and soft shell. In various embodiments, a shell is a gelatin shell or hydroxypropyl methylcellulose (HPMC) shell. Exemplary shell materials can include polymers such as poly(glycolic acid) (PGA), poly(lactic acid) (PLA) and its copolymers, poly(lactide-co-glycolide) (PLGA), and non-ionic cellulose ethers such as hydroxypropylcellulose (HPC) and hydroxypropyl methylcellulose (HPMC). In some embodiments a capsule is a vegetable capsule.

In some embodiments, shell of a truffle formulation can be produced from a single piece of gelatin. Gelatin can be used to surround a core not based on water, as water would dissolve the gelatin. Once ingested, the shell dissolves, exposing the core.

In some embodiments, shell of a truffle formulation can be filled with a core including dry ingredients in powder form. In some such embodiments, a shell may be formed, its body is first filled with a core composition, and then the shell closed with the cap. Once ingested, the shell dissolves, exposing the core.

In some embodiments, a shell is hollow. In some embodiments, a shell is partially filled with space of a core. In some embodiments, a shell is partially fully with space of a core.

In some embodiments, a polypeptide formulation as described herein is in a shape of sphere, or a modification thereof. In some embodiments, a truffle formulation as described herein is in a shape of sphere, or a modification thereof.

Tablet Formulations

In some embodiments, the present disclosure provides a tablet formulation comprising comprises (1) a carrier polypeptide composition; (2) an active polypeptide composition (e.g., a powder form that includes amorphous polypeptide or crystallized polypeptide); and (3) a pharmaceutically acceptable carrier. In some embodiments, a tablet formulation as described herein is prepared by pressing a mixture of (1) a carrier polypeptide composition; (2) an active polypeptide composition; and (3) a pharmaceutically acceptable carrier.

Alternatively or additionally, in some embodiments, a tablet formulation as described herein is coated with a pharmaceutically acceptable coating. In some embodiments, a coating is or comprises food ingredient. In some embodiments, a coating comprises or is an enteric coating.

Globule Formulations

In some embodiments, the present disclosure provides a globule formulation comprising (1) a carrier polypeptide composition; (2) an active polypeptide composition (e.g., a powder form that includes amorphous polypeptide or crystallized polypeptide); and (3) a pharmaceutically acceptable carrier. In some embodiments, a globule formulation comprises a suspension of solid particles, wherein such solid particles comprise a crystallized or an amorphous carrier and active polypeptide compositions and optionally one or more pharmaceutically acceptable carriers.

Alternatively or additionally, in some embodiments, a globule formulation as described herein is coated with a pharmaceutically acceptable coating. In some embodiments, a coating is or comprises food ingredient. In some embodiments, a coating comprises or is an enteric coating.

Candy Formulations

In some embodiments, the present disclosure provides a candy formulation comprising (1) a carrier polypeptide composition; (2) an active polypeptide composition (e.g., a powder form that includes amorphous polypeptide or crystallized polypeptide); and (3) a pharmaceutically acceptable carrier.

In some embodiments, a candy formulation comprises one or more food ingredients, e.g., chocolate, cocoa, milk, milk product, natural dye, artificial dye, gum base, flavors, sweeteners, gelatin, starch, syrup, citric acid, sugar, etc.

In some embodiments, a candy formulation comprises about 50% w/w of sugar. In some embodiments, a candy formulation comprises about 60% w/w of sugar. In some embodiments, a candy formulation comprises about 70% w/w of sugar. In some embodiments, a candy formulation comprises about 80% w/w of sugar. In some embodiments, a candy formulation comprises about 90% w/w of sugar. In some embodiments, a candy formulation comprises about 91% w/w of sugar. In some embodiments, a candy formulation comprises about 92% w/w of sugar. In some embodiments, a candy formulation comprises about 93% w/w of sugar. In some embodiments, a candy formulation comprises about 94% w/w of sugar. In some embodiments, a candy formulation comprises about 95% w/w of sugar. In some embodiments, a candy formulation comprises about 96% w/w of sugar. In some embodiments, a candy formulation comprises about 97% w/w of sugar. In some embodiments, a candy formulation comprises about 98% w/w of sugar. In some embodiments, a candy formulation comprises about 99% w/w of sugar.

In some embodiments, a candy formulation comprises more than about 50% w/w of sugar. In some embodiments, a candy formulation comprises more than about 60 w/w of sugar. In some embodiments, a candy formulation comprises more than about 70% w/w of sugar. In some embodiments, a candy formulation comprises more than about 80% w/w of sugar. In some embodiments, a candy formulation comprises more than about 90% w/w of sugar. In some embodiments, a candy formulation comprises more than about 95% w/w of sugar. In some embodiments, a candy formulation comprises more than about 99% w/w of sugar. In some embodiments, a candy formulation comprises more than about 99.9% w/w of sugar.

In some embodiments, a candy formulation comprises less than about 50% w/w of sugar. In some embodiments, a candy formulation comprises less than about 40 w/w of sugar. In some embodiments, a candy formulation comprises less than about 30% w/w of sugar. In some embodiments, a candy formulation comprises less than about 20% w/w of sugar. In some embodiments, a candy formulation comprises less than about 10% w/w of sugar. In some embodiments, a candy formulation comprises less than about 5% w/w of sugar. In some embodiments, a candy formulation comprises less than about 3% w/w of sugar. In some embodiments, a candy formulation comprises less than about 2% w/w of sugar. In some embodiments, a candy formulation comprises less than about 1% w/w of sugar. In some embodiments, a candy formulation comprises less than about 0.5% w/w of sugar. In some embodiments, a candy formulation comprises less than about 0.1% w/w of sugar.

In some embodiments, a candy formulation is in a form of, for example, of candy gems, chewing gum, gummy candy, hard candy (e.g., drops, lollipops, lozenges, rock candy, stick candy, etc.) marshmallows, syrup, toffee, etc. In some embodiments, a candy formulation may be in the form of a drop, film, gel, patch, spray, wafer, etc.

Capsule Formulations

In some embodiments, the present disclosure provides a capsule formulation comprising (1) a carrier polypeptide composition; (2) an active polypeptide composition (e.g., a powder form that includes amorphous polypeptide or crystallized polypeptide); and (3) a pharmaceutically acceptable carrier, optionally wherein a pharmaceutically acceptable carrier comprises a Vitamin E agent.

In some embodiments, a core including (1) a carrier polypeptide composition and (2) an active polypeptide composition (e.g., a powder form that includes amorphous polypeptide or crystallized polypeptide) can be encapsulated in a polymer capsule. In some embodiments, a capsule formulation includes pharmaceutically acceptable capsules suitable for oral administration or rectal administration. In some embodiments, provided capsule formulations are capsules suitable for delivery, e.g., specific delivery, of a polypeptide to the gut. In various embodiments, capsules of the present disclosure are capsules suitable for delivery, e.g., specific delivery, of a polypeptide to one or both the small intestine and/or large intestine.

Capsules of the present disclosure include hard-shell capsules and soft-shell capsules. In various embodiments, a capsule is a gelatin capsule or hydroxypropyl methylcellulose (HPMC) capsule. Exemplary capsule materials can include polymers such as poly(glycolic acid) (PGA), poly (lactic acid) (PLA) and its copolymers, poly(lactide-co-glycolide) (PLGA), and non-ionic cellulose ethers such as hydroxypropylcellulose (HPC) and hydroxypropyl methylcellulose (HPMC). In some embodiments a capsule is a vegetable capsule.

Soft gelatin capsules, also called softgels, can be produced from a single piece of gelatin. They can be used to encapsulate solutions not based on water, as water would dissolve the gelatin. Once ingested, the capsule dissolves, exposing the core.

Hard gelatin capsules are made of two parts, a body and a cap. Hard gelatin capsules can be filled with a core including dry ingredients in powder form. The body is first filled with a core composition, and the capsule is then closed with the cap. Once ingested, the hard capsules dissolves, exposing the core.

Suppository Formulations

The present disclosure further includes suppositories suitable for rectal delivery. In various embodiments, suppositories melt or dissolve upon administration. In various embodiments, a suppository includes a shell (e.g., a cane sugar shell or a capsule shell disclosed herein) that surrounds a core. In various embodiments, a suppository does not include a shell-core structure. Suppositories can be formed from waxy matter, structured glycerine, hydrogenated vegetable oil, polyethylene glycol wax derivative, or poloxamer-based mixtures. In various embodiments, a suppository is solid at ambient temperature but rapidly melts at body temperature. Emulsifiers may be used to increase the solubility of crystallized polypeptide or amorphous polypeptide in the suppository mass and/or accelerate the dispersal of crystallized polypeptide or amorphous polypeptide after the suppository melts.

Polypeptide formulations as described herein are suitable for oral administration or rectal administration.

Polypeptide Delivery and Applications

Compositions and methods provided by present disclosure include formulations for oral administration to a subject, which oral administration, in various embodiments, results in delivery of a polypeptide to e.g., thoracic duct, lymphatic system, small and/or large intestine, and/or bloodstream of a subject.

Without wishing to be bound by any particular scientific theory, the present inventors have surprisingly discovered that polypeptides orally administered polypeptide formulations as described herein, e.g., truffle, tablet, globule, candy, or capsule formulations, are efficiently delivered to the bloodstream, e.g., via buccal/sublingual administration. Accordingly, the present disclosure provides a platform or system of general, including compositions and methods disclosed herein, for delivery of diverse polypeptides to the thoracic duct, lymphatic system, small and/or large intestine, and/or blood stream.

The present disclosure provides compositions and methods, e.g., for delivery of a polypeptide to a subject, e.g., to the thoracic duct, lymphatic system, small and/or large intestine, and/or blood stream of the subject. In various embodiments, composition or method as described herein delivers polypeptide to bloodstream with beneficial pharmacokinetic characteristics. In various embodiments, beneficial pharmacokinetic characteristics can result from distribution of a polypeptide through mouth tissue, e.g., via buccal/sublingual administration. Accordingly, the present disclosure specifically includes methods and compositions for delivery of a polypeptide to mouth tissue, e.g., via buccal/sublingual administration.

In various embodiments, an active polypeptide of a provided formulation is characterized in that after administration according to the present disclosure, an active polypeptide delivered to bloodstream thereby has a median, mean, or modal half-life in a plurality of serum samples, systems, and/or across polypeptide molecules after administration (e.g., across a plurality of subjects after oral administration of a polypeptide formulation to each subject) of at least 0.5 hours, optionally wherein the half-life is at least 1, 2, 5, 10, 15, 20, 25, 30, 35, 40, 45, 50, 55, 60 hours, or more, optionally wherein the median, mean, or modal half-life is in a range having a lower bound of 1, 2, 5, 10, or 15 hours and an upper bound of 20, 25, 30, 35, 40, 45, 50, 55, 60 hours, or more. In various embodiments, after oral administration to a subject of a polypeptide formulation as described herein, the active polypeptide delivered to bloodstream by a provided formulation has a half-life of at least 0.5 hours, optionally wherein the half-life is at least 1, 2, 5, 10, 15, 20, 25, 30, 35, 40, 45, 50, 55, or 60 hours, or more, optionally wherein the half-life is in a range having a lower bound of 1, 2, 5, 10, or 15 hours and an upper bound of 20, 25, 30, 35, 40, 45, 50, 55, 60 hours, or more.

In various embodiments, an active polypeptide of a provided formulation is characterized in that after administration according to the present disclosure, an active polypeptide delivered to bloodstream by such provided formulation has a median, mean, or modal half-life across a plurality of samples, systems, and/or polypeptide molecules (e.g., across a plurality of subjects after oral administration of the polypeptide formulation to each subject) that is at least 10% greater than the median, mean, or modal half-life achieved by injection (e.g., intravenous administration) of the polypeptide (e.g., according to a standard of care route of administration for the polypeptide), optionally wherein the median, mean, or modal half-life of the polypeptide delivered to bloodstream by a provided formulation (e.g., after oral administration) is at least 20%, 30%, 40%, 50%, 60%, 70%, 80%, 90%, 100%, 2-fold, 3-fold, or 4-fold, greater than the median, mean, or modal half-life achieved by injection (e.g., intravenous administration) of the polypeptide (e.g., according to a standard of care route of administration for the polypeptide). In various embodiments, after oral administration to a subject of the polypeptide formulation, the active polypeptide delivered to bloodstream by a provided formulation has a half-life that is at least 10% greater than the half-life achieved by injection (e.g., intravenous administration) of the polypeptide (e.g., according to a standard of care route of administration for the polypeptide), optionally wherein the half-life of the polypeptide delivered to bloodstream by a provided formulation after oral administration to the subject is at least 20%, 30%, 40%, 50%, 60%, 70%, 80%, 90%, 100%, 2-fold, 3-fold, or 4-fold, greater than the half-life achieved by injection (e.g., intravenous administration) of the polypeptide (e.g., according to a standard of care route of administration for the polypeptide).

In various embodiments, an active polypeptide of a provided formulation is characterized in that after administration according to the present disclosure, an active polypeptide delivered thereby has a median, mean, or modal $T_{max}$ across a plurality of samples, systems, and/or polypeptide molecules (e.g., across a plurality of subjects after oral administration of the polypeptide formulation to each subject) that is at least 10% greater than the median, mean, or modal $T_{max}$ achieved by injection (e.g., intravenous administration) of the polypeptide (e.g., according to a standard of care route of administration for the polypeptide), optionally wherein the median, mean, or modal $T_{max}$ of the polypeptide of the polypeptide formulation (e.g., after oral administration) is at least 20%, 30%, 40%, 50%, 60%, 70%, 80%, 90%, 100%, 2-fold, 3-fold, or 4-fold, 5-fold, 10-fold, or 20-fold greater than the median, mean, or modal $T_{max}$ achieved by injection (e.g., intravenous administration) of the polypeptide (e.g., according to a standard of care route of administration for the polypeptide). In various embodiments, after oral administration to a subject of the polypeptide formulation, the active polypeptide of the polypeptide formulation has a $T_{max}$ that is at least 10% greater than the $T_{max}$ achieved by injection (e.g., intravenous administration) of the polypeptide (e.g., according to a standard of care route of administration for the polypeptide), optionally wherein the $T_{max}$ of the polypeptide of the polypeptide formulation after oral administration to the subject is at least 20%, 30%, 40%, 50%, 60%, 70%, 80%, 90%, 100%, 2-fold, 3-fold, or 4-fold, 5-fold, 10-fold, or 20-fold greater than the $T_{max}$ achieved by injection (e.g., intravenous administration) of the polypeptide (e.g., according to a standard of care route of administration for the polypeptide).

In various embodiments, active a polypeptide formulation is characterized in that after administration according to the present disclosure, an active polypeptide delivered thereby has a median, mean, or modal bioavailability across a plurality of samples, systems, and/or polypeptide molecules (e.g., across a plurality of subjects after oral administration of the polypeptide formulation to each subject) that is at least 1% of the median, mean, or modal bioavailability achieved by injection (e.g., subcutaneous administration) of the polypeptide (e.g., according to a standard of care route of administration for the polypeptide), optionally wherein the median, mean, or modal bioavailability of the polypeptide of the polypeptide formulation (e.g., after oral administration) is at least 1%, 1.5%, 2%, 3%, 4%, 5%, 10%, 20%, 30%, 40%, 50%, 60%, 70%, 80%, 90%, 100%, 2-fold, 3-fold, 4-fold, or 5-fold of the median, mean, or modal bioavailability achieved by injection (e.g., subcutaneous administration) of the polypeptide (e.g., according to a standard of care route of administration for the polypeptide). In various embodiments, after oral administration to a subject of a polypeptide formulation, the active polypeptide of the polypeptide formulation has an bioavailability that is at least 1% of the bioavailability achieved by injection (e.g., subcutaneous administration) of the polypeptide (e.g., according to a standard of care route of administration for the polypeptide), optionally wherein the bioavailability of the polypeptide of the polypeptide formulation after oral administration to the subject is at least 1%, 1.5%, 2%, 3%, 4%, 5%, 10%, 20%, 30%, 40%, 50%, 60%, 70%, 80%, 90%, 100%, 2-fold, 3-fold, 4-fold, or 5-fold of the bioavailability achieved by injection (e.g., subcutaneous administration) of the polypeptide (e.g., according to a standard of care route of administration for the polypeptide). In various embodiments, an active polypeptide of a polypeptide formulation is characterized in that after administration according to the present disclosure, an active polypeptide delivered thereby has a median, mean, or modal bioavailability across a plurality of samples, systems, and/or polypeptide molecules (e.g., across a plurality of subjects after oral administration of the polypeptide formulation to each subject) that is at least 1%, e.g., at least 1%, 1.5%, 2%, 3%, 4%, 5%, 10%, 20%, 30%, 40%, 50%, 60%, 70%, 80%, 90%, 100%. In some embodiments, provided formulations achieve oral bioavailability above about 5%, or within a range of about 10%-20% oral bioavailability, or about 15%.

In various embodiments, an active polypeptide of a polypeptide formulation is characterized in that after administration according to the present disclosure, a polypeptide delivered thereby has a median, mean, or modal $C_{max}$ across a plurality of samples, systems, and/or polypeptide molecules (e.g., across a plurality of subjects after oral administration of the polypeptide formulation to each subject) that is at least 10% less than the median, mean, or modal $C_{max}$ achieved by injection (e.g., subcutaneous administration) of the polypeptide (e.g., according to a standard of care route of administration for the polypeptide), optionally wherein the median, mean, or modal $C_{max}$ of the polypeptide of the polypeptide formulation (e.g., after oral administration) is at least 20%, 30%, 40%, 50%, 60%, 70%, 80%, or 90%, less than the median, mean, or modal $C_{max}$ achieved by injection (e.g., subcutaneous administration) of the polypeptide (e.g., according to a standard of care route of administration for the polypeptide). In various embodiments, after oral administration to a subject of a polypeptide formulation, the active polypeptide of the polypeptide formulation has a $C_{max}$ that is at least 10% less than the $C_{max}$ achieved by injection (e.g., subcutaneous administration) of the polypeptide (e.g., according to a standard of care route of administration for the polypeptide), optionally wherein the $C_{max}$ of the active polypeptide of the polypeptide formulation after oral administration to the subject is at least 20%, 30%, 40%, 50%, 60%, 70%, 80%, or 90%, less than the $C_{max}$ achieved by injection (e.g., subcutaneous administration) of the polypeptide (e.g., according to a standard of care route of administration for the polypeptide).

In various embodiments, a method can include administering a composition and/or formulation as described herein to a subject in need thereof, where the composition and/or formulation includes a polypeptide for treatment of a disease or condition from which the subject suffers.

Further disclosed herein are methods of treating a disease or disorder in mammals, including administering to the mammal a composition and/or formulation as described herein that includes a therapeutically effective amount of a polypeptide, and wherein a composition and/or formulation further includes a pharmaceutically acceptable viscosity-reducing agent, aggregation-reducing agent, or other additive as described above; and wherein a therapeutic formulation is effective for treatment of a diseases or disorder. In some embodiments, an excipient compound is essentially pure.

Those skilled in the art will be aware of appropriate applications of any particular provided formulation, for example based on the polypeptide(s) it delivers and/or its therapeutic usage. For example, therapeutic polypeptides are currently approved to treatment of diseases, conditions, or disorders such as breast cancer, gastric cancer, Non-Hodgkin's Lymphoma, urothelial carcinoma & solid tumors, Metastatic colorectal cancer, Non-squamous non-small cell lung cancer, Metastatic breast cancer, Hodgkin lymphoma, Biliary cancer, Acute myeloid Leukemia, prostate cancer, multiple myeloma, solid tumors of bone, neuroblastoma, pancreatic cancer, acute myelogenous leukemia, metastatic melanoma, metastatic squamous non-small cell cancer, Anaplastic astrocytoma; Brain cancer, Glioblastoma, Glioma, Head and neck cancer, Merkel cell carcinoma, Nasopharyngeal cancer, Oesophageal cancer, Hepatocellular carcinoma, refractory euroblastoma, Osteosarcoma, Peritoneal cancer, Fallopian tube cancer, Mesothelioma, Metastatic Melanoma, Renal Cell Carcinoma, NR-LU-10 for cancer, lupus, Chronic Lymphocytic Leukemia, soft tissue sarcoma, ovarian cancer, bladder cancer, esophageal cancer, gastric nasopharyngeal cancer, adrenocortical carcinoma, HER2-positive breast cancer, adenocarcinoma, Granulomatosis with Polyangiitis (GPA), microscopic polyangiitis, idiopathic pulmonary fibrosis, focal segmental glomerulosclerosis, Prolactinoma, and combinations thereof.

In some embodiments, a therapeutic use for a composition and/or formulation as described herein can include treatment and/or detection of an autoimmune disease such as Rheumatoid Arthritis (RA), Osteoarthritis, Juvenile Idiopathic Arthritis (JIA), Psoriatic Arthritis (PsA), Ankylosing Spondylitis (AS), Crohn's Disease (CD), Ulcerative Colitis (UC), Plaque Psoriasis (Ps), systemic lupus erythematosus, Lupus nephritis, Familial Cold Autoinflammatory Syndrome (FCAS), Sjogren's syndrome, and combinations thereof.

In some embodiments, a therapeutic polypeptide as described herein can be used for treatment and/or detection of another immunologically-related disorder such as Leukopaenia, paroxysmal nocturnal hemoglobinuria (PNH), atypical hemolytic uremic syndrome (aHUS), thrombotic microangiopathy (TMA), Inflammatory bowel disease, ulcerative colitis and transplantation rejection, surgery-related, life-threatening, uncontrolled bleeding, and combinations thereof.

In some embodiments, a therapeutic polypeptide as described herein can be used for treatment and/or detection of an infectious disease like *Clostridium difficile* infection, respiratory syncytial virus (RSV) disease, Anthrax, Flu virus infection, Influenza Virus infection, Hepatitis B virus infection, Rabies virus infection, invasive *Candida* infection, bacterial septic shock, HIV infection, Nosocomial pneumonia, Staphylococcal infections, STEC (Shiga-like toxin-producing *Escherichia coli* or *E. coli* serotype O121) infection causing diarrhea and HUS (hemolytic-uremic syndrome), Cytomegalovirus, Botulism, Ebola Virus, and combinations thereof.

In some embodiments, a therapeutic polypeptide as described herein can be used for treatment and/or detection of a cardiovascular disease such as cardiac ischemic complications, percutaneous coronary intervention, Acute myocardial infarction, pulmonary embolism, deep vein thrombosis, arterial thrombosis or embolism, occlusion of arteriovenous cannula, thrombocytopenia with chronic immune (idiopathic) thrombocytopenic purpura (ITP), and combinations thereof.

In some embodiments, a therapeutic polypeptide as described herein can be used for treatment and/or detection of an ophthalmic disorder such as Age-Related Macular Degeneration (AMD), Macular Edema, Retinal Vein Occlusion (RVO), Diabetic Macular Edema, Neuromyelitis optica, and combinations thereof.

In some embodiments, a therapeutic polypeptide as described herein can be used for treatment and/or detection of a respiratory disorder such as asthma, chronic idiopathic urticaria, acute bronchospasm or status asthmaticus, Chronic obstructive pulmonary disease, and combinations thereof.

In some embodiments, a therapeutic polypeptide as described herein can be used for treatment and/or detection of a metabolic disorder like hyperlipidemia, Diabetes mellitus type-1 and 2, Hypercholesterolaemia, dyslipidemia, and combinations thereof.

In some embodiments, a therapeutic polypeptide as described herein can be used for treatment and/or detection of a genetic disorder like Haemophilia A and B, Prader-Willi syndrome, Turner syndrome, Cryopyrin-Associated Periodic Syndromes (CAPS), Muckle-Wells Syndrome (MWS), X-linked hypophosphatemia, Sickle-cell pain crisis, and combinations thereof.

In some embodiments, a therapeutic polypeptide as described herein can be used for treatment and/or detection of a bone-related ailment like Osteoporosis, aplastic anaemia, and combinations thereof.

In some embodiments, a therapeutic polypeptide as described herein can be used for treatment and/or detection of other disorders including removal of venom; Alzheimer's disease, Back pain (Sciatic nerve pain), Migraine, Atopic dermatitis, Duchenne muscular dystrophy, Hepatic fibrosis, Cystic Fibrosis, *Pseudomonas aeruginosa* Infections, Ventilator-associated pneumonia, and combinations thereof.

In various embodiments, the present disclosure provides a method of producing a formulation as described herein, including, e.g., steps of (1) preparing a core including a carrier polypeptide composition (e.g., an amorphous or a crystallized polypeptide composition) and an active polypeptide composition (e.g., an amorphous or a crystallized polypeptide composition), and (2) placing the core in a pharmaceutically acceptable shell. In various embodiments, the present disclosure provides a method of producing a tablet formulation for oral delivery, the method including mixing (i) a carrier polypeptide composition (e.g., an amorphous or a crystallized polypeptide composition) and an active polypeptide composition (e.g., a crystallized or an amorphous polypeptide composition) with (ii) a pharmaceutically acceptable carrier. In various embodiments, the present disclosure provides a method of producing a globule formulation for oral delivery, the method including mixing (i) a carrier polypeptide composition (e.g., an amorphous or a crystallized polypeptide composition) and an active polypeptide composition (e.g., a crystallized or an amorphous polypeptide composition) with (ii) a pharmaceutically acceptable carrier. In various embodiments, the present disclosure provides a method of producing a candy formulation for oral delivery, the method including mixing (i) a carrier polypeptide composition (e.g., an amorphous or a crystallized polypeptide composition) and an active polypeptide composition (e.g., a crystallized or an amorphous polypeptide composition) with (ii) a pharmaceutically acceptable carrier. In various embodiments, the present disclosure provides a method of producing a capsule formulation for oral delivery, the method including mixing (i) a carrier polypeptide composition (e.g., an amorphous or a crystallized polypeptide composition) and an active polypeptide composition (e.g., a crystallized or an amorphous polypeptide composition) with (ii) a pharmaceutically acceptable carrier. In various embodiments, the present disclosure provides a method of producing a formulation as described herein, including, e.g., steps of (1) co-crystallizing a carrier polypeptide and an active polypeptide to produce an amorphous polypeptide composition or a crystallized polypeptide composition; (2) preparing a core including a composition comprising a carrier polypeptide composition and an active polypeptide composition (e.g., a co-crystal), and (3) placing the core in a pharmaceutically acceptable shell.

EXAMPLES

The following Examples demonstrate methods and compositions for oral administration of active polypeptides that include such polypeptide and a pharmaceutically acceptable carrier, which pharmaceutically acceptable carrier may be or comprise a carrier polypeptide as described herein. The following Examples further demonstrate advantages of oral formulations as described herein including improved half-life and bioavailability (e.g., faster onset of action), even achieving oral bioavailability that is at least about 1% or more (e.g., at least about 5%, or even 10% or more) of that observed when the active polypeptide is administered by injection.

Among other things, the present Examples provide various polypeptide formulations and testing of polypeptide formulations useful for buccal/sublingual administration. Still further, present Examples confirm that formulations and methods as described herein can be applicable to a wide range of polypeptides with different characteristics. Formulations and methods comprising a wide range of polypeptides each provide improved half-life and bioavailability. For example, the present Examples demonstrate that formulations comprising polypeptides across a broad range of molecular weight, e.g., from about 5 K Da to about 150 K Da, (insulin MW: 5808 Da, Lantus MW: 6063 Da, PTH MW: 4114 Da, hGH MW: 22,124.76 Da, Adalimumab MW: 144,190.64 Da) each provided greater than 1%-7% bioavailability when compared to SC or IV administration.

Furthermore, present Examples document a particularly surprising achievement of provided technologies: useful oral bioavailability of antibody formulations. As is well established in the art, a variety of challenges have plagued efforts to develop orally bioavailable antibody formulations. For example, as documented by Abramson et al., various recent attempts to achieve oral delivery of antibodies have been stymied by challenges ranging from limited drug loading, reduced systemic bioavailability, and/or delayed pharmacokinetics compared to parenterally dosed counterpart formulations. See Abramson et al., Oral delivery of systemic monoclonal antibodies, peptides and small molecules using gastric auto-injectors. Nat Biotechnol. 2022 January; 40(1): 103-109, incorporated herein by reference. The present disclosure provides antibody formulations, e.g., Adalimumab formulation, that remarkably achieve clinically relevant bioavailability upon oral administration.

Furthermore, present Examples confirm that provided technologies successfully formulate different forms or variants of the same polypeptide agent. For example, Examples 9-11 document application of provided technologies to different forms of insulin (i.e., natural insulin to Lantus). As can be seen, provided technologies achieve improved bioavailability notwithstanding the structural change from insulin to Lantus, which shifts the isoelectric point from a pH of 5.4 to 6.7, making Lantus more soluble at an acidic pH than insulin.

Additionally, present Examples confirm that the formulations provided herein are applicable not only to water soluble polypeptides, e.g., PTH, but also to polypeptides that are less water soluble, e.g., insulin and Lantus, and polypeptides that need binding to cell receptors to cross cell membranes.

The present Examples utilize batch crystallization to produce crystallized polypeptide compositions. As those of skill in the art will appreciate from the present disclosure that the specific production method, size, size distribution, shape, and shape distribution of crystals is not an essential feature for the successful formulation of polypeptides in accordance with the methods and compositions provided herein. The present Examples expressly demonstrate that oral formulations as described herein can be advantageously produced.

Example 1: Production of Cane Sugar/Palm Sugar Truffle Shells

In order to deliver the peptide/protein through buccal or sublingual route to systemic circulation, the peptide/protein were enclosed in sugar truffles or globules. The sugar truffles or globules, which are commercially available, are made up of 100% cane sugar. Sugar truffles or globules, grade 60 (SBL Quality Globules, India), which are pharmaceutical grade, were taken and drilled to make a hole in order to produce truffle shells (FIG. 1). A known amount of peptide/protein were weighed and transferred to these shells and then sealed using palm sugar in order to create a perfect sugar truffle or globule. The shells were able to hold up to 5 mg of protein/peptide. Now, the protein/peptide were inside the shell covered with sugar.

Truffles or globules work as a vehicle to transfer the peptide/protein to systemic circulation. Sugar truffles or globules do not alter the properties of drug substances. Due to their readily soluble nature, they are easy to administer in any age group. Commercial truffles or globules are available in different sizes. Their sizes are denoted in No., which start with No. 10, 20, 30, 40, etc. The diameter of size no. 10 measures 1 mm, of no. 20 measures 2 mm, and so on. So, the size of the sugar truffle shell can be altered in order to fit different amount of peptide/protein.

Alternatively, instead of cane sugar, either lactose or xylitol or milk sugar can be used in the preparation of sugar globules/truffle shells. Cocoa truffle shells—such as 100% dark chocolate or Callebaut®'s caramelly and creamy milk chocolate, Callebaut's creamy white chocolate or any other truffle shells can also be used to prepare the peptide/protein containing shells or tablets.

Example 2: Crystallization of Amylase Carrier Protein Containing Insulin

The present Example demonstrates formation of crystallized amylase carrier protein embedded with insulin for use in an oral formulation as disclosed herein. Humulin® R is a peptide/protein hormone structurally identical to human insulin synthesized through rDNA technology in a non-disease-producing laboratory strain of *Escherichia coli* bacteria. Humulin® R is indicated as an adjunct to diet and exercise to improve glycemic control in adults and children with type 1 and type 2 diabetes mellitus. Humulin®, when used subcutaneously, is usually given three or more times daily before meals. The present Example includes the recognition that insulin is exemplary of peptide/proteins for which an oral formulation would be advantageous.

The present Example utilizes Humulin® R (insulin (human recombinant)) U-100 (100 units per mL). To produce amylase carrier protein containing insulin microparticles, Insulin (Sigma Chemical Company) was desalted using 0.01N NaOH as follows. 62 mg of insulin dissolved in 4 mL of 0.01N HCl, pH 2.0. The pH of the peptide/protein solution was increased by adding 10 uL of 0.1N NaOH each time until peptide/protein is precipitated. The precipitated peptide/protein was collected and washed twice in 5 mL of water, each time collecting the water separately. To the collected water 0.1N NaOH was added to collect the dissolved peptide/protein from water. Finally all precipitate was dissolved in 1 mL of 0.01N HCl. Insulin aliquots were then mixed with amylase from *Aspergillus oryzae* (Sigma Chemical Company) solution to make amylase crystals containing insulin using the methods described below.

Crystallization method for amylase containing embedded insulin: A 500 µL aliquot of amylase (~200 mg/mL), in water was mixed 500 µL of insulin solution (~70 mg/mL) with 1000 L of reagent containing 30% (w/v) PEG 8000, 100 mM Sodium acetate/Acetic acid pH 4.5 and 200 mM Lithium sulfate, and incubated at room temperature overnight. The final concentration of the insulin in solution was 17.5 mg/mL. This mixture was then mixed using a vortex and left at room temperature. Amylase microparticles containing insulin were obtained on the following day. See FIG. 2. 90% of the input amylase was formed microparticles containing embedded insulin by this method.

In order to estimate the amount of insulin embedded in amylase crystals, the amylase crystals containing insulin were harvested by centrifugation of the sample at 4000×g. The supernatant was discarded. The crystals were then washed twice with 1 mL of amylase crystallization reagent (30% (w/v) PEG 8000, 100 mM sodium acetate/acetic acid pH 4.5 and 200 mM Lithium sulfate). The washed crystals were then lyophilized after the final wash with cold isopropanol. The amount of insulin in the lyophilized sample was then quantified against a reference standard using a C18 reverse phase HPLC column (gradient elution, solvent A (0.1% TFA in water), solvent B (0.1% TFA in acetonitrile)). About 8 to 10% of the insulin was getting embedded/trapped inside the lyophilized amylase crystals.

Example 3: Crystallization of Albumin Carrier Protein Containing Insulin

The present Example demonstrates formation of crystallized albumin carrier protein embedded with insulin for use in an oral formulation as disclosed herein. Humulin® R is a peptide/protein hormone structurally identical to human insulin synthesized through rDNA technology in a non-disease-producing laboratory strain of *Escherichia coli* bacteria. Humulin® R is indicated as an adjunct to diet and exercise to improve glycemic control in adults and children with type 1 and type 2 diabetes mellitus. Humulin®, when used subcutaneously, is usually given three or more times daily before meals. The present Example includes the recognition that insulin is exemplary of peptide/proteins for which an oral formulation would be advantageous.

The present Example utilizes Humulin® R (insulin (human recombinant)) U-100 (100 units per mL). To produce albumin carrier protein containing insulin microparticles, Insulin (Sigma Chemical Company) was desalted using 0.01N NaOH as follows. 62 mg of insulin dissolved in 4 mL of 0.01N HCl, pH 2.0. The pH of the peptide/protein solution was increased by adding 10 uL of 0.1N NaOH each time until peptide/protein is precipitated. The precipitated peptide/protein was collected and washed twice in 5 mL of water, each time collecting the water separately. To the collected water 0.1N NaOH was added to collect the dissolved peptide/protein from water. Finally all precipitate was dissolved in 1 mL of 0.01N HCl. Insulin aliquots were then mixed with human albumin (20% solution of ALBUCEL®—Human Albumin—20 g/100 mL, INTAS) solution to make albumin crystals containing insulin using the methods described below.

Crystallization Method for albumin containing embedded insulin: A 500 µL aliquot of albumin (~200 mg/mL), in water was mixed 500 µL of insulin solution (~70 mg/mL) with 1000 L of reagent containing 20% (w/v) PEG 3350, and incubated at room temperature overnight. The final concentration of the insulin in solution was 35 mg/mL. This mixture was then mixed using a votex and left at room temperature.

Albumin microparticles containing insulin were obtained on the following day. See FIG. 3. 90% of the input albumin was formed microparticles containing embedded insulin by this method.

In order to estimate the amount of insulin embedded in albumin crystals, the albumin crystals containing insulin were harvested by centrifugation of the sample at 4000×g. The supernatant was discarded. The crystals were then washed twice with 1 mL of albumin crystallization reagent (20% (w/v) PEG 3350). The washed crystals were then lyophilized after the final wash with cold isopropanol. The amount of insulin in the lyophilized sample was then quantified against a reference standard using a C18 reverse phase HPLC column (gradient elution, solvent A (0.1% TFA in water), solvent B (0.1% TFA in acetonitrile)). About 8 to 10% of the insulin was getting embedded/trapped inside the lyophilized albumin crystals.

Example 4: Crystallization of Albumin Carrier Protein Containing PTH

The present Example demonstrates formation of PTH (1-34) embedded in crystallized albumin for use in an oral formulation as disclosed herein. Teriparatide injection is a recombinant human parathyroid hormone analog (PTH 1-34). It has an identical sequence to the 34 N-terminal amino acids (the biologically active region) of the 84-amino acid human parathyroid hormone. Teriparatide injection is a recombinant version of parathyroid hormone used to treat men and postmenopausal women who have severe osteoporosis with a high risk of fractures. It works by stimulating new bone formation, which improves bone density and decreases the risk of spinal fractures. Teriparatide has a molecular weight of 4117.8 daltons.

Teriparatide is supplied as a sterile, colorless, clear, isotonic solution in a glass cartridge which is pre-assembled into a disposable delivery device (pen) for subcutaneous injection. Each prefilled delivery device is filled with 2.7 mL to deliver 3 mL. Each mL contains 250 mcg teriparatide (corrected for acetate, chloride, and water content), 0.41 mg glacial acetic acid, 0.1 mg sodium acetate (anhydrous), 45.4 mg mannitol, 3 mg meta cresol, and water for injection. In addition, hydrochloric acid solution 10% and/or sodium hydroxide solution 10% may have been added to adjust the product to pH 4. The present Example includes the recognition that PTH (1-34) is exemplary of peptide/proteins for which an oral formulation would be advantageous.

The present Example utilizes PTH (1-34). To produce albumin carrier protein containing PTH microparticles, PTH was dialyzed against water for 24 hours with three changes and lyophilized to get dry powder. The lyophilized powder of PTH was then dissolved in water at a concentration of 80 mg/mL. PTH aliquots were then mixed with human albumin (20% solution of ALBUCEL®—Human Albumin—20 g/100 mL, INTAS) solution to make albumin crystals containing PTH using the methods described below.

Crystallization Method for albumin containing embedded PTH: A 500 µL aliquot of albumin (~200 mg/mL), in water was mixed 500 µL of PTH solution (~80 mg/mL) with 1000 L of reagent containing 20% (w/v) PEG 3350, and incubated at room temperature overnight. The final concentration of the PTH in solution was 40 mg/mL. This mixture was then mixed using a votex and left at room temperature. Albumin microparticles containing PTH were obtained on the following day. See FIG. 4. 90% of the input albumin was formed microparticles containing embedded PTH by this method.

In order to estimate the amount of PTH embedded in albumin crystals, the albumin crystals containing PTH were harvested by centrifugation of the sample at 4000×g. The supernatant was discarded. The crystals were then washed twice with 1 mL of albumin crystallization reagent (20% (w/v) PEG 3350). The washed crystals were then lyophilized after the final wash with cold isopropanol. The amount of PTH in the lyophilized sample was then quantified against a reference standard using a C18 reverse phase HPLC column (gradient elution, solvent A (0.1% TFA in water), solvent B (0.1% TFA in acetonitrile)). About 2 to 3% of the PTH was getting embedded/trapped inside the lyophilized albumin crystals.

Example 5: Crystallization of Albumin Carrier Protein Containing Semaglutide

The present Example demonstrates formation of Semaglutide embedded in crystallized albumin for use in an oral formulation as disclosed herein. Semaglutide, sold under the brand names Wegovy and Ozempic among others, is an antidiabetic medication used for the treatment of type 2 diabetes and long-term weight management. Semaglutide is a GLP-1 receptor agonist, meaning that it mimics the action of the human incretin glucagon-like peptide-1 (GLP-1), thereby increasing insulin secretion and increasing blood sugar disposal and improving glycemic control. Semaglutide is indicated as an adjunct to diet and exercise to improve glycemic control in adults with type 2 diabetes. Semaglutide is also indicated as an adjunct to diet and exercise for long-term weight management in adults with obesity. The subcutaneous injection is administered once weekly and the tablet is administered once a day. Semaglutide offers a competitive advantage over other drugs used to manage diabetes, which may require several daily doses.

Semaglutide is supplied as one ml of solution which contains 1.34 mg of semaglutide. One pre-filled pen contains 2 mg Semaglutide in 1.5 ml solution. Each dose contains 0.25 mg of Semaglutide in 0.19 ml solution. Oral Semaglutide is a tablet formulation for once-daily administration. It is co-formulated with an absorption enhancer, sodium N-(8-[2-hydroxybenzoyl] amino) caprylate (SNAC). The present Example includes the recognition that Semaglutide is exemplary of peptide/proteins for which an oral formulation would be advantageous.

The present Example utilizes Semaglutide. To produce albumin carrier protein containing Semaglutide microparticles, Semaglutide in the lyophilized form was dissolved in water at a concentration of 80 mg/mL. Semaglutide aliquots were then mixed with human albumin (20% solution of ALBUCEL®—Human Albumin—20 g/100 mL, INTAS) solution to make albumin crystals containing Semaglutide using the methods described below.

Crystallization Method for albumin containing embedded Semaglutide: A 500 µL aliquot of albumin (~200 mg/mL), in water was mixed 500 µL of Semaglutide solution (~80 mg/mL) with 1000 µL of reagent containing 20% (w/v) PEG 3350, and incubated at room temperature overnight. The final concentration of the Semaglutide in solution was 40 mg/mL. This mixture was then mixed using a votex mixer and left at room temperature. Albumin microparticles containing Semaglutide were obtained on the following day. 90% of the input albumin was formed microparticles containing embedded Semaglutide by this method.

In order to estimate the amount of Semaglutide embedded in albumin crystals, the albumin crystals containing Semaglutide were harvested by centrifugation of the sample at 4000×g. The supernatant was discarded. The crystals were then washed twice with 1 mL of albumin crystallization reagent (20% (w/v) PEG 3350). The washed crystals were then lyophilized after the final wash with cold isopropanol. The amount of Semaglutide in the lyophilized sample was then quantified against a reference standard using a C18 reverse phase HPLC column (gradient elution, solvent A (0.1% TFA in water), solvent B (0.1% TFA in acetonitrile)). About 8 to 10% of the Semaglutide was getting embedded/trapped inside the lyophilized albumin crystals.

Example 6: Crystallization of Albumin Carrier Protein Containing Octreotide

The present Example demonstrates formation of Octreotide embedded in crystallized albumin for use in an oral formulation as disclosed herein. Octreotide is the acetate salt of a cyclic octapeptide. It is a long-acting octapeptide with pharmacologic properties mimicking those of the natural hormone somatostatin. Octreotide is known chemically as L-cysteinamide, D-phenylalanyl-L-cysteinyl-L-phenylalanyl-D-tryptophyl-L-lysyl-L-threonyl-N-[2-hydroxy-1-(hydroxy-methyl) propyl]-, cyclic (2→7)-disulfide; [R-(R*, R*)]. Octreotide is given to control symptoms such as diarrhea or flushing in patients with tumors such as carcinoid, pancreatic islet cell tumors, gastrinoma, or vasoactive intestinal peptide-secreting tumors (VIPomas). It is also used to treat acromegaly, when the body produces too much growth hormone, and the hands, feet, face or head grow too large.

Currently marketed somatostatin analogues include octreotide immediate release (IR; Sandostatin®, Novartis) and its long acting formulation octreotide LAR (Sandostatin® LAR®, Novartis), as well as lanreotide (available in two formulations: Somatuline® LA® and Somatuline® Autogel®/Depot®, Ipsen). The present Example includes the recognition that Octreotide is exemplary of peptide/proteins for which an oral formulation would be advantageous.

The present Example utilizes Octreotide. To produce albumin carrier protein containing Octreotide microparticles, Octreotide in the lyophilized form was dissolved in water at a concentration of 80 mg/mL. Octreotide aliquots were then mixed with human albumin (20% solution of ALBUCEL®—Human Albumin—20 g/100 mL, INTAS) solution to make albumin crystals containing Octreotide using the methods described below.

Crystallization Method for albumin containing embedded Octreotide: A 500 μL aliquot of albumin (~200 mg/mL), in water was mixed 500 μL of Octreotide solution (~80 mg/mL) with 1000 μL of reagent containing 20% (w/v) PEG 3350, and incubated at room temperature overnight. The final concentration of the Octreotide in solution was 40 mg/mL. This mixture was then mixed using a votex mixer and left at room temperature. Albumin microparticles containing Octreotide were obtained on the following day. 90% of the input albumin was formed microparticles containing embedded Octreotide by this method.

In order to estimate the amount of Octreotide embedded in albumin crystals, the albumin crystals containing Octreotide were harvested by centrifugation of the sample at 4000×g. The supernatant was discarded. The crystals were then washed twice with 1 mL of albumin crystallization reagent (20% (w/v) PEG 3350). The washed crystals were then lyophilized after the final wash with cold isopropanol. The amount of Octreotide in the lyophilized sample was then quantified against a reference standard using a C18 reverse phase HPLC column (gradient elution, solvent A (0.1% TFA in water), solvent B (0.1% TFA in acetonitrile)). About 8 to 10% of the Octreotide was getting embedded/trapped inside the lyophilized albumin crystals.

Example 7: Crystallization of Albumin Carrier Protein Containing Human Growth Hormone (hGH)

The present Example demonstrates formation of hGH embedded in crystallized albumin for use in an oral formulation as disclosed herein. Norditropin NordiFlex® R is a peptide/protein hormone structurally identical to human growth hormone synthesized through rDNA technology. Norditropin NordiFlex® R Injection acts as a replacement for growth hormone, and helps restore normal growth and development of bones and muscles in individuals suffering from growth hormone deficiency. It helps children grow taller and also enables muscle growth in both children as well as adults.

Norditropin NordiFlex® is supplied as a sterile, colorless, clear, isotonic solution in a plastic cartridge which is pre-assembled into a disposable delivery device (pen) for subcutaneous injection. Each prefilled delivery device is filled with 1.5 mL of hGH. Each mL contains hGH (Human Growth Hormone Inj. Norditropin NordiFlex, 15 mg/1.5 mL) containing Somatropin 10 mg, mannitol 39 mg, histidine 1.1 mg, poloxamer 188 3.0 mg, phenol 3.0 mg, and water for injection in 1.0 mL with HCl and NaOH. The present Example includes the recognition that hGH is exemplary of peptide/proteins for which an oral formulation would be advantageous.

The present Example utilizes hGH. To produce albumin carrier protein containing hGH microparticles, hGH was dialyzed against water for 24 hours with three changes and lyophilized to get dry powder. The lyophilized powder of hGH was then dissolved in water at a concentration of 60 mg/mL. hGH aliquots were then mixed with human albumin (20% solution of ALBUCEL®—Human Albumin—20 g/100 mL, INTAS) solution to make albumin crystals containing hGH using the methods described below.

Crystallization Method for albumin containing embedded hGH: A 500 μL aliquot of albumin (~200 mg/mL), in water was mixed 500 μL of hGH solution (~60 mg/mL) with 1000 L of reagent containing 20% (w/v) PEG 3350, and incubated at room temperature overnight. The final concentration of the hGH in solution was 15 mg/mL. This mixture was then mixed using a votex and left at room temperature. Albumin microparticles containing hGH were obtained on the following day. See FIG. 15. 90% of the input albumin was formed microparticles containing embedded hGH by this method.

In order to estimate the amount of hGH embedded in albumin crystals, the albumin crystals containing hGH were harvested by centrifugation of the sample at 4000×g. The supernatant was discarded. The crystals were then washed twice with 1 mL of albumin crystallization reagent (20% (w/v) PEG 3350). The washed crystals were then lyophilized after the final wash with cold isopropanol. The amount of hGH in the lyophilized sample was then quantified against a reference standard using a C18 reverse phase HPLC column (gradient elution, solvent A (0.1% TFA in water), solvent B (0.1% TFA in acetonitrile)). About 5 to 10% of the hGH was getting embedded/trapped inside the lyophilized albumin crystals.

Example 8: Crystallization of Albumin Carrier Protein Containing Adalimumab

The present Example demonstrates formation of adalimumab embedded in crystallized albumin for use in an oral formulation as disclosed herein. Adalimumab, sold under the brand name Humira, among others, is a monoclonal antibody used to treat rheumatoid arthritis, psoriatic arthritis, ankylosing spondylitis, Crohn's disease, ulcerative colitis, plaque psoriasis, hidradenitis suppurativa, uveitis, and juvenile idiopathic arthritis. It is administered by injection under the skin.

Humira® is supplied as a sterile, colorless, clear, isotonic solution in a plastic cartridge which is pre-assembled into a disposable delivery device (pen) for subcutaneous injection. Each prefilled delivery device is filled with 0.8 mL of adalimumab. Each 0.8 mL contains adalimumab 40 mg, citric acid monohydrate (1.04 mg), dibasic sodium phosphate dihydrate (1.22 mg), mannitol (9.6 mg), monobasic sodium phosphate dihydrate (0.69 mg), polysorbate 80 (0.8 mg), sodium chloride (4.93 mg), sodium citrate (0.24 mg) and Water for Injection, USP. The present Example includes the recognition that adalimumab is exemplary of peptide/proteins for which an oral formulation would be advantageous.

The present Example utilizes adalimumab. To produce albumin carrier protein containing adalimumab microparticles, adalimumab was dialyzed against water for 24 hours with three changes and lyophilized to get dry powder. The lyophilized powder of adalimumab was then dissolved in water at a concentration of 40 mg/mL. Adalimumab aliquots were then mixed with human albumin (20% solution of ALBUCEL®—Human Albumin—20 g/100 mL, INTAS) solution to make albumin crystals containing adalimumab using the methods described below.

Crystallization Method for albumin containing embedded adalimumab: A 500 µL aliquot of albumin (~200 mg/mL), in water was mixed 500 μL of adalimumab solution (~40 mg/mL) with 1000 μL of reagent containing 20% (w/v) PEG 3350, and incubated at room temperature overnight. The final concentration of the adalimumab in solution was 10 mg/mL. This mixture was then mixed using a votex and left at room temperature. Albumin microparticles containing adalimumab were obtained on the following day. See FIG. 16. 85% of the input albumin was formed microparticles containing embedded adalimumab by this method.

In order to estimate the amount of adalimumab embedded in albumin crystals, the albumin crystals containing adalimumab were harvested by centrifugation of the sample at 4000×g. The supernatant was discarded. The crystals were then washed twice with 1 mL of albumin crystallization reagent (20% (w/v) PEG 3350). The washed crystals were then lyophilized after the final wash with cold isopropanol. The amount of adalimumab in the lyophilized sample was then quantified against a reference standard using a C8 reverse phase HPLC column (gradient elution, solvent A (0.1% TFA in water), solvent B (0.1% TFA in acetonitrile)). About 2 to 3% of the adalimumab was getting embedded/trapped inside the lyophilized albumin crystals.

Example 9: Pharmacokinetics Study of Insulin Formulation Containing/Enclosed Either in Crystalline Amylase or in Crystalline Albumin in a Capsule Containing Vitamin E in Minipigs The present Example demonstrates that oral formulations of insulin exemplary of oral formulations disclosed herein have therapeutically effective pharmacokinetic profiles, e.g., with advantageous properties as compared to parenteral administration of the same peptide/protein. The present example demonstrates an insulin formulation enclosed in crystalline amylase or crystalline albumin (as co-crystals or getting embedded in crystals of amylase or albumin while crystallization of amylase or albumin), demonstrating that enteric formulation is not required for advantageous application of formulations of the present disclosure.

The present Example includes an oral formulation of peptide/protein embedded in crystals of either amylase or albumin prepared as follows: Commercially obtained Insulin regular, Humulin R (Humulin R (insulin human recombinant) U-100 is a sterile, clear, aqueous, and colorless solution that contains human insulin (rDNA origin) 100 units/mL, glycerin 16 mg/mL and meta-cresol 2.5 mg/mL, endogenous zinc (approximately 0.015 mg/100 units) and water for injection. The pH is 7.0 to 7.8. The insulin was dialyzed against water for 24 hrs against water and lyophilized. The lyophilized insulin was reconstituted in dilute acid. The reconstituted insulin was then processed to prepare amylase/albumin microparticles containing insulin according to the procedure mentioned under Example 2 and Example 3. The microparticle of either amylase crystals or albumin crystals containing insulin was then lyophilized after washing with cold isopropanol. The amount of lyophilized insulin was quantified against a reference standard using a C18 reverse phase HPLC column (gradient elution, solvent A (0.1% TFA in water), solvent B (0.1% TFA in acetonitrile)). The lyophilized insulin (dosage mentioned under Table 2) was then transferred to capsule containing 150 μL of Vitamin E and 100 μL of Wheatgerm oil under nitrogen. The capsule was then closed. The samples were then stored at 4° C. until further use.

TABLE 2

Experimental Design for Pharmacokinetics Analysis

| | IV (Marketed Formulation) | Oral Capsule (Amylase Crystal formulation) | Oral Capsule (Albumin Crystal formulation) |
|---|---|---|---|
| No. of Minipigs (Yorkshire) 3 to 4 months old | 2 | 4 | 4 |
| Sex | Female | Female | Female |
| Body Weight | 12 ± 1 kg | 12 ± 1 kg | 12 ± 1 kg |
| Group | 1 | 2 | 3 |
| Test Item | Insulin | Insulin | Insulin |
| Dose (mg) | 0.347 | 2 | 2 |
| Formulation | Liquid | Capsule - Crystalline Amylase containing insulin within pores of the crystals + Vitamin E | Capsule- Crystalline Albumin containing insulin within pores of the crystals + Vitamin E |

TABLE 2-continued

Experimental Design for Pharmacokinetics Analysis

| | IV (Marketed Formulation) | Oral Capsule (Amylase Crystal formulation) | Oral Capsule (Albumin Crystal formulation) |
|---|---|---|---|
| Route | IV (Intravenous) | PO (oral - Capsule containing insulin embedded in amylase crystals + Vitamin E) | PO (oral - Capsule containing insulin embedded in albumin crystals + Vitamin E) |
| Feeding Status | Fasting overnight followed by 2 g/kg glucose solution challenge prior to test article administration | Fasting overnight followed by 2 g/kg glucose solution challenge prior to test article administration | Fasting overnight followed by 2 g/kg glucose solution challenge prior to test article administration |
| Blood/plasma sample collection time | 0 min, 5 mins, 30 mins, 1 hr, 4 hrs, 12 hrs, 24 hrs and 48 hrs post dose | 0 min, 5 mins, 30 mins, 1 hr, 4 hrs, 12 hrs, 24 hrs and 48 hrs post dose | 0 min, 5 mins, 30 mins, 1 hr, 4 hrs, 12 hrs, 24 hrs and 48 hrs post dose |
| Analysis | Insulin INS ELISA kit ABBEXA | | |

Pharmacokinetic analysis was conducted in Female Minipigs weighing 12±1 kg for 2 days. Experimental design is shown in Table 2. Pigs in the treatment group was fasted overnight prior to the test sample administration. All the test animals in the treatment groups were administered with respective test formulation to the pre-designated animals. The time of dosage of each animal was noted. Blood samples were collected at aforementioned time points 0 min, 5 min, 30 min, 1 hr, 4 hrs, 12 hrs, 24 hrs, and 48 hrs into an EDTA-blood collection tubes for the separation of plasma to determine insulin levels by ELISA. Plasma samples collected at different time points were analyzed by ELISA kit according to ABBEXA protocol. This kit is based on sandwich enzyme-linked immuno-sorbent assay technology. An antibody, anti-insulin was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient INS will produce a blue colored product, which then changes to yellow after adding the acidic stop solution. The intensity of the yellow colour is proportional to the INS amount bound on the plate. The Optical Density (OD) was measured spectrophotometrically at 450 nm in a microplate reader, from which the concentration of INS can be calculated.

The data in Table 3 and FIGS. 5, 6 & 7 demonstrate average plasma concentration of Insulin at different time points. The full pharmacokinetic profile are shown in Table 4, 5 and 6. Orally administered Insulin formulation showed 32% and 7% bioavailability for amylase and albumin crystal formation respectively when compared to IV. Insulin was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each Insulin dose was derived as the maximum of all valid concentrations, and t max was then determined as the corresponding time point to C max. The terminal elimination rate constant ($\lambda$ z) was estimated by log-linear regression on the terminal part of the concentration-time curve, and t ½ was then calculated as t ½=ln 2/$\lambda$z.

TABLE 3

Mean PK results of Human Insulin R formulations in Pigs

| Time (hrs) | Intravenous - Human Insulin R | Capsule - Amylase Crystal Formulation | Capsule - Albumin Crystal Formulation |
|---|---|---|---|
| 0 | 105.9 ± 21.37 | 0 ± 0 | 0 ± 0 |
| 0.08 | 998.6 ± 25.28 | 0 ± 0 | 0 ± 0 |
| 0.5 | 559.11 ± 25.75 | 78.98 ± 13.79 | 34.67 ± 6.72 |
| 1 | 95.48 ± 20.19 | 420.19 ± 49.82 | 72.46 ± 8 |
| 4 | 15.34 ± 1.13 | 85.22 ± 8.09 | 15.86 ± 5.55 |
| 12 | 5.03 ± 0.74 | 16.21 ± 4.92 | 7.94 ± 2.05 |
| 24 | 0 ± 0 | 4.69 ± 0.8 | 4 ± 2.31 |
| 48 | 0 ± 0 | 0 ± 0 | 0 ± 0 |

TABLE 4

Full Pharmacokinetic profile of intravenous Human Insulin R formulations in Pigs

| Parameter | Unit | Value |
|---|---|---|
| R | | −0.923 |
| R_adjusted | | 0.703 |
| NumRegPoints | | 3.000 |
| TimeRegStart | h | 1.000 |
| TimeRegEnd | h | 12.000 |
| Lambda_z | 1/h | 0.241 |
| t½ | h | 2.873 |
| Tmax | h | 0.080 |
| Cmax | mU/L | 998.596 |
| C0 | mU/L | 105.903 |
| Tlast | h | 12.000 |
| Clast_obs | mU/L | 5.025 |
| Clast_obs/Cmax | | 0.005 |
| AUC 0-t | mU/L * h | 782.648 |
| AUC t-inf_obs | mU/L * h | 20.830 |
| AUC 0-inf_obs | mU/L * h | 803.478 |
| AUC 0-t/0-inf_obs | | 0.974 |
| AUC 0-inf/D_obs | mU/L * h/(mg) | 2315.498 |
| AUMC 0-t | mU/L * h^2 | 894.423 |
| AUMC t-inf_obs | mU/L * h^2 | 336.297 |
| AUMC 0-inf_obs | mU/L * h^2 | 1230.721 |
| AUMC 0-t/0-inf_obs | | 0.727 |
| MRT 0-t | h | 1.143 |
| MRT 0-inf_obs | h | 1.532 |
| Vz_obs | (mg)/(mU/L) | 0.002 |
| Cl_obs | (mg)/(mU/L)/h | 0.000 |
| Vss_obs | (mg)/(mU/L) | 0.001 |
| Clast_pred | mU/L | 4.221 |
| Clast_pred/Cmax | | 0.004 |
| AUC t-inf_pred | mU/L * h | 17.497 |

TABLE 4-continued

Full Pharmacokinetic profile of intravenous
Human Insulin R formulations in Pigs

| Parameter | Unit | Value |
|---|---|---|
| AUC 0-inf_pred | mU/L * h | 800.145 |
| AUC 0-t/0-inf_pred |  | 0.978 |
| AUC 0-inf/D_pred | mU/L * h/(mg) | 2305.892 |
| AUMC t-inf_pred | mU/L * h^2 | 282.483 |
| AUMC 0-inf_pred | mU/L * h^2 | 1176.906 |
| AUMC 0-t/0-inf_pred |  | 0.760 |
| MRT 0-inf_pred | h | 1.471 |
| Vz_pred | (mg)/(mU/L) | 0.002 |
| Cl_pred | (mg)/(mU/L)/h | 0.000 |
| Vss_pred | (mg)/(mU/L) | 0.001 |

TABLE 5

Full Pharmacokinetic profile of Capsule Amylase Crystal
Formulation - Human Insulin R formulations in Pigs

| Parameter | Unit | Value |
|---|---|---|
| R |  | −0.980 |
| R_adjusted |  | 0.922 |
| NumRegPoints |  | 3.000 |
| TimeRegStart | h | 4.000 |
| TimeRegEnd | h | 24.000 |
| Lambda_z | 1/h | 0.142 |
| t½ | h | 4.892 |
| Tmax | h | 1.000 |
| Cmax | mU/L | 420.185 |
| Tlag | h | 0.000 |
| Tlast | h | 24.000 |
| Clast_obs | mU/L | 4.691 |
| Clast_obs/Cmax |  | 0.011 |
| AUC 0-t | mU/L * h | 1433.777 |
| AUC t-inf_obs | mU/L * h | 33.112 |
| AUC 0-inf_obs | mU/L * h | 1466.889 |
| AUC 0-t/0-inf_obs |  | 0.977 |
| AUC 0-inf/D_obs | mU/L * h/(mg) | 733.444 |
| AUMC 0-t | mU/L * h^2 | 5250.588 |
| AUMC t-inf_obs | mU/L * h^2 | 1028.371 |
| AUMC 0-inf_obs | mU/L * h^2 | 6278.959 |
| AUMC 0-t/0-inf_obs |  | 0.836 |
| MRT 0-t | h | 3.662 |
| MRT 0-inf_obs | h | 4.280 |
| Vz/F_obs | (mg)/(mU/L) | 0.010 |
| Cl/F_obs | (mg)/(mU/L)/h | 0.001 |
| Clast_pred | mU/L | 4.113 |
| Clast_pred/Cmax |  | 0.010 |
| AUC t-inf_pred | mU/L * h | 29.030 |
| AUC 0-inf_pred | mU/L * h | 1462.807 |
| AUC 0-t/0-inf_pred |  | 0.980 |
| AUC 0-inf/D_pred | mU/L * h/(mg) | 731.403 |
| AUMC t-inf_pred | mU/L * h^2 | 901.601 |
| AUMC 0-inf_pred | mU/L * h^2 | 6152.189 |
| AUMC 0-t/0-inf_pred |  | 0.853 |
| MRT 0-inf_pred | h | 4.206 |
| Vz/F_pred | (mg)/(mU/L) | 0.010 |
| Cl/F_pred | (mg)/(mU/L)/h | 0.001 |

TABLE 6

Full Pharmacokinetic profile of Capsule Albumin Crystal
Formulation - Human Insulin R formulations in Pigs

| Parameter | Unit | Value |
|---|---|---|
| R |  | −0.993 |
| R_adjusted |  | 0.973 |
| NumRegPoints |  | 3.000 |
| TimeRegStart | h | 4.000 |
| TimeRegEnd | h | 24.000 |
| Lambda_z | 1/h | 0.068 |

TABLE 6-continued

Full Pharmacokinetic profile of Capsule Albumin Crystal
Formulation - Human Insulin R formulations in Pigs

| Parameter | Unit | Value |
|---|---|---|
| t½ | h | 10.191 |
| Tmax | h | 1.000 |
| Cmax | mU/L | 72.457 |
| Tlag | h | 0.000 |
| Tlast | h | 24.000 |
| Clast_obs | mU/L | 3.996 |
| Clast_obs/Cmax |  | 0.055 |
| AUC 0-t | mU/L * h | 334.783 |
| AUC t-inf_obs | mU/L * h | 58.749 |
| AUC 0-inf_obs | mU/L * h | 393.531 |
| AUC 0-t/0-inf_obs |  | 0.851 |
| AUC 0-inf/D_obs | mU/L * h/(mg) | 196.766 |
| AUMC 0-t | mU/L * h^2 | 2013.011 |
| AUMC t-inf_obs | mU/L * h^2 | 2273.757 |
| AUMC 0-inf_obs | mU/L * h^2 | 4286.768 |
| AUMC 0-t/0-inf_obs |  | 0.470 |
| MRT 0-t | h | 6.013 |
| MRT 0-inf_obs | h | 10.893 |
| Vz/F_obs | (mg)/(mU/L) | 0.075 |
| Cl/F_obs | (mg)/(mU/L)/h | 0.005 |
| Clast_pred | mU/L | 3.851 |
| Clast_pred/Cmax |  | 0.053 |
| AUC t-inf_pred | mU/L * h | 56.623 |
| AUC 0-inf_pred | mU/L * h | 391.405 |
| AUC 0-t/0-inf_pred |  | 0.855 |
| AUC 0-inf/D_pred | mU/L * h/(mg) | 195.703 |
| AUMC t-inf_pred | mU/L * h^2 | 2191.472 |
| AUMC 0-inf_pred | mU/L * h^2 | 4204.484 |
| AUMC 0-t/0-inf_pred |  | 0.479 |
| MRT 0-inf_pred | h | 10.742 |
| Vz/F_pred | (mg)/(mU/L) | 0.075 |
| Cl/F_pred | (mg)/(mU/L)/h | 0.005 |

Example 10: Pharmacokinetics Study of Insulin Formulation Containing/Enclosed Either in Crystalline Amylase or in Crystalline Albumin in Sugar Truffle Shell in Minipigs The present Example demonstrates that oral formulations of insulin exemplary of oral formulations disclosed herein have therapeutically effective pharmacokinetic profiles, e.g., with advantageous properties as compared to parenteral administration of the same peptide/protein. The present example demonstrates an insulin formulation in crystalline amylase or crystalline albumin (as co-crystals or getting embedded in crystals of amylase or albumin while crystallization of amylase or albumin) and further enclosed in sugar truffle shell, demonstrating that enteric formulation is not required for advantageous application of formulations of the present disclosure.

The present Example includes an oral formulation of peptide/protein embedded in crystals of either amylase or albumin prepared as follows: Commercially obtained Insulin regular, Humulin R (Humulin R (insulin human recombinant) U-100 is a sterile, clear, aqueous, and colorless solution that contains human insulin (rDNA origin) 100 units/mL, glycerin 16 mg/mL and meta-cresol 2.5 mg/mL, endogenous zinc (approximately 0.015 mg/100 units) and water for injection. The pH is 7.0 to 7.8. The insulin was dialyzed against water for 24 hrs against water and lyophilized. The lyophilized insulin was reconstituted in dilute acid. The reconstituted insulin was then processed to prepare amylase/albumin microparticles containing insulin according to the procedure mentioned under Example 2 and Example 3. The microparticle of either amylase crystals or albumin crystals containing insulin was then lyophilized after washing with cold isopropanol. The amount of lyophilized insulin was quantified against a reference standard using a C18 reverse phase HPLC column (gradient elution, solvent A (0.1% TFA in water), solvent B (0.1% TFA in acetonitrile)). The lyophilized insulin (dosage mentioned under Table 7) was then transferred to sugar truffle shell made from cane sugar or palm sugar. The shell was then sealed with coconut palm sugar (DEGA Farms). The samples were then stored at 4° C. until further use.

TABLE 7

Experimental Design for Pharmacokinetics Analysis

| | IV (Marketed Formulation) | Oral Truffle Shell (Amylase Crystal formulation) | Oral Truffle Shell (Albumin Crystal formulation) |
|---|---|---|---|
| No. of Minipigs (Yorkshire) 3 to 4 months old | 2 | 4 | 4 |
| Sex | Female | Female | Female |
| Body Weight | 12 ± 1 kg | 12 ± 1 kg | 12 ± 1 kg |
| Group | 1 | 2 | 3 |
| Test Item | Insulin | Insulin | Insulin |
| Dose (mg) | 0.347 | 0.5 | 0.5 |
| Formulation | Liquid | Truffle Shell - Crystalline Amylase containing insulin within pores of the crystals | Truffle Shell - Crystalline Albumin containing insulin within pores of the crystals |
| Route | IV (Intravenous) | PO (oral - Truffle Shell containing insulin embedded in amylase crystals) | PO (oral - Truffle Shell containing insulin embedded in albumin crystals) |
| Feeding Status | Fasting overnight followed by 2 g/kg glucose solution challenge prior to test article administration | Fasting overnight followed by 2 g/kg glucose solution challenge prior to test article administration | Fasting overnight followed by 2 g/kg glucose solution challenge prior to test article administration |
| Blood/plasma sample collection time | 0 min, 5 mins, 30 mins, 1 hr, 4 hrs, 12 hrs, 24 hrs and 48 hrs post dose | 0 min, 5 mins, 30 mins, 1 hr, 4 hrs, 12 hrs, 24 hrs and 48 hrs post dose | 0 min, 5 mins, 30 mins, 1 hr, 4 hrs, 12 hrs, 24 hrs and 48 hrs post dose |
| Analysis | Insulin INS ELISA kit ABBEXA | | |

Pharmacokinetic analysis was conducted in Female Minipigs weighing 12±1 kg for 2 days. Experimental design is shown in Table 7. Pigs in the treatment group was fasted overnight prior to the test sample administration. All the test animals in the treatment groups were administered with respective test formulation to the pre-designated animals. The time of dosage of each animal was noted. Blood samples were collected at aforementioned time points 0 min, 5 min, 30 min 1 hr, 4 hrs, 12 hrs, 24 hrs, and 48 hrs into an EDTA-blood collection tubes for the separation of plasma to determine insulin levels by ELISA. Plasma samples collected at different time points were analyzed by ELISA kit according to ABBEXA protocol. This kit is based on sandwich enzyme-linked immuno-sorbent assay technology. An antibody, anti-insulin was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient INS will produce a blue colored product, which then changes to yellow after adding the acidic stop solution. The intensity of the yellow colour is proportional to the INS amount bound on the plate. The Optical Density (OD) was measured spectrophotometrically at 450 nm in a microplate reader, from which the concentration of INS can be calculated.

The data in Table 8 and FIGS. 8, 9 & 10 demonstrate average plasma concentration of Insulin at different time points. The full pharmacokinetic profile are shown in Table 9, 10 and 11. Orally administered Insulin formulation showed 39% and 34% bioavailability for amylase and albumin crystal formation respectively when compared to IV. Insulin was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each Insulin dose was derived as the maximum of all valid concentrations, and t max was then determined as the corresponding time point to C max. The terminal elimination rate constant ($\lambda$ z) was estimated by log-linear regression on the terminal part of the concentration-time curve, and t ½ was then calculated as t ½=ln 2/$\lambda$z.

TABLE 8

Mean PK results of Human Insulin R formulations in Pigs

| Time (hrs) | Intravenous - Human Insulin R | Truffle Shell - Amylase Crystal Formulation | Truffle Shell - Albumin Crystal Formulation |
|---|---|---|---|
| 0 | 105.9 ± 21.37 | 0 ± 0 | 0 ± 0 |
| 0.08 | 998.6 ± 25.28 | 7.38 ± 2.59 | 4.75 ± 0.6 |
| 0.5 | 559.11 ± 25.75 | 15.32 ± 5.09 | 7.31 ± 2.59 |
| 1 | 95.48 ± 20.19 | 52.22 ± 4.76 | 77.32 ± 7.26 |
| 4 | 15.34 ± 1.13 | 26.23 ± 5.61 | 16.82 ± 5 |
| 12 | 5.03 ± 0.74 | 16.04 ± 1.8 | 11.98 ± 1.87 |
| 24 | 0 ± 0 | 5.7 ± 1.27 | 4.35 ± 1.4 |
| 48 | 0 ± 0 | 0 ± 0 | 0 ± 0 |

TABLE 9

Full Pharmacokinetic profile of intravenous
Human Insulin R formulations in Pigs

| Parameter | Unit | Value |
|---|---|---|
| R | | −0.923 |
| R_adjusted | | 0.703 |
| NumRegPoints | | 3.000 |
| TimeRegStart | h | 1.000 |
| TimeRegEnd | h | 12.000 |
| Lambda_z | 1/h | 0.241 |
| t½ | h | 2.873 |
| Tmax | h | 0.080 |
| Cmax | mU/L | 998.596 |
| C0 | mU/L | 105.903 |
| Tlast | h | 12.000 |
| Clast_obs | mU/L | 5.025 |
| Clast_obs/Cmax | | 0.005 |
| AUC 0-t | mU/L * h | 782.648 |
| AUC t-inf_obs | mU/L * h | 20.830 |
| AUC 0-inf_obs | mU/L * h | 803.478 |
| AUC 0-t/0-inf_obs | | 0.974 |
| AUC 0-inf/D_obs | mU/L * h/(mg) | 2315.498 |
| AUMC 0-t | mU/L * h^2 | 894.423 |
| AUMC t-inf_obs | mU/L * h^2 | 336.297 |
| AUMC 0-inf_obs | mU/L * h^2 | 1230.721 |
| AUMC 0-t/0-inf_obs | | 0.727 |
| MRT 0-t | h | 1.143 |
| MRT 0-inf_obs | h | 1.532 |
| Vz_obs | (mg)/(mU/L) | 0.002 |
| Cl_obs | (mg)/(mU/L)/h | 0.000 |
| Vss_obs | (mg)/(mU/L) | 0.001 |
| Clast_pred | mU/L | 4.221 |
| Clast_pred/Cmax | | 0.004 |
| AUC t-inf_pred | mU/L * h | 17.497 |
| AUC 0-inf_pred | mU/L * h | 800.145 |
| AUC 0-t/0-inf_pred | | 0.978 |
| AUC 0-inf/D_pred | mU/L * h/(mg) | 2305.892 |
| AUMC t-inf_pred | mU/L * h^2 | 282.483 |
| AUMC 0-inf_pred | mU/L * h^2 | 1176.906 |
| AUMC 0-t/0-inf_pred | | 0.760 |
| MRT 0-inf_pred | h | 1.471 |
| Vz_pred | (mg)/(mU/L) | 0.002 |
| Cl_pred | (mg)/(mU/L)/h | 0.000 |
| Vss_pred | (mg)/(mU/L) | 0.001 |

TABLE 10

Full Pharmacokinetic profile of Truffle Shell Amylase Crystal
Formulation - Human Insulin R formulations in Pigs

| Parameter | Unit | Value |
|---|---|---|
| R | | −0.996 |
| R_adjusted | | 0.985 |
| NumRegPoints | | 3.000 |
| TimeRegStart | h | 4.000 |
| TimeRegEnd | h | 24.000 |
| Lambda_z | 1/h | 0.077 |
| t½ | h | 8.990 |
| Tmax | h | 1.000 |
| Cmax | mU/L | 52.220 |
| Tlag | h | 0.000 |
| Tlast | h | 24.000 |
| Clast_obs | mU/L | 5.700 |
| Clast_obs/Cmax | | 0.109 |
| AUC 0-t | mU/L * h | 439.142 |
| AUC t-inf_obs | mU/L * h | 73.927 |
| AUC 0-inf_obs | mU/L * h | 513.069 |
| AUC 0-t/0-inf_obs | | 0.856 |
| AUC 0-inf/D_obs | mU/L * h/(mg) | 1026.138 |
| AUMC 0-t | mU/L * h^2 | 3417.716 |
| AUMC t-inf_obs | mU/L * h^2 | 2733.051 |
| AUMC 0-inf_obs | mU/L * h^2 | 6150.767 |
| AUMC 0-t/0-inf_obs | | 0.556 |
| MRT 0-t | h | 7.783 |
| MRT 0-inf_obs | h | 11.988 |
| Vz/F_obs | (mg)/(mU/L) | 0.013 |
| Cl/F_obs | (mg)/(mU/L)/h | 0.001 |
| Clast_pred | mU/L | 5.881 |
| Clast_pred/Cmax | | 0.113 |
| AUC t-inf_pred | mU/L * h | 76.274 |
| AUC 0-inf_pred | mU/L * h | 515.416 |
| AUC 0-t/0-inf_pred | | 0.852 |
| AUC 0-inf/D_pred | mU/L * h/(mg) | 1030.832 |
| AUMC t-inf_pred | mU/L * h^2 | 2819.812 |
| AUMC 0-inf_pred | mU/L * h^2 | 6237.529 |
| AUMC 0-t/0-inf_pred | | 0.548 |
| MRT 0-inf_pred | h | 12.102 |
| Vz/F_pred | (mg)/(mU/L) | 0.013 |
| Cl/F_pred | (mg)/(mU/L)/h | 0.001 |

TABLE 11

Full Pharmacokinetic profile of Truffle Shell Albumin Crystal
Formulation - Human Insulin R formulations in Pigs

| Parameter | Unit | Value |
|---|---|---|
| R | | −0.986 |
| R_adjusted | | 0.946 |
| NumRegPoints | | 3.000 |
| TimeRegStart | h | 4.000 |
| TimeRegEnd | h | 24.000 |
| Lambda_z | 1/h | 0.069 |
| t½ | h | 10.053 |
| Tmax | h | 1.000 |
| Cmax | mU/L | 77.320 |
| Tlag | h | 0.000 |
| Tlast | h | 24.000 |
| Clast_obs | mU/L | 4.350 |
| Clast_obs/Cmax | | 0.056 |
| AUC 0-t | mU/L * h | 378.270 |
| AUC t-inf_obs | mU/L * h | 63.093 |
| AUC 0-inf_obs | mU/L * h | 441.363 |
| AUC 0-t/0-inf_obs | | 0.857 |
| AUC 0-inf/D_obs | mU/L * h/(mg) | 882.726 |
| AUMC 0-t | mU/L * h^2 | 2571.126 |
| AUMC t-inf_obs | mU/L * h^2 | 2429.327 |
| AUMC 0-inf_obs | mU/L * h^2 | 5000.454 |
| AUMC 0-t/0-inf_obs | | 0.514 |
| MRT 0-t | h | 6.797 |
| MRT 0-inf_obs | h | 11.330 |
| Vz/F_obs | (mg)/(mU/L) | 0.016 |
| Cl/F_obs | (mg)/(mU/L)/h | 0.001 |
| Clast_pred | mU/L | 4.587 |
| Clast_pred/Cmax | | 0.059 |
| AUC t-inf_pred | mU/L * h | 66.531 |
| AUC 0-inf_pred | mU/L * h | 444.801 |
| AUC 0-t/0-inf_pred | | 0.850 |
| AUC 0-inf/D_pred | mU/L * h/(mg) | 889.602 |
| AUMC t-inf_pred | mU/L * h^2 | 2561.708 |
| AUMC 0-inf_pred | mU/L * h^2 | 5132.834 |
| AUMC 0-t/0-inf_pred | | 0.501 |
| MRT 0-inf_pred | h | 11.540 |
| Vz/F_pred | (mg)/(mU/L) | 0.016 |
| Cl/F_pred | (mg)/(mU/L)/h | 0.001 |

Example 11: Pharmacokinetics Study of PTH (1-34) Formulation Containing/Enclosed Either in Crystalline Amylase or in Crystalline Albumin in Capsule Containing Vitamin E in Minipigs The present Example demonstrates that oral formulations of PTH (1-34) exemplary of oral formulations disclosed herein have therapeutically effective pharmacokinetic profiles, e.g., with advantageous properties as compared to parenteral administration of the same peptide/protein. The present example demonstrates a PTH formulation enclosed in crystalline albumin (as co-crystals or getting embedded in crystals of albumin while crystallization of albumin), demonstrating that enteric formulation is not required for advantageous application of formulations of the present disclosure.

The present Example includes an oral formulation of peptide/protein embedded in crystals of albumin prepared as follows: Commercially obtained PTH (1-34) (synthetic PTH (1-34) from PRIVEEL PEPTIDES) is a lyophilized white powder (>95% purity). The PTH (1-34) was processed to prepare albumin microparticles containing PTH according to the procedure mentioned under Example 4. The microparticle of albumin crystals containing PTH was then lyophilized after washing with cold isopropanol. The amount of lyophilized PTH was quantified against a reference standard using a C18 reverse phase TPLC column (gradient elution, solvent A (0.1% TFA in water), solvent B (0.4 TFA in acetonitrile)). The lyophilized PTH (dosage mentioned under Table 12) was then transferred to capsule containing 150 µL of Vitamin E and 100 µL of Wheatgerm oil under nitrogen. The capsule was then closed. The samples were then stored at 4° C. until further use.

TABLE 12

Experimental Design for Pharmacokinetics and Pharmacodynamics Analysis

|  | IV (Marketed Formulation) | Oral Capsule (Albumin Crystal formulation) |
|---|---|---|
| No. of Minipigs (Yorkshire) 3 to 4 months old | 2 | 4 |
| Sex | Female | Female |
| Body Weight | 12 ± 1 kg | 12 ± 1 kg |
| Group | 1 | 2 |
| Test Item | PTH (1-34) | PTH (1-34) |
| Dose (mg) | 0.04 | 0.8 |
| Formulation | Liquid | Capsule- Crystalline Albumin containing PTH within pores of the crystals + Vitamin E |
| Route | IV (Intravenous) | PO (oral - Capsule containing PTH embedded in albumin crystals + Vitamin E) |
| Feeding Status | Fasting overnight or Fed State | Fasting overnight or Fed State |
| Blood/plasma sample collection time | 0 min, 5 mins, 10 min, 30 mins 1 hr, 2 hrs, 4 hrs, and 12 hrs post dose | 0 min, 5 mins, 10 min, 30 mins 1 hr, 2 hrs, 4 hrs, and 12 hrs post dose |
| Analysis | PTH (1-34) ELISA kit Creative Diagnostics | |

Pharmacokinetic analysis was conducted in Female Minipigs weighing 12±1 kg for 2 days. Experimental design is shown in Table 12. Pigs in the oral treatment group was either fasted overnight or fed prior to the test sample administration. All the test animals in the treatment groups were administered with respective test formulation to the pre-designated animals. The time of dosage of each animal was noted. Blood samples were collected at aforementioned time points 0 min, 5 min, 10 min, 30 min, 1 hr, 2 hrs, 4 hrs, and 12 hrs into an EDTA-blood collection tubes for the separation of plasma to determine PTH (1-34) levels by ELISA. Plasma samples collected at different time points were analyzed by ELISA kit according to Creative Diagnostics protocol. This kit is based on sandwich enzyme-linked immuno-sorbent assay technology. An antibody, anti-PTH (1-34) was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient PTH (1-34) will produce a blue colored product, which then changes to yellow after adding the acidic stop solution. The intensity of the yellow color is proportional to the PTH (1-34) amount bound on the plate. The Optical Density (OD) was measured spectrophotometrically at 450 nm in a microplate reader, from which the concentration of PTH (1-34) can be calculated.

TABLE 13

Mean PTH (1-34) levels summary table (Pigs) in pg/ml

| Time (hrs) | Intravenous - Human PTH | Capsule - Albumin Crystal Formulation |
|---|---|---|
| 0 | 1429.01 ± 104.61 | 0 ± 0 |
| 0.08 | 2822.98 ± 196.91 | 37.54 ± 4.55 |
| 0.16 | 2898.29 ± 307.43 | 77.91 ± 8.16 |
| 0.5 | 1619.38 ± 229.76 | 95.55 ± 12.42 |
| 1 | 421.23 ± 126.34 | 1936.16 ± 122.07 |
| 2 | 164.93 ± 39.5 | 904.13 ± 90.79 |

TABLE 13-continued

Mean PTH (1-34) levels summary table (Pigs) in pg/ml

| Time (hrs) | Intravenous - Human PTH | Capsule - Albumin Crystal Formulation |
|---|---|---|
| 4 | 90.76 ± 7.55 | 142.44 ± 24.96 |
| 12 | 15.43 ± 1.57 | 16.1 ± 3.72 |

TABLE 14

Full Pharmacokinetic profile of Intravenous PTH (1-34) formulations in Minipigs

| Parameter | Unit | Value |
|---|---|---|
| R | | −0.999 |
| R_adjusted | | 0.994 |

TABLE 14-continued

Full Pharmacokinetic profile of Intravenous
PTH (1-34) formulations in Minipigs

| Parameter | Unit | Value |
|---|---|---|
| NumRegPoints | | 3.000 |
| TimeRegStart | h | 2.000 |
| TimeRegEnd | h | 12.000 |
| Lambda_z | 1/h | 0.233 |
| t½ | h | 2.981 |
| Tmax | h | 0.160 |
| Cmax | pg/ml | 2898.290 |
| C0 | pg/ml | 1429.010 |
| Tlast | h | 12.000 |
| Clast_obs | pg/ml | 15.430 |
| Clast_obs/Cmax | | 0.005 |
| AUC 0-t | pg/ml * h | 2650.617 |
| AUC t-inf_obs | pg/ml * h | 66.362 |
| AUC 0-inf_obs | pg/ml * h | 2716.979 |
| AUC 0-t/0-inf_obs | | 0.976 |
| AUC 0-inf/D_obs | pg/ml * h/(mg) | 67924.478 |
| AUMC_0-t | pg/ml * h^2 | 3822.072 |
| AUMC_t-inf_obs | pg/ml * h^2 | 1081.763 |
| AUMC 0-inf_obs | pg/ml * h^2 | 4903.835 |
| AUMC 0-t/0-inf_obs | | 0.779 |
| MRT 0-t | h | 1.442 |
| MRT 0-inf_obs | h | 1.805 |
| Vz_obs | (mg)/(pg/ml) | 0.000 |
| Cl_obs | (mg)/(pg/ml)/h | 0.000 |
| Vss_obs | (mg)/(pg/ml) | 0.000 |
| Clast_pred | pg/ml | 15.205 |
| Clast pred/Cmax | | 0.005 |
| AUC t-inf_pred | pg/ml * h | 65.394 |
| AUC 0-inf_pred | pg/ml * h | 2716.011 |
| AUC 0-t/0-inf_pred | | 0.976 |
| AUC 0-inf/D_pred | pg/ml * h/(mg) | 67900.272 |
| AUMC t-inf_pred | pg/ml * h^2 | 1065.980 |
| AUMC 0-inf_pred | pg/ml * h^2 | 4888.052 |
| AUMC 0-t/0-inf_pred | | 0.782 |
| MRT 0-inf_pred | h | 1.800 |
| Vz_pred | (mg)/(pg/ml) | 0.000 |
| Cl_pred | (mg)/(pg/ml)/h | 0.000 |
| Vss_pred | (mg)/(pg/ml) | 0.000 |

TABLE 15

Full Pharmacokinetic profile of Capsule Albumin Crystal
Formulation - PTH (1-34) formulations in Minipigs

| Parameter | Unit | Value |
|---|---|---|
| R | | −0.959 |
| R_adjusted | | 0.880 |
| NumRegPoints | | 4.000 |
| TimeRegStart | h | 1.000 |
| TimeRegEnd | h | 12.000 |
| Lambda_z | 1/h | 0.410 |
| t½ | h | 1.689 |
| Tmax | h | 1.000 |
| Cmax | pg/ml | 1936.160 |
| Tlag | h | 0.000 |
| Tlast | h | 12.000 |
| Clast_obs | pg/ml | 16.100 |
| Clast_obs/Cmax | | 0.008 |
| AUC 0-t | pg/ml * h | 3644.410 |
| AUC t-inf_obs | pg/ml * h | 39.235 |
| AUC 0-inf_obs | pg/ml * h | 3683.645 |
| AUC 0-t/0-inf_obs | | 0.989 |
| AUC 0-inf/D_obs | pg/ml * h/(mg) | 4604.556 |
| AUMC 0-t | pg/ml * h^2 | 7809.034 |
| AUMC t-inf_obs | pg/ml * h^2 | 566.431 |
| AUMC 0-inf_obs | pg/ml * h^2 | 8375.464 |
| AUMC 0-t/0-inf_obs | | 0.932 |
| MRT 0-t | h | 2.143 |
| MRT 0-inf_obs | h | 2.274 |
| Vz/F_obs | (mg)/(pg/ml) | 0.001 |
| Cl/F_obs | (mg)/(pg/ml)/h | 0.000 |

TABLE 15-continued

Full Pharmacokinetic profile of Capsule Albumin Crystal
Formulation - PTH (1-34) formulations in Minipigs

| Parameter | Unit | Value |
|---|---|---|
| Clast_pred | pg/ml | 12.849 |
| Clast_pred/Cmax | | 0.007 |
| AUC t-inf_pred | pg/ml * h | 31.312 |
| AUC 0-inf_pred | pg/ml * h | 3675.722 |
| AUC 0-t/0-inf_pred | | 0.991 |
| AUC 0-inf/D_pred | pg/ml * h/(mg) | 4594.653 |
| AUMC t-inf_pred | pg/ml * h^2 | 452.050 |
| AUMC 0-inf_pred | pg/ml * h^2 | 8261.083 |
| AUMC 0-t/0-inf_pred | | 0.945 |
| MRT 0-inf_pred | h | 2.247 |
| Vz/F_pred | (mg)/(pg/ml) | 0.001 |
| Cl/F_pred | (mg)/(pg/ml)/h | 0.000 |

The data in Table 13 and FIGS. 11 & 12 demonstrate average plasma concentration of PTH (1-34) at different time points. The full pharmacokinetic profile are shown in Table 14 and 15. Orally administered PTH (1-34) formulation showed 7% bioavailability when compared to IV. PTH (1-34) was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each PTH (1-34) dose was derived as the maximum of all valid concentrations, and t max was then determined as the corresponding time point to C max. The terminal elimination rate constant ($\lambda$ z) was estimated by log-linear regression on the terminal part of the concentration-time curve, and t ½ was then calculated as t ½=ln 2/$\lambda$z.

Example 12: Pharmacokinetics Study of PTH (1-34) Formulation Containing/Enclosed in Crystalline Albumin in Sugar Truffle Shell in Minipigs The present Example demonstrates that oral formulations of PTH (1-34) exemplary of oral formulations disclosed herein have therapeutically effective pharmacokinetic profiles, e.g., with advantageous properties as compared to parenteral administration of the same peptide/protein. The present example demonstrates a PTH formulation enclosed in crystalline albumin (as co-crystals or getting embedded in crystals of albumin while crystallization of albumin), demonstrating that enteric formulation is not required for advantageous application of formulations of the present disclosure.

The present Example includes an oral formulation of peptide/protein embedded in crystals of albumin prepared as follows: Commercially obtained PTH (1-34) (synthetic PTH (1-34) from PRIVEEL PEPTIDES) is a lyophilized white powder (>95% purity). The PTH (1-34) was processed to prepare albumin microparticles containing PTH according to the procedure mentioned under Example 4. The microparticle of albumin crystals containing PTH was then lyophilized after washing with cold isopropanol. The amount of lyophilized PTH was quantified against a reference standard using a C18 reverse phase HPLC column (gradient elution, solvent A (0.1% TFA in water), solvent B (0.1% TFA in acetonitrile)). The lyophilized PTH (1-34) (dosage mentioned under Table 16) was transferred to sugar truffle shell made from cane sugar or palm sugar. The shell was then sealed with coconut palm sugar (DEGA Farms). The samples were then stored at 4° C. until further use.

TABLE 16

Experimental Design for Pharmacokinetics and Pharmacodynamics Analysis

| | IV (Marketed Formulation) | Oral Truffle Shell (Albumin Crystal formulation) |
|---|---|---|
| No. of Minipigs (Yorkshire) 3 to 4 months old | 2 | 4 |
| Sex | Female | Female |
| Body Weight | 12 ± 1 kg | 12 ± 1 kg |
| Group | 1 | 2 |
| Test Item | PTH (1-34) | PTH (1-34) |
| Dose (mg) | 0.04 | 0.8 |
| Formulation | Liquid | Truffle Shell - Crystalline Albumin containing PTH within pores of the crystals |
| Route | IV (Intravenous) | PO (oral - Truffle Shell containing PTH embedded in albumin crystals) |
| Feeding Status | Fasting overnight or Fed State | Fasting overnight or Fed State |
| Blood/plasma sample collection time | 0 min, 5 mins, 10 min, 30 mins 1 hr, 2 hrs, 4 hrs, and 12 hrs post dose | 0 min, 5 mins, 10 min, 30 mins 1 hr, 2 hrs, 4 hrs, and 12 hrs post dose |
| Analysis | PTH (1-34) ELISA kit Creative Diagnostics | |

Pharmacokinetic analysis was conducted in Female Minipigs weighing 12±1 kg for 2 days. Experimental design is shown in Table 16. Pigs in the oral treatment group was either fasted overnight or fed prior to the test sample administration. All the test animals in the treatment groups were administered with respective test formulation to the pre-designated animals. The time of dosage of each animal was noted. Blood samples were collected at aforementioned time points 0 min, 5 min, 10 min, 30 min, 1 hr, 2 hrs, 4 hrs, and 12 hrs into an EDTA-blood collection tubes for the separation of plasma to determine PTH (1-34) levels by ELISA. Plasma samples collected at different time points were analyzed by ELISA kit according to Creative Diagnostics protocol. This kit is based on sandwich enzyme-linked immuno-sorbent assay technology. An antibody, anti-PTH (1-34) was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient PTH (1-34) will produce a blue colored product, which then changes to yellow after adding the acidic stop solution. The intensity of the yellow color is proportional to the PTH (1-34) amount bound on the plate. The Optical Density (OD) was measured spectrophotometrically at 450 nm in a microplate reader, from which the concentration of PTH (1-34) can be calculated.

TABLE 17

Mean PTH (1-34) levels summary table (Pigs) in pg/ml

| Time (hrs) | Intravenous - Human PTH | Truffle Shell - Albumin Crystal Formulation |
|---|---|---|
| 0 | 1429.01 ± 104.61 | 0 ± 0 |
| 0.08 | 2822.98 ± 196.91 | 70.56 ± 7.06 |
| 0.16 | 2898.29 ± 307.43 | 87.36 ± 11.68 |
| 0.5 | 1619.38 ± 229.76 | 130.74 ± 27.98 |
| 1 | 421.23 ± 126.34 | 1298.22 ± 199.08 |
| 2 | 164.93 ± 39.5 | 84.86 ± 10.8 |
| 4 | 90.76 ± 7.55 | 76.78 ± 8.37 |
| 12 | 15.43 ± 1.57 | 16.99 ± 3.7 |

TABLE 18

Full Pharmacokinetic profile of Intravenous PTH (1-34) formulations in Minipigs

| Parameter | Unit | Value |
|---|---|---|
| R | | −0.999 |
| R_adjusted | | 0.994 |
| NumRegPoints | | 3.000 |
| TimeRegStart | h | 2.000 |
| TimeRegEnd | h | 12.000 |
| Lambda_z | 1/h | 0.233 |
| $t^{1/2}$ | h | 2.981 |
| Tmax | h | 0.160 |
| Cmax | pg/ml | 2898.290 |
| C0 | pg/ml | 1429.010 |
| Tlast | h | 12.000 |
| Clast_obs | pg/ml | 15.430 |
| Clast_obs/Cmax | | 0.005 |
| AUC 0-t | pg/ml * h | 2650.617 |
| AUC t-inf_obs | pg/ml * h | 66.362 |
| AUC 0-inf_obs | pg/ml * h | 2716.979 |
| AUC 0-t/0-inf_obs | | 0.976 |
| AUC 0-inf/D_obs | pg/ml * h/(mg) | 67924.478 |
| AUMC 0-t | pg/ml * h^2 | 3822.072 |
| AUMC t-inf_obs | pg/ml * h^2 | 1081.763 |
| AUMC 0-inf_obs | pg/ml * h^2 | 4903.835 |
| AUMC 0-t/0-inf_obs | | 0.779 |
| MRT 0-t | h | 1.442 |
| MRT 0-inf_obs | h | 1.805 |
| Vz_obs | (mg)/(pg/ml) | 0.000 |
| Cl_obs | (mg)/(pg/ml)/h | 0.000 |
| Vss_obs | (mg)/(pg/ml) | 0.000 |
| Clast_pred | pg/ml | 15.205 |
| Clast_pred/Cmax | | 0.005 |
| AUC t-inf_pred | pg/ml * h | 65.394 |
| AUC 0-inf_pred | pg/ml * h | 2716.011 |
| AUC 0-t/0-inf_pred | | 0.976 |
| AUC 0-inf/D_pred | pg/ml * h/(mg) | 67900.272 |
| AUMC t-inf_pred | pg/ml * h^2 | 1065.980 |
| AUMC 0-inf_pred | pg/ml * h^2 | 4888.052 |
| AUMC 0-t/0-inf_pred | | 0.782 |
| MRT 0-inf_pred | h | 1.800 |
| Vz_pred | (mg)/(pg/ml) | 0.000 |
| Cl_pred | (mg)/(pg/ml)/h | 0.000 |
| Vss_pred | (mg)/(pg/ml) | 0.000 |

TABLE 19

Full Pharmacokinetic profile of Truffle Shell Albumin Crystal Formulation - PTH (1-34) formulations in Minipigs

| Parameter | Unit | Value |
|---|---|---|
| R | | −0.99 |
| R_adjusted | | 0.96 |
| NumRegPoints | | 3.00 |
| TimeRegStart | h | 2.00 |
| TimeRegEnd | h | 12.00 |
| Lambda_z | 1/h | 0.17 |
| $t^{1/2}$ | h | 4.11 |
| Tmax | h | 1.00 |
| Cmax | pg/ml | 1298.22 |
| Tlag | h | 0.00 |
| Tlast | h | 12.00 |

TABLE 19-continued

Full Pharmacokinetic profile of Truffle Shell Albumin Crystal
Formulation - PTH (1-34) formulations in Minipigs

| Parameter | Unit | Value |
|---|---|---|
| Clast_obs | pg/ml | 16.99 |
| Clast_obs/Cmax |  | 0.01 |
| AUC 0-t | pg/ml * h | 1631.72 |
| AUC t-inf_obs | pg/ml * h | 100.68 |
| AUC 0-inf_obs | pg/ml * h | 1732.40 |
| AUC 0-t/0-inf_obs |  | 0.94 |
| AUC 0-inf/D_obs | pg/ml * h/(mg) | 2165.50 |
| AUMC 0-t | pg/ml * h^2 | 3610.21 |
| AUMC t-inf_obs | pg/ml * h^2 | 1804.77 |
| AUMC 0-inf_obs | pg/ml * h^2 | 5414.98 |
| AUMC 0-t/0-inf_obs |  | 0.67 |
| MRT 0-t | h | 2.21 |
| MRT 0-inf_obs | h | 3.13 |
| Vz/F_obs | (mg)/(pg/ml) | 0.00 |
| Cl/F_obs | (mg)/(pg/ml)/h | 0.00 |
| Clast_pred | pg/ml | 17.44 |
| Clast_pred/Cmax |  | 0.01 |
| AUC t-inf_pred | pg/ml * h | 103.37 |
| AUC 0-inf_pred | pg/ml * h | 1735.09 |
| AUC 0-t/0-inf_pred |  | 0.94 |
| AUC 0-inf/D_pred | pg/ml * h/(mg) | 2168.86 |
| AUMC t-inf_pred | pg/ml * h^2 | 1853.02 |
| AUMC 0-inf_pred | pg/ml * h^2 | 5463.23 |
| AUMC 0-t/0-inf_pred |  | 0.66 |
| MRT 0-inf_pred | h | 3.15 |
| Vz/F_pred | (mg)/(pg/ml) | 0.00 |
| Cl/F_pred | (mg)/(pg/ml)/h | 0.00 |

The data in Table 17 and FIGS. 13 & 14 demonstrate average plasma concentration of PTH (1-34) at different time points. The full pharmacokinetic profile are shown in Table 18 and 19. Orally administered PTH (1-34) formulation showed 9% bioavailability when compared to IV. PTH (1-34) was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each PTH (1-34) dose was derived as the maximum of all valid concentrations, and t max was then determined as the corresponding time point to C max. The terminal elimination rate constant ($\lambda z$) was estimated by log-linear regression on the terminal part of the concentration-time curve, and t ½ was then calculated as t $½=\ln 2/\lambda z$.

Example 13: Pharmacokinetics Study of Semaglutide Formulation Containing/Enclosed in Crystalline Albumin in Sugar Truffle Shell in Rats The present Example demonstrates that oral formulations of Semaglutide exemplary of oral formulations disclosed herein have therapeutically effective pharmacokinetic profiles, e.g., with advantageous properties as compared to parenteral administration of the same peptide/protein. The present example demonstrates a semaglutide formulation enclosed in crystalline albumin (as co-crystals or getting embedded in crystals of albumin while crystallization of albumin), demonstrating that enteric formulation is not required for advantageous application of formulations of the present disclosure.

The present Example includes an oral formulation of peptide/protein embedded in crystals of albumin prepared as follows: Commercially obtained semaglutide (synthetic semaglutide) from PRIVEEL PEPTIDES is a lyophilized white powder (>95% purity). The semaglutide was processed to prepare albumin microparticles containing semaglutide according to the procedure mentioned under Example 5. The microparticle of albumin crystals containing semaglutide was then lyophilized after washing with cold isopropanol. The amount of lyophilized semaglutide was quantified against a reference standard using a C18 reverse phase HPLC column (gradient elution, solvent A (0.1% TFA in water), solvent B (0.1% TFA in acetonitrile)). The lyophilized semaglutide (dosage mentioned under Table 20) was then transferred to sugar truffle shell made from cane sugar or palm sugar. The shell was then sealed with coconut palm sugar (DEGA Farms). The samples were then stored at 4° C. until further use.

TABLE 20

Experimental Design for Pharmacokinetics and Pharmacodynamics Analysis

| | SC (Marketed Formulation) | Oral Truffle Shell (Albumin Crystal formulation) |
|---|---|---|
| No. of Rats (Wistar) | 6 | 6 |
| Sex | Male | Male |
| Body Weight | 150 to 250 gm | 150 to 250 gm |
| Group | 1 | 2 |
| Test Item | Semaglutide | Semaglutide |
| Dose (mg) | 0.1 | 1 |
| Formulation | Liquid | Truffle Shell - Crystalline Albumin containing Semaglutide within pores of the crystals |
| Route | SC (Subcutaneous) | PO (oral - Truffle Shell containing Semaglutide embedded in albumin crystals) |
| Feeding Status | Fasting overnight or Fed State | Fasting overnight or Fed State |
| Blood/plasma sample collection time | 0 min, 15 mins, 30 mins, 1 hr, 2 hrs, 4 hrs, 8 hrs, and 24 hrs post dose | 0 min, 15 mins, 30 mins, 1 hr, 2 hrs, 4 hrs, 8 hrs, and 24 hrs post dose |
| Analysis | SEMAGLUTIDE ELISA kit Krishgen Biosystems | |

Pharmacokinetic analysis was conducted in male Wistar Rats weighing 150 to 250 grams for 1 day. Experimental design is shown in Table 20. Rats in the oral treatment group was fasted overnight. All the test animals in the treatment groups were administered with respective test formulation to the pre-designated animals. The time of dosage of each animal was noted. Blood samples were collected at aforementioned time points 0 min, 15 min, 30 min 1 hr, 2 hrs, 4 hrs, 8 hrs, and 24 hrs into an EDTA-blood collection tubes for the separation of plasma to determine Semaglutide levels by ELISA. Plasma samples collected at different time points were analyzed by ELISA kit according to Krishgen Biosystems protocol. This kit is based on sandwich enzyme-linked immuno-sorbent assay technology. An antibody, anti-Semaglutide was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient Semaglutide will produce a blue colored product, which then changes to yellow after adding the acidic stop solution. The intensity of the yellow color is proportional to the Semaglutide amount bound on the plate. The Optical Density (GD) was measured spectrophotometrically at 450 nm in a microplate reader, from which the concentration of Semaglutide can be calculated.

TABLE 21

Mean Semaglutide levels summary table (Rats) in ng/ml

| Time (hrs) | Subcutaneous - Semaglutide | Truffle Shell - Albumin Crystal Formulation |
|---|---|---|
| 0 | 0.00 ± 0.00 | 0.00 ± 0.00 |
| 0.25 | 11919.25 ± 2415.21 | 6506.03 ± 1557.35 |
| 0.5 | 11224.91 ± 1471.13 | 8317.93 ± 3804.83 |
| 1 | 13059.38 ± 1672.19 | 8165.04 ± 2561.98 |
| 2 | 12568.97 ± 2928.28 | 9130.81 ± 807.07 |
| 4 | 10321.8 ± 2787.96 | 7826.78 ± 554.38 |
| 8 | 8556.34 ± 1422.82 | 8419.39 ± 1908.62 |
| 24 | 6808.65 ± 1727.77 | 4991.56 ± 1290.94 |

TABLE 22

Full Pharmacokinetic profile of Subcutaneous Semaglutide formulations in Rats

| Parameter | Unit | Value |
|---|---|---|
| R | | −0.961937893 |
| R_adjusted | | 0.85064902 |
| NumRegPoints | | 3 |
| TimeRegStart | h | 4 |
| TimeRegEnd | h | 24 |
| Lambda_z | 1/h | 0.018939415 |
| t½ | h | 36.59812948 |
| Tmax | h | 1 |
| Cmax | ng/ml | 13059.38 |
| Tlag | h | 0 |
| Tlast | h | 24 |
| Clast_obs | ng/ml | 6808.65 |
| Clast_obs/Cmax | | 0.521360892 |
| AUC 0-t | ng/ml * h | 206835.1438 |
| AUC t-inf_obs | ng/ml * h | 359496.3109 |
| AUC 0-inf_obs | ng/ml * h | 566331.4546 |
| AUC 0-t/0-inf_obs | | 0.365219241 |
| AUC 0-inf/D_obs | ng/ml * h/(mg) | 5663314.546 |
| AUMC 0-t | ng/ml * h^2 | 2165980.669 |
| AUMC t-inf_obs | ng/ml * h^2 | 27609295.07 |
| AUMC 0-inf_obs | ng/ml * h^2 | 29775275.74 |
| AUMC 0-t/0-inf_obs | | 0.072744269 |
| MRT 0-t | h | 10.47201471 |
| MRT 0-inf_obs | h | 52.57570544 |
| Vz/F_obs | (mg)/(ng/ml) | 9.32315E−06 |
| Cl/F_obs | (mg)/(ng/ml)/h | 1.76575E−07 |
| Clast_pred | ng/ml | 6724.573694 |
| Clast_pred/Cmax | | 0.51492289 |
| AUC t-inf_pred | ng/ml * h | 355057.087 |
| AUC 0-inf_pred | ng/ml * h | 561892.2307 |
| AUC 0-t/0-inf_pred | | 0.368104651 |
| AUC 0-inf/D_pred | ng/ml * h/(mg) | 5618922.307 |
| AUMC t-inf_pred | ng/ml * h^2 | 27268362.94 |
| AUMC 0-inf_pred | ng/ml * h^2 | 29434343.61 |
| AUMC 0-t/0-inf_pred | | 0.073586851 |
| MRT 0-inf_pred | h | 52.38432212 |
| Vz/F_pred | (mg)/(ng/ml) | 9.39681E−06 |
| Cl/F_pred | (mg)/(ng/ml)/h | 1.7797E−07 |

TABLE 23

Full Pharmacokinetic profile of Truffle Shell Albumin Crystal Formulation - Semaglutide formulations in Rats

| Parameter | Unit | Value |
|---|---|---|
| R | | −0.962359723 |
| R_adjusted | | 0.889204356 |
| NumRegPoints | | 4 |
| TimeRegStart | h | 2 |
| TimeRegEnd | h | 24 |
| Lambda_z | 1/h | 0.026044791 |
| t½ | h | 26.61365842 |
| Tmax | h | 2 |
| Cmax | ng/ml | 9130.81 |
| Tlag | h | 0 |
| Tlast | h | 24 |
| Clast_obs | ng/ml | 4991.56 |
| Clast_obs/Cmax | | 0.546672201 |
| AUC 0-t | ng/ml * h | 172172.4463 |
| AUC t-inf_obs | ng/ml * h | 191652.908 |
| AUC 0-inf_obs | ng/ml * h | 363825.3542 |
| AUC 0-t/0-inf_obs | | 0.473228279 |
| AUC 0-inf/D_obs | ng/ml * h/(mg) | 363825.3542 |
| AUMC 0-t | ng/ml * h^2 | 1761334.529 |
| AUMC t-inf_obs | ng/ml * h^2 | 11958258.51 |
| AUMC 0-inf_obs | ng/ml * h^2 | 13719593.04 |
| AUMC 0-t/0-inf_obs | | 0.12838096 |
| MRT 0-t | h | 10.23006043 |
| MRT 0-inf_obs | h | 37.70928245 |
| Vz/F_obs | (mg)/(ng/ml) | 0.000105532 |
| Cl/F_obs | (mg)/(ng/ml)/h | 2.74857E−06 |
| Clast_pred | ng/ml | 5074.47662 |
| Clast_pred/Cmax | | 0.555753172 |
| AUC t-inf_pred | ng/ml * h | 194836.5242 |
| AUC 0-inf_pred | ng/ml * h | 367008.9704 |
| AUC 0-t/0-inf_pred | | 0.469123264 |
| AUC 0-inf/D_pred | ng/ml * h/(mg) | 367008.9704 |
| AUMC t-inf_pred | ng/ml * h^2 | 12156901.5 |
| AUMC 0-inf_pred | ng/ml * h^2 | 13918236.03 |
| AUMC 0-t/0-inf_pred | | 0.126548689 |
| MRT 0-inf_pred | h | 37.92342191 |
| Vz/F_pred | (mg)/(ng/ml) | 0.000104617 |
| Cl/F_pred | (mg)/(ng/ml)/h | 2.72473E−06 |

The data in Table 21 demonstrate average plasma concentration of Semaglutide at different time points. The full pharmacokinetic profile are shown in Tables 22 and 23. Orally administered Semaglutide formulation showed 8% bioavailability when compared to SC. Semaglutide was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each Semaglutide dose was derived as the maximum of all valid concentrations, and t max was then determined as the corresponding time point to C max. The terminal elimination rate constant ($\lambda_z$) was estimated by log-linear regression on the terminal part of the concentration-time curve, and t ½ was then calculated as t $½ = \ln 2/\lambda_z$.

Example 14: Pharmacokinetics Study of Octreotide Formulation Containing/Enclosed in Crystalline Albumin in Sugar Truffle Shell in Rats The present Example demonstrates that oral formulations of Octreotide exemplary of oral formulations disclosed herein have therapeutically effective pharmacokinetic profiles, e.g., with advantageous properties as compared to parenteral administration of the same peptide/protein. The present example demonstrates a Octreotide formulation enclosed in crystalline albumin (as co-crystals or getting embedded in crystals of albumin while crystallization of albumin), demonstrating that enteric formulation is not required for advantageous application of formulations of the present disclosure.

The present Example includes an oral formulation of peptide/protein embedded in crystals of albumin prepared as follows: Commercially obtained Octreotide (synthetic Octreotide) from HEMMO Pharmaceuticals Pvt. Ltd. is a lyophilized white powder (>95% purity). The Octreotide was processed to prepare albumin microparticles containing Octreotide according to the procedure mentioned under Example 6. The microparticle of albumin crystals containing Octreotide was then lyophilized after washing with cold isopropanol. The amount of lyophilized Octreotide was quantified against a reference standard using a C18 reverse phase HPLC column (gradient elution, solvent A (0.1% TFA in water), solvent B (0.1% TFA in acetonitrile)). The lyophilized Octreotide (dosage mentioned under Table 24) was then transferred to sugar truffle shell made from cane sugar or palm sugar. The shell was then sealed with coconut palm sugar (DEGA Farms). The samples were then stored at 4° C. until further use.

TABLE 24

Experimental Design for Pharmacokinetics and Pharmacodynamics Analysis

| | IV (Marketed Formulation) | Oral Truffle Shell (Albumin Crystal formulation) |
|---|---|---|
| No. of Rats (Wistar) | 6 | 6 |
| Sex | Male | Male |
| Body Weight | 150 to 250 gm | 150 to 250 gm |
| Group | 1 | 2 |
| Test Item | Octreotide | Octreotide |
| Dose (mg) | 0.1 | 1 |
| Formulation | Liquid | Truffle Shell - Crystalline Albumin containing Octreotide within pores of the crystals |
| Route | IV (Intravenous) | PO (oral - Truffle Shell containing Octreotide embedded in albumin crystals) |
| Feeding Status | Fasting overnight or Fed State | Fasting overnight or Fed State |
| Blood/plasma sample collection time | 0 min, 15 mins, 30 mins, 1 hr, 2 hrs, 4 hrs, 8 hrs, and 24 hrs post dose | 0 min, 15 mins, 30 mins, 1 hr, 2 hrs, 4 hrs, 8 hrs, and 24 hrs post dose |
| Analysis | Octreotide ELISA kit Krishgen Biosystems | |

Pharmacokinetic analysis was conducted in male Wistar Rats weighing 150 to 250 gms for 1 day. Experimental design is shown in Table 24. Rats in the oral treatment group was fasted overnight. All the test animals in the treatment groups were administered with respective test formulation to the pre-designated animals. The time of dosage of each animal was noted. Blood samples were collected at aforementioned time points 0 min, 15 min, 30 min, 1 hr, 2 hrs, 4 hrs, 8 hrs, and 24 hrs into an EDTA-blood collection tubes for the separation of plasma to determine Octreotide levels by ELISA. Plasma samples collected at different time points were analyzed by ELISA kit according to Krishgen Biosystems protocol. This kit is based on sandwich enzyme-linked immuno-sorbent assay technology. An antibody, anti-Octreotide was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient Octreotide will produce a blue colored product, which then changes to yellow after adding the acidic stop solution. The intensity of the yellow color is proportional to the Octreotide amount bound on the plate. The Optical Density (OD) was measured spectrophotometrically at 450 nm in a microplate reader, from which the concentration of Octreotide can be calculated.

TABLE 25

Mean Octreotide levels summary table (Rats) in ng/ml

| Time (hrs) | Intravenous - Octreotide | Truffle Shell - Albumin Crystal Formulation |
|---|---|---|
| 0 | 3833.90 ± 1293.17 | 0.00 |
| 0.25 | 4394.41 ± 559.38 | 2813.46 ± 284.67 |
| 0.5 | 3168.32 ± 923.66 | 4459.00 ± 1353.51 |
| 1 | 4130.22 ± 1165.13 | 3515.98 ± 2256.02 |
| 2 | 5387.15 ± 355.51 | 4068.06 ± 1817.89 |
| 4 | 5147.22 ± 704.27 | 1809.35 ± 589.60 |
| 8 | 3164.00 ± 1389.19 | 3208.87 ± 461.38 |
| 24 | 1646.09 ± 337.73 | 4991.56 ± 1290.94 |

TABLE 26

Full Pharmacokinetic profile of Intravenous Octreotide formulations in Rats

| Parameter | Unit | Value |
|---|---|---|
| R | | −0.976684847 |
| R_adjusted | | 0.930869935 |
| NumRegPoints | | 4 |
| TimeRegStart | h | 2 |
| TimeRegEnd | h | 24 |
| Lambda_z | 1/h | 0.053988465 |
| $t^{1/2}$ | h | 12.83880133 |
| Tmax | h | 2 |
| Cmax | ng/ml | 5387.15 |
| C0 | ng/ml | 3833.9 |
| Tlast | h | 24 |
| Clast_obs | ng/ml | 1646.09 |
| Clast_obs/Cmax | | 0.305558598 |
| AUC 0-t | ng/ml * h | 74194.73 |
| AUC t-inf_obs | ng/ml * h | 30489.66088 |
| AUC 0-inf_obs | ng/ml * h | 104684.3909 |
| AUC 0-t/0-inf_obs | | 0.708746828 |
| AUC 0-inf/D_obs | ng/ml * h/(mg) | 167495.0254 |
| AUMC 0-t | ng/ml * h^2 | 651063.7456 |
| AUMC t-inf_obs | ng/ml * h^2 | 1296495.843 |
| AUMC 0-inf_obs | ng/ml * h^2 | 1947559.588 |
| AUMC 0-t/0-inf_obs | | 0.334297215 |
| MRT 0-t | h | 8.775067254 |
| MRT 0-inf_obs | h | 18.6041068 |
| Vz_obs | (mg)/(ng/ml) | 0.000110585 |
| Cl_obs | (mg)/(ng/ml)/h | 5.97033E−06 |
| Vss_obs | (mg)/(ng/ml) | 0.000111073 |
| Clast_pred | ng/ml | 1584.621413 |
| Clast_pred/Cmax | | 0.294148374 |
| AUC t-inf_pred | ng/ml * h | 29351.1105 |
| AUC 0-inf_pred | ng/ml * h | 103545.8405 |
| AUC 0-t/0-inf_pred | | 0.716539937 |
| AUC 0-inf/D_pred | ng/ml * h/(mg) | 165673.3448 |
| AUMC t-inf_pred | ng/ml * h^2 | 1248081.863 |
| AUMC 0-inf_pred | ng/ml * h^2 | 1899145.608 |
| AUMC 0-t/0-inf_pred | | 0.342819288 |
| MRT 0-inf_pred | h | 18.34110959 |
| Vz_pred | (mg)/(ng/ml) | 0.000111801 |
| Cl_pred | (mg)/(ng/ml)/h | 6.03597E−06 |
| Vss_pred | (mg)/(ng/ml) | 0.000110706 |

TABLE 27

Full Pharmacokinetic profile of Truffle Shell Albumin
Crystal Formulation - Octreotide formulations in Rats

| Parameter | Unit | Value |
|---|---|---|
| R | | −0.773280425 |
| R_adjusted | | 0.49745327 |
| NumRegPoints | | 6 |
| TimeRegStart | h | 0.5 |
| TimeRegEnd | h | 24 |
| Lambda_z | 1/h | 0.039188335 |
| t½ | h | 17.68758937 |
| Tmax | h | 0.5 |
| Cmax | ng/ml | 4459 |
| Tlag | h | 0 |
| Tlast | h | 24 |
| Clast_obs | ng/ml | 1469.39 |
| Clast_obs/Cmax | | 0.329533528 |
| AUC 0-t | ng/ml * h | 60386.435 |
| AUC t-inf_obs | ng/ml * h | 37495.59642 |
| AUC 0-inf_obs | ng/ml * h | 97882.03142 |
| AUC 0-t/0-inf_obs | | 0.616930749 |
| AUC 0-inf/D_obs | ng/ml * h/(mg) | 26101.87505 |
| AUMC 0-t | ng/ml * h^2 | 576397.7488 |
| AUMC t-inf_obs | ng/ml * h^2 | 1856699.349 |
| AUMC 0-inf_obs | ng/ml * h^2 | 2433097.098 |
| AUMC 0-t/0-inf_obs | | 0.236898786 |
| MRT 0-t | h | 9.545152794 |
| MRT 0-inf_obs | h | 24.85744383 |
| Vz/F_obs | (mg)/(ng/ml) | 0.000977623 |
| Cl/F_obs | (mg)/(ng/ml)/h | 3.83114E−05 |
| Clast_pred | ng/ml | 1443.869959 |
| Clast_pred/Cmax | | 0.323810262 |
| AUC t-inf_pred | ng/ml * h | 36844.38119 |
| AUC 0-inf_pred | ng/ml * h | 97230.81619 |
| AUC 0-t/0-inf_pred | | 0.621062718 |
| AUC 0-inf/D_pred | ng/ml * h/(mg) | 25928.21765 |
| AUMC t-inf_pred | ng/ml * h^2 | 1824452.605 |
| AUMC 0-inf_pred | ng/ml * h^2 | 2400850.354 |
| AUMC 0-t/0-inf_pred | | 0.240080665 |
| MRT 0-inf_pred | h | 24.69227811 |
| Vz/F_pred | (mg)/(ng/ml) | 0.000984171 |
| Cl/F_pred | (mg)/(ng/ml)/h | 3.8568E−05 |

The data in Table 25 demonstrate average plasma concentration of Octreotide at different time points. The full pharmacokinetic profile are shown in Table 26 and 27. Orally administered Octreotide formulation showed 14% bioavailability when compared to IV. Octreotide was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each Octreotide dose was derived as the maximum of all valid concentrations, and t max was then determined as the corresponding time point to C max. The terminal elimination rate constant ($\lambda$ z) was estimated by log-linear regression on the terminal part of the concentration-time curve, and t ½ was then calculated as t ½=ln 2/$\lambda$z.

Example 15: Pharmacokinetics Study of hGH Formulation Containing/Enclosed in Crystalline Albumin in Capsule Containing Vitamin E in Minipigs The present Example demonstrates that oral formulations of hGH exemplary of oral formulations disclosed herein have therapeutically effective pharmacokinetic profiles, e.g., with advantageous properties as compared to parenteral administration of the same peptide/protein. The present example demonstrates a hGH formulation enclosed in crystalline albumin (as co-crystals or getting embedded in crystals of albumin while crystallization of albumin), demonstrating that enteric formulation is not required for advantageous application of formulations of the present disclosure.

The present Example includes an oral formulation of peptide/protein embedded in crystals of albumin prepared as follows: Commercially available hGH (Human Growth Hormone Inj. Norditropin NordiFlex, 15 mg/1.5 mL) containing Somatropin 10 mg, mannitol 39 mg, histidine 1.1 mg, poloxamer 188 3.0 mg, phenol 3.0 mg, and water for injection in 1.0 mL with HCl and NaOH was processed to prepare albumin microparticles containing hGH according to the procedure mentioned under Example 7. The microparticle of albumin crystals containing hGH was then lyophilized after washing with cold isopropanol. The amount of lyophilized hGH was quantified against a reference standard using a C18 reverse phase HPLC column (gradient elution, solvent A (0.100 TFA in water), solvent B (0.1% TFA in acetonitrile)). The lyophilized hGH (dosage mentioned under Table 1) was then transferred to capsule containing 150 μL of Vitamin E and 100 μL of Wheatgerm oil under nitrogen. The capsule was then closed. The samples were then stored at 4° C. until further use.

TABLE 28

Experimental Design for Pharmacokinetics and Pharmacodynamics Analysis

| | IV (Marketed Formulation) | Oral Capsule (Albumin Crystal formulation) |
|---|---|---|
| No. of Minipigs (Yorkshire) 3 to 4 months old | 2 | 4 |
| Sex | Female | Female |
| Body Weight | 12 ± 1 kg | 12 ± 1 kg |
| Group | 1 | 2 |
| Test Item | hGH | hGH |
| Dose (mg) | 0.33 | 2.25 |
| Formulation | Liquid | Capsule- Crystalline Albumin containing HGH within pores of the crystals + Vitamin E |
| Route | IV (Intravenous) | PO (oral - Capsule containing HGH embedded in albumin crystals + Vitamin E) |
| Feeding Status | Fasting overnight or Fed State | Fasting overnight or Fed State |
| Blood/plasma sample collection time | 0 min, 5 mins, 30 mins, 1 hr, 4 hrs, 8 hrs, 24 hrs and 48 hrs post dose | 0 min, 5 mins, 30 mins, 1 hr, 4 hrs, 8 hrs, 24 hrs and 48 hrs post dose |
| Analysis | hGH ELISA kit Creative Diagnostics | |

Pharmacokinetic analysis was conducted in Female Minipigs weighing 12±1 kg for 2 days. Experimental design is shown in Table 28. Pigs in the oral treatment group was either fasted overnight or fed prior to the test sample administration. All the test animals in the treatment groups were administered with respective test formulation to the pre-designated animals. The time of dosage of each animal was noted. Blood samples were collected at aforementioned time points 0 min, 5 min, 30 min, 1 hr, 4 hrs, 8 hrs, 24 hrs and 48 hrs into an EDTA-blood collection tubes for the separation of plasma to determine hGH levels by ELISA. Plasma samples collected at different time points were analyzed by ELISA kit according to Creative Diagnostics protocol. This kit is based on sandwich enzyme-linked immuno-sorbent assay technology. An antibody, anti-hGH was pre-coated onto a 96-well plate. Standards, test samples, and biotin-conjugated reagent were added to the wells and incubated. The IRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient hGH will produce a blue colored product, which then changes to yellow after adding the acidic stop solution. The intensity of the yellow color is proportional to the hGH amount bound on the plate. The Optical Density (OD) was measured spectrophotometrically at 450 nm in a microplate reader, from which the concentration of hGH can be calculated.

TABLE 29

Mean hGH levels summary table (Pigs) in pg/ml

| Time (hrs) | Intravenous - Human hGH | Capsule - Albumin Crystal Formulation |
|---|---|---|
| 0 | 18144.54 ± 1619.64 | 0 ± 0 |
| 0.08 | 20014.87 ± 620.32 | 21418.66 ± 90.37 |
| 0.5 | 22513.2 ± 562.85 | 30064.67 ± 5584.89 |
| 1 | 22130.7 ± 728.54 | 10545.62 ± 7346.62 |
| 4 | 14910.13 ± 2908.87 | 1374.02 ± 300.33 |
| 8 | 1159.19 ± 226.15 | 177.98 ± 33.19 |
| 24 | 1495.55 ± 291.77 | 168.86 ± 0 |
| 48 | 463.04 ± 90.34 | 0 ± 0 |

TABLE 30

Full Pharmacokinetic profile of Intravenous hGH formulations in Minipigs

| Parameter | Unit | Value |
|---|---|---|
| R |  | −0.838 |
| R_adjusted |  | 0.629 |
| NumRegPoints |  | 6.000 |
| TimeRegStart | h | 0.500 |
| TimeRegEnd | h | 48.000 |
| Lambda_z | 1/h | 0.077 |
| t½ | h | 8.980 |
| Tmax | h | 0.500 |
| Cmax | pg/ml | 22513.200 |
| C0 | pg/ml | 18144.540 |
| Tlast | h | 48.000 |
| Clast_obs | pg/ml | 463.040 |
| Clast_obs/Cmax |  | 0.021 |
| AUC 0-t | pg/ml * h | 154059.131 |
| AUC t-inf_obs | pg/ml * h | 5998.634 |
| AUC 0-inf_obs | pg/ml * h | 160057.765 |
| AUC 0-t/0-inf_obs |  | 0.963 |
| AUC 0-inf/D_obs | pg/ml * h/(mg) | 485023.532 |
| AUMC 0-t | pg/ml * h^2 | 1330359.118 |
| AUMC t-inf_obs | pg/ml * h^2 | 365646.123 |
| AUMC 0-inf_obs | pg/ml * h^2 | 1696005.242 |
| AUMC 0-t/0-inf_obs |  | 0.784 |
| MRT 0-t | h | 8.635 |
| MRT 0-inf_obs | h | 10.596 |
| Vz_obs | (mg)/(pg/ml) | 0.000 |
| Cl_obs | (mg)/(pg/ml)/h | 0.000 |
| Vss_obs | (mg)/(pg/ml) | 0.000 |
| Clast_pred | pg/ml | 314.650 |
| Clast_pred/Cmax |  | 0.014 |
| AUC t-inf_pred | pg/ml * h | 4076.251 |
| AUC 0-inf_pred | pg/ml * h | 158135.382 |
| AUC 0-t/0-inf_pred |  | 0.974 |
| AUC 0-inf/D_pred | pg/ml * h/(mg) | 479198.128 |
| AUMC t-inf_pred | pg/ml * h^2 | 248467.457 |
| AUMC 0-inf_pred | pg/ml * h^2 | 1578826.575 |
| AUMC 0-t/0-inf_pred |  | 0.843 |
| MRT 0-inf_pred | h | 9.984 |

TABLE 31

Full Pharmacokinetic profile of Capsule Albumin Crystal Formulation - hGH formulations in Minipigs

| Parameter | Unit | Value |
|---|---|---|
| R |  | −0.77 |
| R_adjusted |  | 0.46 |
| NumRegPoints |  | 5.00 |
| TimeRegStart | h | 0.50 |
| TimeRegEnd | h | 24.00 |
| Lambda_z | 1/h | 0.19 |
| t½ | h | 3.70 |
| Tmax | h | 0.50 |
| Cmax | pg/ml | 30064.67 |
| Tlag | h | 0.00 |
| Tlast | h | 24.00 |
| Clast_obs | pg/ml | 168.86 |
| Clast_obs/Cmax |  | 0.01 |
| AUC 0-t | pg/ml * h | 45579.00 |
| AUC t-inf_obs | pg/ml * h | 901.11 |
| AUC 0-inf_obs | pg/ml * h | 46480.11 |
| AUC 0-t/0-inf_obs |  | 0.98 |
| AUC 0-inf/D_obs | pg/ml * h/(mg) | 18592.04 |
| AUMC 0-t | pg/ml * h^2 | 91693.88 |
| AUMC t-inf_obs | pg/ml * h^2 | 26435.37 |
| AUMC 0-inf_obs | pg/ml * h^2 | 118129.25 |
| AUMC 0-t/0-inf_obs |  | 0.78 |
| MRT 0-t | h | 2.01 |
| MRT 0-inf_obs | h | 2.54 |
| Vz/F_obs | (mg)/(pg/ml) | 0.00 |
| Cl/F_obs | (mg)/(pg/ml)/h | 0.00 |
| Clast_pred | pg/ml | 75.96 |
| Clast_pred/Cmax |  | 0.00 |
| AUC t-inf_pred | pg/ml * h | 405.36 |
| AUC 0-inf_pred | pg/ml * h | 45984.36 |
| AUC 0-t/0-inf_pred |  | 0.99 |
| AUC 0-inf/D_pred | pg/ml * h/(mg) | 18393.74 |
| AUMC t-inf_pred | pg/ml * h^2 | 11891.73 |
| AUMC 0-inf_pred | pg/ml * h^2 | 103585.61 |
| AUMC 0-t/0-inf_pred |  | 0.89 |
| MRT 0-inf_pred | h | 2.25 |
| Vz/F_pred | (mg)/(pg/ml) | 0.00 |
| Cl/F_pred | (mg)/(pg/ml)/h | 0.00 |

The data in Table 29 and FIGS. 17 & 18 demonstrate average plasma concentration of hGH at different time points. The full pharmacokinetic profile are shown in Table 30 and 31. Orally administered hGH formulation showed 4.3% bioavailability when compared to IV. hGH was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each hGH dose was derived as the maximum of all valid concentrations, and t max was then determined as the corresponding time point to C max. The terminal elimination rate constant ($\lambda$ z) was estimated by log-linear regression on the terminal part of the concentration-time curve, and t ½ was then calculated as t ½=ln 2/$\lambda$z.

Example 16: Pharmacokinetics Study of hGH Formulation Containing/Enclosed in Crystalline Albumin in Sugar Truffle Shell in Minipigs The present Example demonstrates that oral formulations of hGH exemplary of oral formulations disclosed herein have therapeutically effective pharmacokinetic profiles, e.g., with advantageous properties as compared to parenteral administration of the same peptide/protein. The present example describes a hGH formulation enclosed in crystalline albumin (as co-crystals or getting embedded in crystals of albumin while crystallization of albumin) and formulated as a sugar truffle, demonstrating that enteric formulation is not required for advantageous application of formulations of the present disclosure.

The present Example includes an oral formulation of peptide/protein embedded in crystals of albumin prepared as follows: Commercially available hGH (Human Growth Hormone Inj. Norditropin NordiFlex, 15 mg/1.5 mL) containing Somatropin 10 mg, mannitol 39 mg, histidine 1.1 mg, poloxamer 188 3.0 mg, phenol 3.0 mg, and water for injection in 1.0 mL with HCl and NaOH was processed to prepare albumin microparticles containing hGH according to the procedure mentioned under Example 7. The microparticle of albumin crystals containing hGH was then lyophilized after washing with cold isopropanol. The amount of lyophilized hGH was quantified against a reference standard using a C18 reverse phase HPLC column (gradient elution, solvent A (0.10 TFA in water), solvent B (0.1% TFA in acetonitrile)). The lyophilized hGH (dosage mentioned under Table 32) was then transferred to sugar truffle shell made from cane sugar or palm sugar. The shell was then sealed with coconut palm sugar (DEGA Farms). The samples were then stored at 4° C. until further use.

TABLE 32

Experimental Design for Pharmacokinetics and Pharmacodynamics Analysis

| | IV (Marketed Formulation) | Oral Truffle Shell (Albumin Crystal formulation) |
|---|---|---|
| No. of Minipigs (Yorkshire) 3 to 4 months old | 2 | 4 |
| Sex | Female | Female |
| Body Weight | 12 ± 1 kg | 12 ± 1 kg |
| Group | 1 | 2 |
| Test Item | hGH | hGH |
| Dose (mg) | 0.33 | 2.25 |
| Formulation | Liquid | Truffle Shell - Crystalline Albumin containing hGH within pores of the crystals |
| Route | IV (Intravenous) | PO (oral - Truffle Shell containing hGH embedded in albumin crystals) |
| Feeding Status | Fasting overnight or Fed State | Fasting overnight or Fed State |
| Blood/plasma sample collection time | 0 min, 5 mins, 30 mins, 1 hr, 4 hrs, 8hrs, 24 hrs and 48 hrs post dose | 0 min, 5 mins, 30 mins, 1 hr, 4 hrs, 8hrs, 24 hrs and 48 hrs post dose |
| Analysis | hGH ELISA kit Creative Diagnostics | |

Pharmacokinetic analysis was conducted in Female Minipigs weighing 12±1 kg for 2 days. Experimental design is shown in Table 32. Pigs in the oral treatment group was either fasted overnight or fed prior to the test sample administration. All the test animals in the treatment groups were administered with respective test formulation to the pre-designated animals. The time of dosage of each animal was noted. Blood samples were collected at aforementioned time points 0 min, 5 min, 30 min, 1 hr, 4 hrs, 8 hrs, 24 hrs and 48 hrs into an EDTA-blood collection tubes for the separation of plasma to determine hGH levels by ELISA. Plasma samples collected at different time points were analyzed by ELISA kit according to Creative Diagnostics protocol. This kit is based on sandwich enzyme-linked immuno-sorbent assay technology. An antibody, anti-hGH was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient hGH will produce a blue colored product, which then changes to yellow after adding the acidic stop solution. The intensity of the yellow color is proportional to the hGH amount bound on the plate. The Optical Density (OD) was measured spectrophotometrically at 450 nm in a microplate reader, from which the concentration of hGH can be calculated.

TABLE 33

Mean hGH levels summary table (Pigs) in pg/ml

| Time (hrs) | Intravenous – Human hGH | Truffle Shell – Albumin Crystal Formulation |
|---|---|---|
| 0 | 18144.54 ± 1619.64 | 26582 ± 2315.32 |
| 0.08 | 20014.87 ± 620.32 | 18406.45 ± 3042.04 |
| 0.5 | 22513.2 ± 562.85 | 9814.44 ± 4977.47 |
| 1 | 22130.7 ± 728.54 | 2448.59 ± 3413.95 |
| 4 | 14910.13 ± 2908.87 | 1030.89 ± 1425.75 |
| 8 | 1159.19 ± 226.15 | 322.42 ± 21.17 |
| 24 | 1495.55 ± 291.77 | 258.56 ± 29.48 |
| 48 | 463.04 ± 90.34 | 123.77 ± 0 |

TABLE 34

Full Pharmacokinetic profile of Intravenous hGH formulations in Minipigs

| Parameter | Unit | Value |
|---|---|---|
| R | | −0.838 |
| R_adjusted | | 0.629 |
| NumRegPoints | | 6.000 |
| TimeRegStart | h | 0.500 |
| TimeRegEnd | h | 48.000 |
| Lambda_z | 1/h | 0.077 |
| t½ | h | 8.980 |
| Tmax | h | 0.500 |
| Cmax | pg/ml | 22513.200 |
| C0 | pg/ml | 18144.540 |
| Tlast | h | 48.000 |
| Clast_obs | pg/ml | 463.040 |
| Clast_obs/Cmax | | 0.021 |
| AUC 0-t | pg/ml * h | 154059.131 |
| AUC t-inf_obs | pg/ml * h | 5998.634 |
| AUC 0-inf_obs | pg/ml * h | 160057.765 |
| AUC 0-t/0-inf_obs | | 0.963 |
| AUC 0-inf/D_obs | pg/ml * h/(mg) | 485023.532 |
| AUMC 0-t | pg/ml * h^2 | 1330359.118 |
| AUMC t-inf_obs | pg/ml * h^2 | 365646.123 |
| AUMC 0-inf_obs | pg/ml * h^2 | 1696005.242 |
| AUMC 0-t/0-inf_obs | | 0.784 |
| MRT 0-t | h | 8.635 |
| MRT 0-inf_obs | h | 10.596 |
| Vz_obs | (mg)/(pg/ml) | 0.000 |
| Cl_obs | (mg)/(pg/ml)/h | 0.000 |
| Vss_obs | (mg)/(pg/ml) | 0.000 |
| Clast_pred | pg/ml | 314.650 |
| Clast_pred/Cmax | | 0.014 |
| AUC t-inf_pred | pg/ml * h | 4076.251 |
| AUC 0-inf_pred | pg/ml * h | 158135.382 |
| AUC 0-t/0-inf_pred | | 0.974 |
| AUC 0-inf/D_pred | pg/ml * h/(mg) | 479198.128 |
| AUMC t-inf_pred | pg/ml * h^2 | 248467.457 |
| AUMC 0-inf_pred | pg/ml * h^2 | 1578826.575 |
| AUMC 0-t/0-inf_pred | | 0.843 |
| MRT 0-inf_pred | h | 9.984 |

TABLE 35

Full Pharmacokinetic profile of Truffle Shell Albumin Crystal Formulation - hGH formulations in Minipigs

| Parameter | Unit | Value |
|---|---|---|
| R | | −0.983 |
| R_adjusted | | 0.931 |
| NumRegPoints | | 3.000 |
| TimeRegStart | h | 8.000 |
| TimeRegEnd | h | 48.000 |
| Lambda_z | 1/h | 0.024 |
| t½ | h | 28.327 |
| Tmax | h | 0.000 |
| Cmax | pg/ml | 26582.000 |
| Tlag | h | 0.000 |
| Tlast | h | 48.000 |
| Clast_obs | pg/ml | 123.770 |
| Clast_obs/Cmax | | 0.005 |
| AUC 0-t | pg/ml * h | 27953.322 |
| AUC t-inf_obs | pg/ml * h | 5058.144 |
| AUC 0-inf_obs | pg/ml * h | 33011.466 |
| AUC 0-t/0-inf_obs | | 0.847 |
| AUC 0-inf/D_obs | pg/ml * h/(mg) | 13204.586 |
| AUMC 0-t | pg/ml * h^2 | 242536.863 |
| AUMC t-inf_obs | pg/ml * h^2 | 449503.499 |
| AUMC 0-inf_obs | pg/ml * h^2 | 692040.362 |
| AUMC 0-t/0-inf_obs | | 0.350 |
| MRT 0-t | h | 8.676 |
| MRT 0-inf_obs | h | 20.964 |
| Vz/F_obs | (mg)/(pg/ml) | 0.003 |
| Cl/F_obs | (mg)/(pg/ml)/h | 0.000 |
| Clast_pred | pg/ml | 129.169 |
| Clast_pred/Cmax | | 0.005 |
| AUC t-inf_pred | pg/ml * h | 5278.783 |
| AUC 0-inf_pred | pg/ml * h | 33232.105 |
| AUC 0-t/0-inf_pred | | 0.841 |
| AUC 0-inf/D_pred | pg/ml * h/(mg) | 13292.842 |
| AUMC t-inf_pred | pg/ml * h^2 | 469111.099 |
| AUMC 0-inf_pred | pg/ml * h^2 | 711647.962 |
| AUMC 0-t/0-inf_pred | | 0.341 |
| MRT 0-inf_pred | h | 21.414 |
| Vz/F_pred | (mg)/(pg/ml) | 0.003 |
| Cl/F_pred | (mg)/(pg/ml)/h | 0.000 |

The data in Table 33 and FIGS. 19 & 20 demonstrate average plasma concentration of hGH at different time points. The full pharmacokinetic profile are shown in Table 34 and 35. Orally administered hGH formulation showed 3% bioavailability when compared to IV. hGH was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each hGH dose was derived as the maximum of all valid concentrations, and t max was then determined as the corresponding time point to C max. The terminal elimination rate constant ($\lambda$ z) was estimated by log-linear regression on the terminal part of the concentration-time curve, and t ½ was then calculated as t ½=ln 2/$\lambda$z.

Example 17: Pharmacokinetics Study of Adalimumab Formulation Containing/Enclosed in Crystalline Albumin in Capsule Containing Vitamin E in Minipigs The present Example demonstrates that oral formulations of adalimumab exemplary of oral formulations disclosed herein have therapeutically effective pharmacokinetic profiles, e.g., with advantageous properties as compared to parenteral administration of the same peptide/protein. The present example describes an adalimumab formulation enclosed in crystalline albumin (as co-crystals or getting embedded in crystals of albumin while crystallization of albumin), demonstrating that enteric formulation is not required for advantageous application of formulations of the present disclosure.

The present Example includes an oral formulation of peptide/protein embedded in crystals of albumin prepared as follows: Commercially available adalimumab (Exemptia®, 40 mg/0.8 mL or Humira®, 40 mg/0.8 mL) containing adalimumab 40 mg/0.8 mL, succinic acid, sodium chloride, L-arginine monohydrochloride, sorbitol, polysorbate 80, water for injection, and NaOH was processed to prepare albumin microparticles containing adalimumab according to the procedure mentioned under Example 8. The microparticle of albumin crystals containing adalimumab was then lyophilized after washing with cold isopropanol. The amount of lyophilized adalimumab was quantified against a reference standard using a C8 reverse phase HPLC column (gradient elution, solvent A (0.1% TFA in water), solvent B (0.1% TFA in acetonitrile)). The lyophilized adalimumab (dosage mentioned under Table 1) was then transferred to capsule containing 150 µL of Vitamin E and 100 µL of Wheatgerm oil under nitrogen. The capsule was then closed. The samples were then stored at 4° C. until further use.

TABLE 36

Experimental Design for Pharmacokinetics and Pharmacodynamics Analysis

| | IV (Marketed Formulation) | Oral Capsule (Albumin Crystal formulation) |
|---|---|---|
| No. of Minipigs (Yorkshire) 3 to 4 months old | 2 | 4 |
| Sex | Female | Female |
| Body Weight | 12 ± 1 kg | 12 ± 1 kg |
| Group | 1 | 2 |
| Test Item | adalimumab | adalimumab |
| Dose (mg) | 12 | 30 |
| Formulation | Liquid | Capsule - Crystalline Albumin containing adalimumab within pores of the crystals + Vitamin E |
| Route | IV (Intravenous) | PO (oral - Capsule containing adalimumab embedded in albumin crystals + Vitamin E) |
| Feeding Status | Fasting overnight or Fed State | Fasting overnight or Fed State |
| Blood/plasma sample collection time | 0 min, 5 mins, 30 mins, 1 hr, 2 hr, 4hrs, 8 hrs, 24 hrs, 48 hrs, 72 hrs and 96 hrs post dose | 0 min, 5 mins, 30 mins, 1 hr, 2 hr, 4hrs, 8 hrs, 24 hrs, 48 hrs, 72 hrs and 96 hrs post dose |
| Analysis | adalimumab ELISA kit Abcam | |

Pharmacokinetic analysis was conducted in Female Minipigs weighing 12±1 kg for 2 days. Experimental design is shown in Table 36. Pigs in the oral treatment group was either fasted overnight or fed prior to the test sample administration. All the test animals in the treatment groups were administered with respective test formulation to the pre-designated animals. The time of dosage of each animal was noted. Blood samples were collected at aforementioned time points 0 min, 5 min, 30 min, 1 hr, 2 hrs, 4 hrs, 8 hrs, 24 hrs, 48 hrs, 72 hrs and 96 hrs into an EDTA-blood collection tubes for the separation of plasma to determine adalimumab levels by ELISA. Plasma samples collected at different time points were analyzed by ELISA kit according to Abcam protocol. This kit is based on sandwich enzyme-linked immuno-sorbent assay technology. An antibody, anti-adalimumab was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient adalimumab will produce a blue colored product, which then changes to yellow after adding the acidic stop solution. The intensity of the yellow color is proportional to the adalimumab amount bound on the plate. The Optical Density (OD) was measured spectrophotometrically at 450 nm in a microplate reader, from which the concentration of adalimumab can be calculated.

TABLE 37

Mean adalimumab levels summary table (Pigs) in pg/ml

| Time (hrs) | Intravenous - Adalimumab | | Capsule - Albumin Crystal Formulation | |
|---|---|---|---|---|
| | Mean | SD | Mean | SD |
| 0 | 8311.04 | 2592.96 | 0 | 0 |
| 0.08 | 11638.36 | 712.50 | 219.10 | 20.23 |
| 0.5 | 11171.29 | 472.06 | 311.28 | 29.32 |
| 1 | 11637.57 | 301.69 | 362.18 | 39.67 |
| 2 | 11541.29 | 781.67 | 354.64 | 15.69 |
| 4 | 12110.43 | 808.30 | 345.73 | 16.80 |
| 8 | 11914.71 | 247.74 | 259.79 | 42.20 |
| 24 | 11552.57 | 176.46 | 243.17 | 35.40 |
| 48 | 10162.00 | 400.20 | 215.12 | 39.43 |
| 72 | 9803.00 | 605.15 | 232.00 | 26.35 |
| 96 | 8772.00 | 668.24 | 169.17 | 9.72 |

TABLE 38

Full Pharmacokinetic profile of Intravenous adalimumab formulations in Minipigs

| Parameter | Unit | Value |
|---|---|---|
| R | | −0.98458 |
| R_adjusted | | 0.96328 |
| NumRegPoints | | 7 |
| TimeRegStart | h | 2 |
| TimeRegEnd | h | 96 |
| Lambda_z | 1/h | 0.00496 |
| t½ | h | 139.6393 |
| Tmax | h | 2 |
| Cmax | ng/ml | 12110.42857 |
| C0 | ng/ml | 8311.035714 |
| Tlast | h | 96 |
| Clast_obs | ng/ml | 7271.142857 |
| Clast_obs/Cmax | | 0.60040343 |
| AUC 0-t | ng/ml * h | 922882.4739 |
| AUC t-inf_obs | ng/ml * h | 1464822.434 |
| AUC 0-inf_obs | ng/ml * h | 2387704.908 |
| AUC 0-t/0-inf_obs | | 0.38651446 |
| AUC 0-inf/D_obs | ng/ml * h/(mg) | 198975.409 |
| AUMC 0-t | ng/ml * h^2 | 40820243.03 |
| AUMC t-inf_obs | ng/ml * h^2 | 435721647.8 |
| AUMC 0-inf_obs | ng/ml * h^2 | 476541890.8 |
| AUMC 0-t/0-inf_obs | | 0.085659296 |
| MRT 0-t | h | 44.2312474 |
| MRT 0-inf_obs | h | 199.5815686 |
| Vz_obs | (mg)/(ng/ml) | 0.001012472 |
| Cl_obs | (mg)/(ng/ml)/h | 5.02575E−06 |
| Vss_obs | (mg)/(ng/ml) | 0.001003046 |
| Clast_pred | ng/ml | 7496.106675 |
| Clast_pred/Cmax | | 0.618979471 |
| AUC t-inf_pred | ng/ml * h | 1510142.963 |
| AUC 0-inf_pred | ng/ml * h | 2433025.437 |
| AUC 0-t/0-inf_pred | | 0.379314766 |

TABLE 38-continued

Full Pharmacokinetic profile of Intravenous adalimumab formulations in Minipigs

| Parameter | Unit | Value |
|---|---|---|
| AUC 0-inf/D_pred | ng/ml * h/(mg) | 202752.1198 |
| AUMC t-inf_pred | ng/ml * h^2 | 449202555.4 |
| AUMC 0-inf_pred | ng/ml * h^2 | 490022798.4 |
| AUMC 0-t/0-inf_pred | | 0.083302743 |
| MRT 0-inf_pred | h | 201.4047165 |
| Vz_pred | (mg)/(ng/ml) | 0.000993612 |
| Cl_pred | (mg)/(ng/ml)/h | 4.93213E−06 |
| Vss_pred | (mg)/(ng/ml) | 0.000993354 |

TABLE 39

Full Pharmacokinetic profile of Capsule Albumin Crystal Formulation - adalimumab formulations in Minipigs

| Parameter | Unit | Value |
|---|---|---|
| R | | −0.991539238 |
| R_adjusted | | 0.966300121 |
| NumRegPoints | | 3 |
| TimeRegStart | h | 48 |
| TimeRegEnd | h | 96 |
| Lambda_z | 1/h | 0.010727363 |
| t½ | h | 64.61487429 |
| Tmax | h | 0.5 |
| Cmax | μg/ml | 362.1785714 |
| Tlag | h | 0 |
| Tlast | h | 96 |
| Clast_obs | μg/ml | 138.6321429 |
| Clast_obs/Cmax | | 0.382772902 |
| AUC 0-t | μg/ml * h | 19818.27466 |
| AUC t-inf_obs | μg/ml * h | 12923.22718 |
| AUC 0-inf_obs | μg/ml * h | 32741.50184 |
| AUC 0-t/0-inf_obs | | 0.605295223 |
| AUC 0-inf/D_obs | μg/ml * h/(mg) | 1091.383395 |
| AUMC 0-t | μg/ml * h^2 | 846512.1344 |
| AUMC t-inf_obs | μg/ml * h^2 | 2445327.344 |
| AUMC 0-inf_obs | μg/ml * h^2 | 3291839.478 |
| AUMC 0-t/0-inf_obs | | 0.257154743 |
| MRT 0-t | h | 42.71371494 |
| MRT 0-inf_obs | h | 100.5402713 |
| Vz/F_obs | (mg)/(μg/ml) | 0.085414126 |
| Cl/F_obs | (mg)/(μg/ml)/h | 0.000916268 |
| Clast_pred | μg/ml | 135.9605022 |
| Clast_pred/Cmax | | 0.375396318 |
| AUC t-inf_pred | μg/ml * h | 12674.17802 |
| AUC 0-inf_pred | μg/ml * h | 32492.45268 |
| AUC 0-t/0-inf_pred | | 0.609934709 |
| AUC 0-inf/D_pred | μg/ml * h/(mg) | 1083.081756 |
| AUMC t-inf_pred | μg/ml * h^2 | 2398202.372 |
| AUMC 0-inf_pred | μg/ml * h^2 | 3244714.506 |
| AUMC 0-t/0-inf_pred | | 0.260889558 |
| MRT 0-inf_pred | h | 99.86055958 |
| Vz/F_pred | (mg)/(μg/ml) | 0.086068811 |
| Cl/F_pred | (mg)/(μg/ml)/h | 0.000923291 |

The data in Table 37 and FIGS. 21 & 22 demonstrate average plasma concentration of adalimumab at different time points. The full pharmacokinetic profile are shown in Table 38 and 39. Orally administered adalimumab formulation showed 1% bioavailability when compared to IV. Adalimumab was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each adalimumab dose was derived as the maximum of all valid concentrations, and t max was then determined as the corresponding time point to C max. The terminal elimination rate constant (λ z) was estimated by log-linear regression on the terminal part of the concentration-time curve, and t ½ was then calculated as t ½=ln 2/λz.

Example 18: Pharmacokinetics Study of Adalimumab Formulation Containing/Enclosed in Crystalline Albumin in Sugar Truffle Shell in Minipigs The present Example demonstrates that oral formulations of adalimumab exemplary of oral formulations disclosed herein have therapeutically effective pharmacokinetic profiles, e.g., with advantageous properties as compared to parenteral administration of the same peptide/protein. The present example describes an adalimumab formulation enclosed in crystalline albumin (as co-crystals or getting embedded in crystals of albumin while crystallization of albumin), demonstrating that enteric formulation is not required for advantageous application of formulations of the present disclosure.

The present Example includes an oral formulation of peptide/protein embedded in crystals of albumin prepared as follows: Commercially available adalimumab (Exemptia®, 40 mg/0.8 mL or Humira®, 40 mg/0.8 mL) containing adalimumab 40 mg/0.8 mL, succinic acid, sodium chloride, L-arginine monohydrochloride, sorbitol, polysorbate 80, water for injection, and NaOH was processed to prepare albumin microparticles containing adalimumab according to the procedure mentioned under Example 8. The microparticle of albumin crystals containing adalimumab was then lyophilized after washing with cold isopropanol. The amount of lyophilized adalimumab was quantified against a reference standard using a C8 reverse phase HPLC column (gradient elution, solvent A (0.1% TFA in water), solvent B (0.1% TFA in acetonitrile)). The lyophilized adalimumab (dosage mentioned under Table 40) was then transferred to sugar truffle shell made from cane sugar or palm sugar. The shell was then sealed with coconut palm sugar (DEGA Farms). The samples were then stored at 4° C. until further use.

TABLE 40

Experimental Design for Pharmacokinetics and Pharmacodynamics Analysis

|  | IV (Marketed Formulation) | Oral Truffle Shell (Albumin Crystal formulation) |
|---|---|---|
| No. of Minipigs (Yorkshire) 3 to 4 months old | 2 | 4 |
| Sex | Female | Female |
| Body Weight | 12 ± 1 kg | 12 ± 1 kg |
| Group | 1 | 2 |
| Test Item | adalimumab | adalimumab |
| Dose (mg) | 12 | 24 |
| Formulation | Liquid | Truffle Shell - Crystalline Albumin containing adalimumab within pores of the crystals |
| Route | IV (Intravenous) | PO (oral - Truffle Shell containing adalimumab embedded in albumin crystals) |

TABLE 40-continued

Experimental Design for Pharmacokinetics and Pharmacodynamics Analysis

|  | IV (Marketed Formulation) | Oral Truffle Shell (Albumin Crystal formulation) |
|---|---|---|
| Feeding Status | Fasting overnight or Fed State | Fasting overnight or Fed State |
| Blood/plasma sample collection time | 0 min, 5 mins, 30 mins, 1 hr, 2 hr, 4hrs, 8 hrs, 24 hrs, 48 hrs, 72 hrs and 96 hrs post dose | 0 min, 5 mins, 30 mins, 1 hr, 2 hr, 4hrs, 8 hrs, 24 hrs, 48 hrs, 72 hrs and 96 hrs post dose |
| Analysis | adalimumab ELISA kit Abcam | |

Pharmacokinetic analysis was conducted in Female Minipigs weighing 12±1 kg for 2 days. Experimental design is shown in Table 40. Pigs in the oral treatment group was either fasted overnight or fed prior to the test sample administration. All the test animals in the treatment groups were administered with respective test formulation to the pre-designated animals. The time of dosage of each animal was noted. Blood samples were collected at aforementioned time points 0 min, 5 min, 30 min 1 hr, 2 hrs, 4 hrs, 8 hrs, 24 hrs, 48 hrs, 72 hrs and 96 hrs into an EDTA-blood collection tubes for the separation of plasma to determine adalimumab levels by ELISA. Plasma samples collected at different time points were analyzed by ELISA kit according to Abcam protocol. This kit is based on sandwich enzyme-linked immuno-sorbent assay technology. An antibody, anti-adalimumab was pre-coated onto a 96-well plate. Standards, test samples, and biotin-conjugated reagent were added to the wells and incubated. The HRP-conjugated reagent was then added, and the whole plate was incubated. Unbound conjugates were removed using wash buffer at each stage. TMB substrate was used to quantify the HRP enzymatic reaction. After TMB substrate was added, only wells that contain sufficient adalimumab will produce a blue colored product, which then changes to yellow after adding the acidic stop solution. The intensity of the yellow color is proportional to the adalimumab amount bound on the plate. The Optical Density (OD) was measured spectrophotometrically at 450 nm in a microplate reader, from which the concentration of adalimumab can be calculated.

TABLE 41

Mean adalimumab levels summary table (Pigs) in pg/ml

|  | Intravenous - Adalimumab | | Tablet - Albumin Crystal Formulation | |
|---|---|---|---|---|
| Time (hrs) | Mean | SD | Mean | SD |
| 0 | 8311.04 | 2592.96 | 229.2518 | 50.53 |
| 0.08 | 11638.36 | 712.50 | 391.2857 | 57.76 |
| 0.5 | 11171.29 | 472.06 | 335.6786 | 32.81 |
| 1 | 11637.57 | 301.69 | 321.7321 | 15.68 |
| 2 | 11541.29 | 781.67 | 331.125 | 21.09 |
| 4 | 12110.43 | 808.30 | 308.3589 | 28.32 |
| 8 | 11914.71 | 247.74 | 282.0643 | 48.61 |
| 24 | 11552.57 | 176.46 | 196.9286 | 59.60 |
| 48 | 10162.00 | 400.20 | 178.8643 | 10.12 |
| 72 | 9803.00 | 605.15 | 154.1839 | 16.34 |
| 96 | 8772.00 | 668.24 | 170.4286 | 13.00 |

TABLE 42

Full Pharmacokinetic profile of Intravenous adalimumab formulations in Minipigs

| Parameter | Unit | Value |
|---|---|---|
| R | | −0.98458 |
| R_adjusted | | 0.96328 |
| NumRegPoints | | 7 |
| TimeRegStart | h | 2 |
| TimeRegEnd | h | 96 |
| Lambda_z | 1/h | 0.00496 |
| t½ | h | 139.6393 |
| Tmax | h | 2 |
| Cmax | ng/ml | 12110.42857 |
| C0 | ng/ml | 8311.035714 |
| Tlast | h | 96 |
| Clast_obs | ng/ml | 7271.142857 |
| Clast_obs/Cmax | | 0.60040343 |
| AUC 0-t | ng/ml * h | 922882.4739 |
| AUC t-inf_obs | ng/ml * h | 1464822.434 |
| AUC 0-inf_obs | ng/ml * h | 2387704.908 |
| AUC 0-t/0-inf_obs | | 0.38651446 |
| AUC 0-inf/D_obs | ng/ml * h/(mg) | 198975.409 |
| AUMC 0-t | ng/ml * h^2 | 40820243.03 |
| AUMC t-inf_obs | ng/ml * h^2 | 435721647.8 |
| AUMC 0-inf_obs | ng/ml * h^2 | 476541890.8 |
| AUMC 0-t/0-inf_obs | | 0.085659296 |
| MRT 0-t | h | 44.2312474 |
| MRT 0-inf_obs | h | 199.5815686 |
| Vz_obs | (mg)/(ng/ml) | 0.001012472 |
| Cl_obs | (mg)/(ng/ml)/h | 5.02575E−06 |
| Vss_obs | (mg)/(ng/ml) | 0.001003046 |
| Clast_pred | ng/ml | 7496.106675 |
| Clast pred/Cmax | | 0.618979471 |
| AUC t-inf_pred | ng/ml * h | 1510142.963 |
| AUC 0-inf_pred | ng/ml * h | 2433025.437 |
| AUC 0-t/0-inf_pred | | 0.379314766 |
| AUC 0-inf/D_pred | ng/ml * h/(mg) | 202752.1198 |
| AUMC t-inf_pred | ng/ml * h^2 | 449202555.4 |
| AUMC 0-inf_pred | ng/ml * h^2 | 490022798.4 |
| AUMC 0-t/0-inf_pred | | 0.083302743 |
| MRT 0-inf_pred | h | 201.4047165 |
| Vz_pred | (mg)/(ng/ml) | 0.000993612 |
| Cl_pred | (mg)/(ng/ml)/h | 4.93213E−06 |
| Vss_pred | (mg)/(ng/ml) | 0.000993354 |

TABLE 43

Full Pharmacokinetic profile of Truffle Shell Albumin Crystal Formulation - adalimumab formulations in Minipigs

| Parameter | Unit | Value |
|---|---|---|
| R | | −0.84135 |
| R_adjusted | | 0.6713 |
| NumRegPoints | | 10 |
| TimeRegStart | h | 0.25 |
| TimeRegEnd | h | 96 |
| Lambda_z | 1/h | 0.00833 |
| t½ | h | 83.1742 |
| Tmax | h | 0.08 |
| Cmax | ng/ml | 391.2857 |
| Tlag | h | 0 |
| Tlast | h | 96 |
| Clast_obs | ng/ml | 145.6267 |
| Clast_obs/Cmax | | 0.3721 |
| AUC 0-t | ng/ml * h | 16891.0907 |
| AUC t-inf_obs | ng/ml * h | 17474.4931 |
| AUC 0-inf_obs | ng/ml * h | 34365.583 |
| AUC 0-t/0-inf_obs | | 0.4915 |
| AUC 0-inf/D_obs | ng/ml * h/(mg) | 1145.519 |
| AUMC 0-t | ng/ml * h^2 | 746131.7099 |
| AUMC t-inf_obs | ng/ml * h^2 | 3774403.977 |
| AUMC 0-inf_obs | ng/ml * h^2 | 4520535.687 |
| AUMC 0-t/0-inf_obs | | 0.1650 |
| MRT 0-t | h | 44.17309 |
| MRT 0-inf_obs | h | 131.5425 |
| Vz/F_obs | (mg)/(ng/ml) | 0.1047 |
| Cl/F_obs | (mg)/(ng/ml)/h | 0.00087 |
| Clast_pred | ng/ml | 128.0441 |
| Clast_pred/Cmax | | 0.3272 |
| AUC t-inf_pred | ng/ml * h | 15364.669 |
| AUC 0-inf_pred | ng/ml * h | 32255.7597 |
| AUC 0-t/0-inf_pred | | 0.5236 |
| AUC 0-inf/D_pred | ng/ml * h/(mg) | 1075.1919 |
| AUMC t-inf_pred | ng/ml * h^2 | 3318692.435 |
| AUMC 0-inf_pred | ng/ml * h^2 | 4064824.144 |
| AUMC 0-t/0-inf_pred | | 0.183 |
| MRT 0-inf_pred | h | 126.0185 |
| Vz/F_pred | (mg)/(ng/ml) | 0.11160 |
| Cl/F_pred | (mg)/(ng/ml)/h | 0.00093 |

The data in Table 41 and FIGS. 23 & 24 demonstrate average plasma concentration of adalimumab at different time points. The full pharmacokinetic profile are shown in Table 42 and 43. Orally administered adalimumab formulation showed 1% bioavailability when compared to IV. Adalimumab was analyzed in plasma using a specific enzyme linked immunosorbent assay (ELISA). Pharmacokinetic endpoints were determined using noncompartmental methods using PK Solutions software. AUC was approximated using the trapezoidal rule on the observed concentrations. C max for each adalimumab dose was derived as the maximum of all valid concentrations, and t max was then determined as the corresponding time point to C max. The terminal elimination rate constant (λ z) was estimated by log-linear regression on the terminal part of the concentration-time curve, and t ½ was then calculated as t ½=ln 2/λz.

Other Embodiments

While we have described a number of embodiments, it is apparent that our basic disclosure and examples may provide other embodiments that utilize or are encompassed by the compositions and methods described herein. Therefore, it will be appreciated that the scope of is to be defined by that which may be understood from the disclosure and the appended claims rather than by the specific embodiments that have been represented by way of example.

All references cited herein are hereby incorporated by reference.

What is claimed is:

1. A polypeptide formulation comprising a polypeptide component and a pharmaceutically acceptable carrier, wherein:
the polypeptide component consists of distinct carrier and active polypeptides, each of which is an unmodified polypeptide or a polypeptide that is modified by one or more of acetylation, acylation, amidation, glycation, glycosylation, lipidation, mannosylation, methylation, nitrosylation, phosphorylation, sulfation, palmitoylation, pegylation, and prenylation, and further wherein:
(a) the polypeptide component is in a solid form;
(b) the active polypeptide is insulin;
(c) one or both of the polypeptides is crystallized; and
(d) the active polypeptide component is embedded in a crystalized carrier polypeptide component.

2. The polypeptide formulation of claim 1, wherein the polypeptide formulation comprises a core and a pharmaceutically acceptable shell, wherein:
the core comprises the polypeptide component.

3. The polypeptide formulation of claim 1, wherein the polypeptide formulation is a tablet.

4. The polypeptide formulation of claim 1, wherein the polypeptide formulation is a globule formulation.

5. The polypeptide formulation of claim 1, wherein the polypeptide formulation is a candy formulation.

6. The polypeptide formulation of claim 5, wherein the candy formulation is in a form of candy gems, chewing gum, gummy candy, hard candy, marshmallows, syrup, or toffee.

7. The polypeptide formulation of claim 1, wherein the polypeptide formulation is a capsule formulation.

8. The polypeptide formulation of claim 7, wherein the capsule formulation comprises a pharmaceutically acceptable carrier comprising a Vitamin E agent.

9. A method of delivering insulin to the bloodstream of a subject, the method comprising orally administering to the subject the polypeptide formulation of claim 1.

10. The method of claim 9, wherein the step of administering achieves delivery to the bloodstream.

11. A method of producing the polypeptide formulation of claim 1, the method comprising crystallizing a mixture of the carrier polypeptide and the active polypeptide, so that the active polypeptide is embedded in the crystalized carrier polypeptide during crystallization.

12. The polypeptide formulation of claim 1, wherein the active polypeptide is or comprises a therapeutic polypeptide/peptide.

13. A polypeptide formulation comprising a polypeptide component and a pharmaceutically acceptable carrier, wherein:
the polypeptide component consists of distinct carrier and active polypeptides, at least the carrier polypeptide is in crystalline form, and the active polypeptide is embedded within the crystallized carrier polypeptide.

14. The polypeptide formulation of claim 13, wherein the active polypeptide is insulin, parathyroid hormone, liraglutide, octreotide acetate, semaglutide, adalimumab, trastuzumab, or an analog or derivative thereof.

15. The polypeptide formulation of claim 13, wherein the active polypeptide has a molecular weight between about 500 Da and 200 kDa.

16. The polypeptide formulation of claim 13, wherein the carrier polypeptide composition comprises amylase.

17. The polypeptide formulation of claim 13, wherein the carrier polypeptide composition comprises albumin.

18. The polypeptide formulation of claim 13, wherein the polypeptide component is in a crystallized form and characterized by crystals having an average particle size of less than 25 microns.

19. The polypeptide formulation of claim 1, wherein the active polypeptide component embedded in a crystalized carrier polypeptide component forms a co-crystal comprising microcrystals or nanocrystals.

20. The polypeptide formulation of claim 2, wherein the shell is or comprises sugar.

21. The polypeptide formulation of claim 2, wherein the shell is hollow.

22. The polypeptide formulation of claim 2, wherein the formulation is in a shape of sphere, or a modification thereof.

23. The polypeptide formulation of claim 1, wherein the polypeptide formulation is formulated for delivery to the gut.

24. The polypeptide formulation of claim 13, wherein the formulation comprises an enteric coating.

25. The polypeptide formulation of claim 13, wherein the formulation further comprises one or more excipients or additives selected from the group consisting of aggregation-reducing agents, sugars or sugar alcohols, polysaccharides, stabilizers, hyaluronidase, buffering agents, preservatives, carriers, antioxidants, chelating agents, natural or synthetic polymers, cryoprotectants, lyoprotectants, surfactants, bulking agents, acidifying agents, ingredients to reduce injection site discomfort, antifoaming agents, alkalizing agents, vehicles, aggregation inhibitors, solubilizing agents, permeation enhancers, muco bioadhesive agents, tonicity modifiers, and stabilizing agents and combinations thereof.

26. The polypeptide formulation of claim 25, wherein:
(i) the aggregation-reducing agent(s) s are selected from the group consisting of nicotinic acid, caffeine citrate, caffeine nicotinate, caffeine, octyl-β-D-glucopyranoside, and n-dodecyl-β-D-maltoside;
(ii) the tonicity modifier(s) are selected from the group consisting of arginine, cysteine, histidine, glycine, sodium chloride, potassium chloride, sodium citrate, and saccharides;
(iii) the antioxidant(s) are selected from the group consisting of lysine, EDTA, DTPA, sorbitol, mannitol, ascorbic acid, ascorbyl palmitate, butylated hydroxyanisole, butylated hydroxytoluene, hypophosphorous acid, monothioglycerol, propyl gallate, sodium bisulfite, sodium formaldehyde sulfoxylate, sodium metabisulfite, sodium thiosulfate, sulfur dioxide, tocopherol, and combinations thereof;
(iv) the lyoprotectant(s) are selected from the group consisting of amino acids, gelatin, dextrins, modified starch, carboxymethyl cellulose, and combinations thereof; or
(v) the permeation enhancer(s) are selected from the group consisting of bile salts, sodium deoxy cholate, sodium glyco-deoxy cholate, sodium tauro-deoxy cholate; fatty acids, their salt and esters; surfactants; complexing agents; co-solvents; polysaccharides; aprotinin, benzalkonium chloride, cetylpyridinium chloride, cetyltrimethyl ammonium bromide, sodium salicylate, lysophosphatidylcholine, methoxysalicylate, methyloleate, sodium EDTA, sulfoxides, various alkyl glycosides, ethylene-diamide tetra acetic acid, tartaric acid; lyotropic salts; propylene glycol, glycerol, polyethylene glycol, or polypropylene glycol and combinations thereof;
(vi) the absorption enhancer(s) are selected from the group consisting of surfactants, cholesterol, glycerides, salicylates, bile salts, chelating agents, sodium caprate, a salt of capric acid, N-(5-chlorosalicylol)-8-aminocaprylic acid, 5-CNAC, 4-((4-chloro-2-hydroxybenzoyl))-amino) butanoic acid, 4-CNAB, and N-(8-(2-hydroxybenzoyl))-amino) caprylic acid, also known as salcaprozate sodium, salcaprozate sodium, caprylic acid, C8, castor oil, acyl carnitine, EDTA, glyceryl monolaurate, bovine β-casein, tocopherol succinate glycol chitosan conjugates, lecithins, glyceryl monostearate, chitosan alginate, PLGA, silica, stearic acid, oleic acid, hydrogenated castor oil, and glyceryl trimyristate, etoposide phosphate, sulindac, enalapril maleate, ramipril, olmesartan medoxomil, valacyclovir, midodrine, gabapentin enacarbil, sulfasalazine, and combinations thereof; or
(vii) the muco bioadhesive agent(s) are selected from the group consisting of sucrose, lactose, trehalose, dextran, erythritol, arabitol, xylitol, maltose, lactulose, maltulose, glucitol, maltitol, lactitol, isomaltulose, amino acids; lyotropic salts and combinations thereof, mucoadhesive system, all anionic-type polymers, chitosan, hydroxypropyl methylcellulose, polyacrylic acid derivatives, CP934, CP940, PCP, 15% CMC and 35% CP, copolymers of acrylic acid and polyethylene glycol monomethylether monomethacrylate, neutral polyethylacrlate methylmethacrylate, hydrophilic polymers, carboxyvinyl polymer and triethanolamine, hydroxy propyl cellulose, carbomer 934P, carbomer EX-55 CMC, sodium carboxymethyl cellulose, hydroxy ethyl cellulose, polyisoprene, poly-Isobutylene, xanthum gum, locust bean gum, pectin, polycarbophil, benzyl esters, polyacrylic acid, polyacrylic acid-co-acrylamide, polyacrylic acid-co-methyl methacrylate, polyacrylic acid-co-butylacrylate, HEMA copolymerized with polytetramethylene glycol, bioadhesive polymeric blend of CP and PIB, formulation consisting of polyvinylpyrrolidone, chitosan chloride, polyethylene oxide, polymethylvinylether/maleic anhydride, and tragacanth, drum dried waxy maize starch, carbomer 974P, and sodium stearyl fumarate, and cellulose derivatives; acrylic acid based hydrogels and butyl acrylate, and combinations thereof.

27. The polypeptide formulation of claim 13, wherein the active polypeptide is selected from Abaloparatide, lixisenatide, Afamelanotide, angiotensin II antagonist, Anidulafungin, Atosiban, Aviptadil, Belantamab mafodotin-blmf, Bentiromide, Beta-endorphin, Bivalirudin, Bradykinin, Bremelanotide, Bursin, Calcitonin, Capreomycin, Carbetocin, Carfilzomib, Caspofungin, Ceruletide, Cholecystokynin, Cu-DOTATATE, Dalbavancin, Daptomycin, Degarelix, Dulaglutide, Edotreotide, Edotreotide, Enfortumab Vedotin-Ejfv, Enfuvirtide, Etelcalcetide, Exenatide, Ga DOTA-TOC, gallium Ga-68, Ga-PSMA-11, Glatiramer acetate, Glatiramer, Glucagon, Gonadorelin, Goserelin, Gramicidin, Human growth hormone, Icatibant, Interferons, Interferon Alfa-2a, Recombinant, Interferon alfacon-1, Interferon Alfa-2b, Recombinant, Interferon beta-1b, Interferon beta-1a, Interferon alfa-n3, Interferon alfa-n1, Interferon gamma-1b, Peginterferon alfa-2b, Peginterferon alfa-2a, Ixazomib, Lanreotide, Leuprorelin, Leuprotide, Linaclotide, Liraglutide, Lumasiran, Lutetium Lu 177 dotatate, Macimorelin, Micafungin, Mifamurtide, Nesiritide, Octreotide, Oritavancin, Oxytocin, Pasireotide, Plecanatide, Polatuzumab Vedotin-Piiq, Pramlintide, Romidepsin, Voclosporin, Romiplostim, Secretin human, Semaglutide, Sermorelin, Setmelanotide, Taltirelin, Teduglutide, Telavancin, Teriparatide, Terlipressin, Tetracosactide, Bacitracin, Vancomycin, Thymalfasin, Mecasermin, Cetrorelix, Vasopressin, Viltolarsen, Ziconotide, Desmopressin, Insulin degludec, Ixazomib, Macimorelin, Insulin recombinant, Exentide, Lancreotide, Etanercept, Bevacizumab, Rituximab, Infliximab, Trastuzumab, Insulin glargine, Epoetin alfa, Darbepoetin alfa, Epoetin beta, Pegfilgrastim, Ranibizumab, Insulin aspart, recombinant human insulin, Octocog alfa, Insulin lispro, Cetuximab, Eptacog alfa, Onabotulinumtoxin A, Filgrastin, Insulin detemir, Natalizumab, Palivizumab, Bleomycin, Bortezomib, Buserelin, Carfilzomib, Cobicistat, Corticotropin, Cosyntropin, Dactinomycin, Depreotide, Eptifibatide, Ganirelix, Glutathion, Histrelin, Leuprolide, Lucinactant, Lypressin, Nafarelin, Pentagastrin, Pentetreotide, Polymyxin B, Protirelin, Saralasin, Secretin porcine, Sincalide, Somatorelin, Somatostatin, Teicoplanin, Triptorelin, Urofollitropin, Abarelix, Pegvisomant, Somatropin recombinant, Lutropin alfa, Follitropin beta, Menotropins, Thyrotropin Alfa, Choriogonadotropin alfa, Aldesleukin, Coagulation Factor IX, Antihemophilic Factor, Eptifibatide, Exenatide, Lepirudin, Angiotensin, Boceprevir, Ciclosporin, Ciclosporin, Dalbavancin, Lutetium, oxodotreotide, Ombitasvir, paritaprevir, ritonavir, Televancin, Avexitide, Calcitonin gene-related peptide, Corticorelin, Leptin, Aclerastide, Albusomatropin, Anamorelin, Insulin peglispro, Lenomorelin, Selepressin, Somapacitan, Taspoglutide, Thymosin beta-4, Tirzepatide, Ularitide, Vosoritide, Zoptarelin doxorubicin, Bombesin, Cenderitide, Deslorelin, Gastric inhibitory polypeptide, MK-3207, Olcegepant, Pancreatic Polypeptide, Peptide YY, Pirnabine, Somatoprim, TT-232, BPI-3016, NBI-6024, Albiglutide, Taltirelin hydrate, Tesamorelin, Peginesatide, Cyclosporin A, Plecanotide, Colistin sulfate, Tyrothricin, Pancrelipase, Tilactase, Sacrosidase, Diamine oxidase, palmitoylated insulin, Thymopentin, parathyroid hormone 1-34, BSA, sCT, BSM, Captopril, Enfurvitide, Streptokinase, Dolcanatide, GLP-1 analogue peptide and anti-PCSK9 antibody fusion eneca, somatrogon, adalimumab, or an analog or derivative thereof.

28. The polypeptide formulation of claim 13, wherein the active polypeptide is insulin.

29. The polypeptide formulation of claim 13, wherein the polypeptide component is in a crystallized form, and wherein the crystallized form comprises active polypeptide embedded in crystalline carrier polypeptide.

30. The polypeptide formulation of claim 13, wherein the active polypeptide is selected from abaloparatide, calcitonin, exenatide, human growth hormone, liraglutide, octreotide, semaglutide, teduglutide, teriparatide, insulin degludec, insulin glargine, insulin aspart, recombinant human insulin, insulin lispro, insulin detemir, somatostatin, somatropin recombinant, insulin peglispro, tirzepatide, albiglutide, palmitoylated insulin, parathyroid hormone, or an analog or derivative thereof.

31. The polypeptide formulation of claim 25, wherein:
(i) the aggregation-reducing agent(s) s are selected from the group consisting of octyl-β-D-glucopyranoside, and n-dodecyl-β-D-maltoside and combinations thereof;
(ii) the tonicity modifier(s) are selected from the group consisting of arginine, sodium chloride, sodium citrate, and combinations thereof;
(iii) the antioxidant(s) are selected from the group consisting of EDTA, ascorbic acid, ascorbyl palmitate, butylated hydroxyanisole, sodium bisulfite, sodium metabisulfite, tocopherol, and combinations thereof;
(iv) the lyoprotectant(s) are selected from the group consisting of sucrose, lactose, trehalose, sorbitol, mannitol; amino acids, dextrins, and combinations thereof; or
(v) the permeation enhancer(s) are selected from the group consisting of bile salts, sodium deoxy cholate, sodium glyco-deoxy Cholate, sodium tauro-deoxy cholate; surfactants;
lysophosphatidylcholine, methyloleate, sodium EDTA, alkyl glycosides, polyethylene glycol, and combinations thereof;
(vi) the absorption enhancer(s) are selected from the group consisting of surfactants, bile salts, sodium caprate, a salt of capric acid and other includes N-(5-chlorosalicylol)-8-aminocaprylic acid, 5-CNAC, 4-((4-chloro-2-hydroxybenzoyl))-amino) butanoic acid, 4-CNAB, and N-(8-(2-hydroxybenzoyl))-amino) caprylic acid, also known as salcaprozate sodium, SNAC, caprylic acid, C8, acyl carnitine, EDTA, glyceryl monolaurate, tocopherol succinate glycol, chitosan conjugates, lecithins, glyceryl monostearate, chitosan alginate, oleic acid, and combinations thereof; or (vii) the muco bioadhesive agent(s) are selected from the group consisting of dextran, amino acids, gelatin, modified starch, carboxymethyl cellulose, all anionic-type polymers, chitosan, hydroxypropyl methylcellulose, polyacrylic acid derivatives, CP934, CP940, PCP, 15% CMC and 35% CP, copolymers of acrylic acid, neutral polyethylacrlate methylmethacrylate, hydrophilic polymers, carboxyvinyl polymer and triethanolamine, hydroxy propyl cellulose, carbomer 934P, carbomer EX-55, CMC, sodium carboxymethyl cellulose, hydroxy propyl methyl cellulose, hydroxy ethyl cellulose, xanthum gum, locust bean gum, pectin, polycarbophil, polyacrylic acid, polyacrylic acid-co-acrylamide, polyacrylic acid-co-methyl methacrylate, polyacrylic acid-co-butylacrylate, HEMA copolymerized with polytetramethylene glycol, bioadhesive polymeric blend of CP and PIB, formulation consisting of PVP, polyethylene oxide, polymethylvinylether/maleic anhydride, tragacanth, poly ethyleneglycol monomethylether monomethacrylate, drum dried waxy maize starch, carbomer 974P, and sodium stearyl fumarate, and cellulose derivatives; acrylic acid based hydrogels and butyl acrylate, and combinations thereof.

* * * * *